(12) United States Patent
Doyle et al.

(10) Patent No.: US 11,100,490 B1
(45) Date of Patent: Aug. 24, 2021

(54) APPLICATION INTEGRATION FOR CONTACTLESS PAYMENTS

(71) Applicant: Square, Inc., San Francisco, CA (US)

(72) Inventors: Evan Doyle, San Francisco, CA (US); Adam Edwards, Atlanta, GA (US); Christopher Heisel, Atlanta, GA (US); David Ragone, San Francisco, CA (US); Mark Brown, Atlanta, GA (US); Eric Richardson, Atlanta, GA (US); Keenan Simmons, San Francisco, CA (US); Krystal Mincey, Atlanta, GA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 17/079,946

(22) Filed: Oct. 26, 2020

Related U.S. Application Data

(60) Provisional application No. 63/076,768, filed on Sep. 10, 2020.

(51) Int. Cl.
  *G06Q 20/32* (2012.01)
  *G06Q 20/22* (2012.01)
  (Continued)

(52) U.S. Cl.
  CPC ....... *G06Q 20/3276* (2013.01); *G06F 3/0488* (2013.01); *G06F 8/61* (2013.01);
  (Continued)

(58) Field of Classification Search
  None
  See application file for complete search history.

(56) References Cited

U.S. PATENT DOCUMENTS

| | | | | |
|---|---|---|---|---|
| 8,905,303 | B1* | 12/2014 | Ben Ayed | G06Q 20/32 235/380 |
| 9,171,302 | B2* | 10/2015 | Jooste | G06Q 20/326 |

(Continued)

OTHER PUBLICATIONS

Sherif, Mostafa Hashem "Protocols for secure electronic commerce: Mobile Payments Chapter" (Year: 2016).*

(Continued)

*Primary Examiner* — Oluseye Iwarere
(74) *Attorney, Agent, or Firm* — Lee & Hayes, P.C.

(57) ABSTRACT

Application integration for contactless payments is described. In an example, a payment making platform can provide a transaction code to a payment processing platform. The transaction code can be presented at a point-of-sale of a transaction between a customer and a merchant associated with the payment processing platform. Upon detecting an interaction between the transaction code and a computing device of the customer, the payment making platform and the payment processing platform can exchange data to enable the customer to participate in the transaction via the computing device of the customer. In some examples, the payment making platform and the payment processing platform can process a contactless payment for the transaction by transferring funds associated with an account of the customer from the payment making platform to the payment processing platform for depositing into an account of the merchant.

20 Claims, 19 Drawing Sheets

(51) Int. Cl.
  *G06Q 20/20* (2012.01)
  *G06K 7/10* (2006.01)
  *G06Q 20/08* (2012.01)
  *G06F 3/0488* (2013.01)
  *G06Q 30/06* (2012.01)
  *G06Q 20/40* (2012.01)
  *G06K 7/14* (2006.01)
  *G06F 9/54* (2006.01)
  *G06F 8/61* (2018.01)

(52) U.S. Cl.
  CPC .......... *G06F 9/547* (2013.01); *G06K 7/1095* (2013.01); *G06K 7/1417* (2013.01); *G06Q 20/085* (2013.01); *G06Q 20/202* (2013.01); *G06Q 20/223* (2013.01); *G06Q 20/227* (2013.01); *G06Q 20/326* (2020.05); *G06Q 20/4016* (2013.01); *G06Q 20/4037* (2013.01); *G06Q 30/0633* (2013.01)

(56) References Cited

U.S. PATENT DOCUMENTS

| | | | | |
|---|---|---|---|---|
| 9,760,871 | B1* | 9/2017 | Pourfallah | G06Q 20/3276 |
| 10,467,615 | B1 | 11/2019 | Omojola et al. | |
| 10,586,227 | B2* | 3/2020 | Makhdumi | G06Q 20/204 |
| 2007/0255653 | A1* | 11/2007 | Tumminaro | G06Q 20/325 |
| | | | | 705/39 |
| 2012/0123924 | A1* | 5/2012 | Rose | G06Q 20/3276 |
| | | | | 705/35 |
| 2012/0209749 | A1* | 8/2012 | Hammad | G06Q 20/204 |
| | | | | 705/27.1 |
| 2013/0238455 | A1* | 9/2013 | Laracey | G06Q 20/108 |
| | | | | 705/21 |
| 2013/0346302 | A1* | 12/2013 | Purves | G06Q 20/108 |
| | | | | 705/40 |
| 2014/0040139 | A1* | 2/2014 | Brudnicki | H04W 12/0471 |
| | | | | 705/44 |
| 2014/0207680 | A1* | 7/2014 | Rephlo | G06Q 20/3226 |
| | | | | 705/44 |
| 2015/0012426 | A1* | 1/2015 | Purves | G06Q 20/321 |
| | | | | 705/41 |
| 2015/0026049 | A1* | 1/2015 | Theurer | G06Q 20/28 |
| | | | | 705/41 |
| 2015/0154588 | A1* | 6/2015 | Purves | G06Q 30/0226 |
| | | | | 705/14.27 |
| 2015/0186879 | A1* | 7/2015 | Ortiz | G06Q 20/3829 |
| | | | | 705/71 |
| 2015/0248664 | A1* | 9/2015 | Makhdumi | G06Q 20/3276 |
| | | | | 235/380 |
| 2015/0302398 | A1* | 10/2015 | Desai | G06Q 30/0641 |
| | | | | 705/41 |
| 2016/0314451 | A1* | 10/2016 | Martin | G06Q 20/405 |
| 2017/0024738 | A1* | 1/2017 | Vaidyanathan | G06Q 20/227 |
| 2019/0034921 | A1* | 1/2019 | Hammad | G06Q 20/326 |
| 2020/0092272 | A1* | 3/2020 | Eisen | G06Q 20/385 |
| 2020/0094133 | A1* | 3/2020 | Rose | G06Q 20/326 |
| 2020/0175496 | A1* | 6/2020 | Finke | G06Q 20/209 |

OTHER PUBLICATIONS

QuickCash: Secure Transfer Payment Systems Alhothaily, Abdulrahman ; Alrawais, Arwa ; Song, Tianyi ; Lin, Bin ; Cheng, Xiuzhen Sensors (Basel, Switzerland), Jun. 13, 2017, vol. 17 (6), p. 1376 (Year: 2017).*

* cited by examiner

APPLICATION INTEGRATION FOR CONTACTLESS PAYMENTS

PRIORITY

This application claims priority to U.S. Provisional Application No. 63/076,768, filed on Sep. 10, 2020, the entire contents of which are incorporated by reference herein.

TECHNICAL FIELD

Merchants provide a variety of checkout options for customers. A typical checkout experience for a customer shopping at a brick-and-mortar store of a merchant includes interacting with an employee of a merchant and/or a point-of-sale (POS) device at a checkout stand in the brick-and-mortar store. To remit payment for such a transaction, the customer can tender cash, a credit card, a debit card, a check, or the like to the employee and/or via an interaction with the POS device. Existing checkout experiences require a customer to interact with an employee and/or POS device, thereby introducing friction into such transactions.

BRIEF DESCRIPTION OF THE DRAWINGS

Features of the present disclosure, its nature and various advantages, will be more apparent upon consideration of the following detailed description, taken in conjunction with the accompanying drawings.

DETAILED DESCRIPTION

Figure 1:
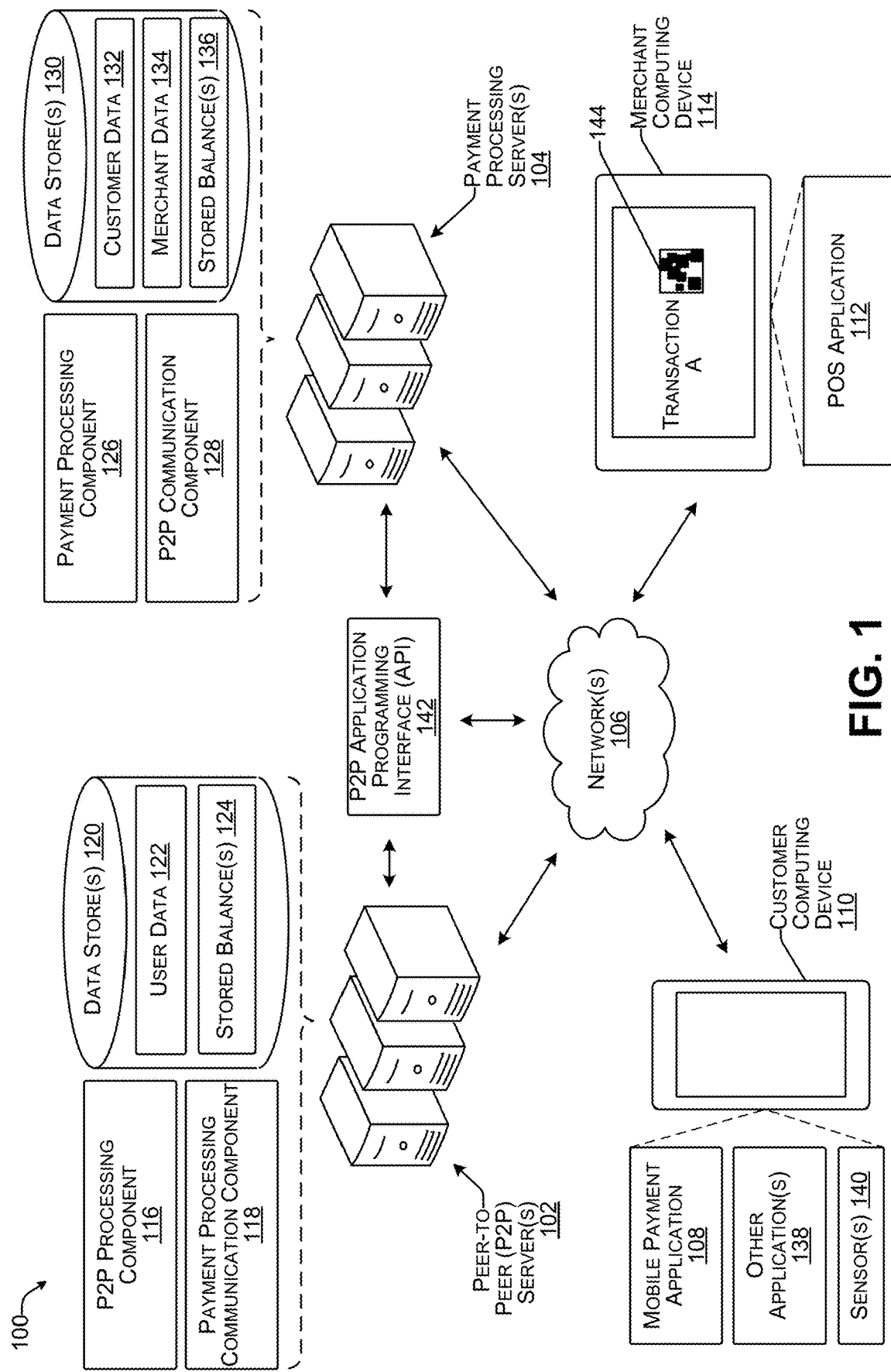
FIG. 1 illustrates an example environment within which techniques described herein can be implemented.

Techniques for performing contactless payments, via integration of peer-to-peer (P2P) payment, or other payment making, platform(s) and payment processing platform(s), are described herein. In an example, such an integration can enable a customer to participate in a transaction via their own computing device instead of interacting with a point-of-sale (POS) device of a merchant.

In such an example, a POS application, associated with a payment processing platform and executable by the POS device of the merchant, can present a Quick Response (QR) code, or other code that can be used to identify a transaction (e.g., a transaction code), in association with a transaction between the customer and the merchant. The QR code, or other transaction code, can be provided to the POS application via an Application Programming Interface (API) associated with the P2P payment platform. In an example, the customer can utilize their own computing device to capture the QR code, or the other transaction code, and to provide an indication of the captured QR code, or other transaction code, to server computing device(s) associated with the P2P payment platform and/or server computing device(s) associated with the payment processing platform.

Based at least in part on the integration of the P2P payment platform and the payment processing platform (e.g., via the API), the server computing device(s) associated with each can exchange communications with each other—and with a mobile payment application associated with the P2P payment platform and/or the POS application—to process payment for the transaction using a P2P payment where the customer is a first "peer" and the merchant is a second "peer." In at least one example, the P2P payment platform can transfer funds from an account of the customer, maintained by the P2P payment platform, to an account of the merchant, maintained by the payment processing platform, thereby facilitating a contactless (P2P) payment for the transaction. That is, based at least in part on receiving an indication of which payment method a user (e.g., customer or merchant) intends to use for a transaction, techniques described herein utilize an integration between a P2P payment platform and payment processing platform (which can be a first- or third-party integration) such that a QR code, or other transaction code, specific to the transaction can be used for providing transaction details, location details, customer details, or the like to a computing device of the customer to enable a contactless (P2P) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, a merchant application and a mobile payment application, as described herein, can process a payment transaction by routing information input via the merchant application to the mobile payment application for completing a "frictionless" payment. This can be referred to as "in-application payment" and is described in more detail in U.S. Pat. No. 10,467,615, which issued on Nov. 5, 2019, the entire contents of which are incorporated by reference herein. In another example of "in-application payment," the mobile payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via a POS application, associated with a payment processing platform, on a merchant computing device. In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant computing device can present a QR code, or other transaction code, that can be associated with a P2P payment platform. The customer can use a camera associated with a customer computing device to scan, or otherwise capture, the QR code. If the customer is already associated with the P2P payment platform (e.g., has an existing account, previously onboarded, etc.), the P2P platform can provide an indication of the scanned QR code to the payment processing platform. This interaction—between the customer computing device and the QR code—can trigger communications between the P2P payment platform and the payment processing platform (e.g., via an API) to facilitate a transfer of funds from a stored balance of the customer, that is managed and/or maintained by the P2P payment platform, to a stored balance of the merchant, that is managed and/or maintained by the payment processing platform. As such, the customer can use such funds for contactless payment of the transaction. Such a payment can be structured as a P2P payment wherein the customer is the first "peer" and the payment processing platform is the second "peer." The payment processing platform can deposit funds received from the P2P payment platform in an account of the merchant to settle the transaction on behalf of the merchant. In some examples, the payment processing platform can deposit funds into an account of the merchant to settle the transaction prior to receiving funds from the P2P payment platform.

As an additional or alternative example, a customer can desire to purchase items from a merchant. When the customer approaches the merchant to check out, the merchant (e.g., a worker associated therewith) can add indications of the items to a virtual cart via a POS application, associated with a payment processing platform, on a merchant computing device. In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application can cause a text message with a resource locator (e.g., uniform resource locator (URL)) that can be associated with a P2P payment platform to be sent to the customer computing device. The customer can interact with the resource locator and, if the customer is already associated with the P2P payment platform (e.g., has an existing account, previously onboarded, etc.), the P2P payment platform can provide an indication of the interaction with the resource locator to the payment processing platform. This interaction—between the customer and the resource locator presented via the customer computing device—can trigger communications between the P2P payment platform and the payment processing platform (e.g., via an API) to facilitate a transfer of funds from a stored balance of the customer, that is managed and/or maintained by the P2P payment platform, to a stored balance of the merchant, that is managed and/or maintained by the payment processing platform. As such, the customer can use such funds for contactless payment of the transaction. As described above, such a payment can be structured as a P2P payment wherein the customer is the first "peer" and the payment processing platform is the second "peer." The payment processing platform can deposit funds received from the P2P payment platform in an account of the merchant to settle the transaction on behalf of the merchant. In some examples, the payment processing platform can deposit funds into an account of the merchant to settle the transaction prior to receiving funds from the P2P payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device to scan, or otherwise capture, the QR code. If the customer is already associated with the P2P payment platform (e.g., has an existing account, previously onboarded, etc.), the P2P platform can provide an indication of the scanned QR code to the payment processing platform. This interaction—between the customer computing device and the QR code—can trigger communications between the P2P payment platform and the payment processing platform (e.g., via an API) to facilitate a transfer of funds from a stored balance of the customer, that is managed and/or maintained by the P2P payment platform, to a stored balance of the merchant, that is managed and/or maintained by the payment processing platform. As such, the customer can use such funds for contactless payment of the transaction. Such a payment can be structured as a P2P payment wherein the customer is the first "peer" and the payment processing platform is the second "peer." The payment processing platform can deposit funds received from the P2P payment platform in an account of the merchant to settle the transaction on behalf of the merchant. In some examples, the payment processing platform can deposit funds into an account of the merchant to settle the transaction prior to receiving funds from the P2P payment platform.

As described above, techniques described herein offer improvements to conventional payment technologies. In an example, techniques described herein can enable transaction data to be sent from a POS application of a merchant computing device at a brick-and-mortar store of a merchant to a mobile payment application of a customer computing device of a customer to enable the customer to participate in a transaction via their own computing device. For instance, in a "scan to pay" example as described above, based at least in part on capturing the QR code, or other transaction code, via the customer computing device, the payment processing platform can provide transaction data to the P2P payment platform for presentation via the mobile payment application on the customer computing device. In some examples, the customer can watch items being added to their cart (e.g., via a user interface presented via the mobile payment application). As an item is added to a virtual cart by the merchant—via the POS application on the computing device of the merchant—the customer can see the item in their virtual cart on their own computing device in near-real time. In another example, the P2P payment platform can analyze transaction data as it is received to determine whether an incentive (e.g., a discount, a loyalty reward, prioritized access or booking, etc.) is applicable to the transaction and can automatically apply the incentive or send a recommendation to the mobile payment application for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the customer computing device during or after payment of the transaction.

In some examples, based at least in part on capturing the QR code, or other transaction code, the payment processing platform can provide transaction data to the P2P payment platform for presentation via the mobile payment application on the computing device of the customer to enable the customer to complete the transaction via their own computing device. In some examples, in response to receiving an indication that the QR code, or other transaction code, has been captured or otherwise interacted with via the customer computing device, the P2P payment platform can determine that the customer authorizes payment of the transaction using funds associated with a stored balance of the customer that is managed and/or maintained by the P2P payment platform. Such authorization can be implicit such that the interaction with the transaction code can imply authorization of the customer. In some examples, in response to receiving an indication that the QR code, or other transaction code, has been captured or otherwise interacted with via the customer computing device, the P2P payment platform can request authorization to process payment for the transaction using the funds associated with the stored balance and the customer can interact with the mobile payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the P2P payment platform to transfer funds to the payment processing platform to settle payment of the transaction. In such an example, the payment processing platform can be a "peer" to the customer in a P2P transaction.

In some examples, techniques described herein can enable the customer to interact with the transaction after payment for the transaction has been settled. For example, in at least one example, the payment processing platform can cause a total amount of a transaction to be presented via a user interface associated with the mobile payment application such that the customer can provide gratuity, feedback, loyalty information, or the like, via an interaction with the user interface. In some examples, because the customer has already authorized payment via the P2P payment platform, if the customer inputs a tip, the P2P payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the mobile payment application, which can be associated with the transaction.

As described above—and also below—techniques described herein enable contactless payments. That is, by integrating the payment processing platform with the P2P payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application, payment for the transaction can be pre-authorized such that when the time comes to complete the transaction, neither the payment processing platform nor the P2P payment platform need to re-authorize payment at that time. That is, techniques described herein can enable faster, more efficient transactions. Further, in some examples, when a customer adds a tip after payment for a transaction has been settled, in some examples, because the P2P payment platform has already been authorized, the P2P payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a mobile payment application (e.g., instead of a native camera, or other sensor), techniques described herein can utilize an indication of the QR code, or other transaction code, received from the mobile payment application for two-factor authentication to enable more secure payments.

Additional technical improvements are described herein.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant computing device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the P2P payment platform as described herein (e.g., a debit card linked to a stored balance of a customer) such that when the payment instrument is caused to interact with a payment reader, the payment processing platform can exchange communications with the P2P payment platform to authorize payment for a transaction and/or provision associated transaction data to a computing device of the customer associated with the transaction.

FIG. 1 illustrates an example environment 100 within which techniques described herein can be implemented. The example environment can include server computing device(s) associated with a P2P payment platform ("P2P server(s) 102") that can communicate with server computing device(s) associated with a payment processing platform ("payment processing server(s) 104") via network(s) 106.

In at least one example, the P2P payment platform can be a platform (e.g., computing devices and/or components associated therewith) that enables users to transfer funds to one another using their own funds through an online or mobile application. While techniques described are described in the context of P2P payments, techniques described herein can be performed by any payment making platform. In at least one example, the P2P payment platform can be associated with a mobile payment application 108. An instance of the mobile payment application 108 can be executable by a computing device of a customer ("customer computing device 110"). In at least one example, the P2P payment platform can communicate with instances of the mobile payment application 108 (or other access points) to facilitate P2P transactions. Additional details associated with the P2P payment platform are described below.

In at least one example, the payment processing platform can be a platform (e.g., computing devices and/or components associated therewith) that can process payments for transactions between customers and merchants associated with the payment processing platform. Such merchants can offer items (e.g., goods, services, etc.) for sale, or other means of acquisition, via brick-and-mortar stores, online stores, combinations of the forgoing, or the like. In some examples, the payment processing platform can be an intermediary payment processing platform (or an aggregator) such that the payment processing platform can receive requests to process payments for transactions from different merchants and can interact with payment services (e.g., acquirer(s), issuer(s), card payment network(s), P2P network(s), etc.) to process the payments. In at least one example, the payment processing platform can be associated with a POS application 112. An instance of the POS application 112 can be executable by a computing device of a merchant ("merchant computing device 114").

In some examples, the P2P payment platform and the payment processing platform can be associated with a same service provider (e.g., first-party integration). In some examples, the P2P payment platform can be associated with a different service provider than the payment processing platform (i.e., third-party integration). In some examples, the payment processing platform can be associated with a different service provider than the P2P payment platform (i.e., third-party integration). Techniques described herein are directed to integrating the P2P payment platform with the payment processing platform to facilitate contactless payments.

In at least one example, the P2P server(s) 102 can include a P2P processing component 116 and a payment processing communication component 118. In at least one example, the P2P processing component 116 and/or the payment processing communication component 118 can be functional components that are executable by processor(s) associated with the P2P server(s) 102. In some implementations, functional components can comprise instructions or programs that are executable by the processor(s) and that, when executed, implement operational logic for performing the actions and services attributed above to the P2P server(s) 102 and/or P2P payment platform.

In at least one example, the P2P processing component 116 can receive requests to transfer funds between users, which can be called "peers," of the P2P payment platform. In at least one example, a request can include a first user identifier, associated with a payee (i.e., user requesting funds from another user), and a second user identifier, associated with payor (i.e., user from whom funds are being requested by another user). In such an example, the P2P processing component 116 can cause a request for funds to be presented on a computing device of the payor and, based at least in part on receiving an authorization to transfer the requested funds, the P2P processing component 116 can transfer funds from a first account of the payor to a second account of the payee. That is, in at least one example, a first user (e.g., payee) can request a payment from a second user (e.g., payor) and the P2P processing component 116 can fulfill such a request.

In an additional or alternative example, a request can include a first user identifier, associated with a payor (i.e., user sending funds to another user) and a second user identifier, associated with a payee (i.e., user receiving funds from another user). In such an example, the P2P processing component 116 can cause a request to accept funds to be presented on a computing device of the payee and, based at least in part on receiving an authorization to transfer the requested funds, the P2P processing component 116 can transfer funds from a first account of the payor to a second account of the payee. That is, in at least one example, a first user (e.g., payor) can send a payment to a second user (e.g., payee) and the P2P processing component 116 can fulfill such a request.

In at least one example, funds received from other users can be associated with an account of a user, in a stored balance that can be managed and/or maintained by the P2P payment platform. That is, funds received from other users can be added (e.g., credited) to a stored balance. In at least one example, funds sent to other users can be removed (e.g., debited) from the stored balance. The P2P processing component 116 can manage a ledger to determine a balance associated with such a stored balance. In some examples, funds associated with the stored balance can be accessed via a linked debit card, a P2P payment, or a deposit into a linked bank account of the user.

In some examples, the P2P processing component 116 can track individual transactions between users and can enable users to view their transaction history via a user interface that can be presented by an instance of the mobile payment application 108. Further, in some examples, the P2P processing component 116 can access stored loyalty data, incentive data, and/or the like for use with the P2P payment platform, as described herein. Additional functionality associated with the P2P processing component 116 is described below.

In at least one example, the payment processing communication component 118 can enable the P2P server(s) 102 to transmit data and receive data from the payment processing server(s) 104, as described herein. That is, communications between the P2P server(s) 102 and the payment processing server(s) 104 can be transmitted via the payment processing communication component 118.

In at least one example, the P2P server(s) 102 can include data store(s) 120, which can store, manage, and/or update data, including, but not limited to, user data 122 and stored balance(s) 124.

In at least one example, user data 122 can include, but is not limited to, user information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc. In some examples, the user data 122 can be partitioned into user profiles, wherein data associated with a particular user is associated with a particular user profile. In at least one example, a stored balance, as described below, can be mapped to, or otherwise associated with, such a user profile.

In at least one example, the stored balance(s) 124 can be accounts, associated with balances, that are managed and/or maintained by the P2P payment platform. Individual of the stored balance(s) 124 can be mapped to, or otherwise associated with, individual user(s) associated with the P2P payment platform. In at least one example, a stored balance can include a balance that reflects funds received, by a user, from other users and funds sent, by the user, to other users of the P2P payment platform, as described above.

In at least one example, the payment processing server(s) 104 can include a payment processing component 126 and a P2P communication component 128. In at least one example, the payment processing component 126 and the P2P communication component 128 can be functional components that are executable by processor(s) associated with the payment processing server(s) 104. In some implementations, functional components can comprise instructions or programs that are executable by the processor(s) and that, when executed, implement operational logic for performing the actions and services attributed above to the payment processing server(s) 104 and/or the payment processing platform.

In at least one example, the payment processing component 126 can process payments for transactions on behalf of merchants associated with the payment processing platform. In at least one example, the payment processing component 126 can receive transaction data associated with a transaction between a merchant and a customer. In some examples, the payment processing component 126 can receive payment data associated with a payment instrument and can process payment for the transaction based at least in part on the transaction data and the payment data. In some examples, the payment data can be associated with a debit card or credit card and the payment processing component 126 can exchange data with associated acquirer(s), issuer(s), and/or card payment network(s) to process payment for the transaction. In some examples, the payment data can be associated with a stored balance managed and/or maintained by a P2P payment platform. In such an example, the payment processing component 126 can exchange data with the P2P payment platform to process payment for the transaction. Additional details are provided below.

In at least one example, funds received as payment for the transaction, or a portion thereof (e.g., less processing fees or the like), can be associated with an account of the merchant, in a stored balance that can be managed and/or maintained by the payment processing platform. That is, funds received from a payment service and/or P2P payment platform can be added (e.g., credited) to a stored balance. In at least one example, funds withdrawn (e.g., via a deposit into a linked bank account of the merchant, via a purchase using a linked debit card, or the like) can be removed (e.g., debited) from the stored balance. The payment processing component 126 can manage a ledger to determine a balance associated with such a stored balance. In some examples, funds associated with the stored balance can be accessed via a linked debit card, a deposit into a linked bank account of the merchant, or the like.

Additional functionality associated with the payment processing component 126 is described below.

In at least one example, the P2P communication component 128 can enable the payment processing server(s) 104 to transmit data and receive data from the P2P server(s) 102, as described herein. That is, communications between the P2P server(s) 102 and the payment processing server(s) 104 can be transmitted via the P2P communication component 128.

In at least one example, the payment processing server(s) can include data store(s) 130, which can store, manage, and/or update data, including, but not limited to, customer data 132, merchant data 134, and stored balance(s) 136.

Customer data 132 can include, but is not limited to, customer information (e.g., name, phone number, address, banking information, etc.), customer preferences (e.g., learned or customer-specified), purchase history data (e.g., identifying one or more items purchased (and respective item information), payment instruments used to purchase one or more items (which can include P2P payment transactions), returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc. In some examples, the customer data 132 can be partitioned into customer profiles, wherein data associated with a particular customer is associated with a particular customer profile. In at least one example, P2P user information (e.g., alphanumeric identifier, or the like) can be mapped to, or otherwise associated with, such a customer profile.

Merchant data 134 can include, but is not limited to, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. In some examples, the merchant data 134 can be partitioned into merchant profiles, wherein data associated with a particular merchant is associated with a particular merchant profile. A merchant profile can securely store bank account information as provided by the merchant. Further, the merchant profile can store payment information associated with a payment instrument linked to a stored balance of the merchant, such as a stored balance maintained by the payment processing platform. In at least one example, P2P user information (e.g., alphanumeric identifier, or the like) can be mapped to, or otherwise associated with, such a merchant profile.

In at least one example, the stored balance(s) 136 can be accounts, associated with balances, that are managed and/or maintained by the payment processing platform. Individual of the stored balance(s) 124 can be mapped to, or otherwise associated with, individual merchant(s) associated with the payment processing platform. In at least one example, a stored balance can include a balance that reflects funds received from payments of transactions processed by the payment processing platform, as described above.

In at least one example, the customer computing device 110 can include an instance of the mobile payment application 108, and one or more other applications ("other application(s) 138"). That is, for the purpose of this discussion, a customer can be a "user" of the P2P payment platform that can conduct transactions with other "users," which can include the payment processing platform/merchant.

In some examples, an instance of a mobile payment application 108 can run on (e.g., is executable by) the customer computing device 110. In at least one example, the instance of the mobile payment application 108 can be an instance of a software application downloadable via an application store. In some examples, functionality associated with the mobile payment application 108 can be accessed via the customer computing device 110 via an instant application, or a portion of the mobile payment application 108, that can be downloaded to the customer computing device 110 for performing the functionality. Such functionality (i.e., of the instant application) can be less than the full functionality of the mobile payment application 108. As described above, the mobile payment application 108 can comprise an installed application, or portion thereof, however, in an additional or alternative example, the mobile payment application 108 can be an authenticated or unauthenticated application on a web browser. That is, in at least one example, the instance of the mobile payment application 108 can be accessible via a web browser on the customer computing device 110. In some examples, once a user has accessed or registered with the mobile payment application 108, a web browser can remember associated credentials for subsequent customer visits (for example, through web browser authentication, web cookies, web history, etc.)

allowing the customer to access the mobile payment application 108 without logging-in to an account of the customer.

In at least one example, the instance of the mobile payment application 108 can present one or more user interfaces to enable a user associated therewith, such as the customer, to send or receive funds from other users of the P2P payment platform, such as the payment processing platform/merchant. Furthermore, in at least one example, the instance of the mobile payment application 108 can present one or more user interfaces to enable the user associated therewith, such as the customer, to interact with the P2P payment platform, and in some examples, as described herein, participate in a contactless payment transaction.

In at least one example, the customer computing device 110 can be associated with other application(s) 138, which can include other mobile payment applications that can be associated with other P2P payment platforms and can be used for processing payments of transactions as described herein. In some examples, the other application(s) 138 can include e-commerce applications that are associated with one or more merchant platforms and can be used by the customer to purchase products or services. The other application(s) 138 can also be websites, forums, uniform resource locator(s) (URLs), application program interfaces (APIs), or any source website or application that either hosts a description of an item and/or provides an option to buy an item. The other application(s) 138 can be associated with application(s) providing additional or alternative functionality.

In at least one example, the customer computing device 110 can be associated with one or more sensors ("sensor(s) 140"), which can include a camera, a barcode/QR code reader, a near-field communication (NFC) reader, an accelerometer, a gyroscope, a magnetometer, a global proximity system (GPS) sensor, a proximity sensor, an ambient light sensor, a microphone, touchscreen sensors, and the like. In some examples, individual of the sensor(s) 140 are native to the customer computing device 110. In some examples, individual of the sensor(s) 140 can be integrated into the mobile payment application 108 associated with the customer computing device 110 (or other application(s) associated with the customer computing device 110).

In at least one example, the merchant computing device 114 can include an instance of the POS application 112. In at least one example, an instance of a POS application 112 can run on (e.g., is executable by) the merchant computing device 114. In at least one example, the instance of the POS application 112 can be an instance of a software application downloadable via an application store. In some examples, functionality associated with the POS application 112 can be accessed via the merchant computing device 114 via an instant application, or a portion of the POS application 112, that can be downloaded to the merchant computing device 114 for performing the functionality. Such functionality (i.e., of the instant application) can be less than the full functionality of the POS application 112. As described above, the POS application 112 can comprise an installed application, or portion thereof, however, in an additional or alternative example, the POS application 112 can be an authenticated or unauthenticated application on a web browser. That is, in at least one example, the instance of the POS application 112 can be accessible via a web browser on the merchant computing device 114. In some examples, once a merchant has accessed or registered with the POS application 112, a web browser can remember associated credentials for subsequent merchant visits (for example, through web browser authentication, web cookies, web history, etc.) allowing the merchant to access the POS application 112 without logging-in into an account of the merchant.

In at least one example, the POS application 112 can configure the merchant computing device 114 as a POS terminal. In at least one example, the POS application 112 can generate transaction data associated with a transaction between a customer and a merchant. The transaction data can include item(s) to be purchased (or otherwise acquired) via the transaction, detail(s) associated with such item(s), item cost(s) associated with the item(s), a total cost of the item(s), an identifier of the merchant, an identifier of the merchant computing device 114, an identifier of the instance of the POS application 112, an identifier of the transaction, a location associated with the merchant computing device 114, a timestamp associated with the transaction, a datestamp associated with the transaction, and/or the like. In some examples, the POS application 112 can configure the merchant computing device 114 to interact with a payment reader device, which can obtain payment data, for example from a payment instrument (e.g., debit card, credit card, NFC payment instrument, etc.). The POS application 112 can send transaction data and/or payment data to the payment processing server(s) 104 for processing payments for transactions.

In at least one example, techniques described herein can be facilitated via an API, such as a P2P API 142. That is, in at least one example, the "integration" between the P2P payment platform and the payment processing platform can be facilitated, in part, to the P2P API 142. The P2P API 142 can enable communications between the P2P payment platform and the payment processing platform. Additional details are provided below with reference to FIGS. 2A and 2B. In at least one example, the POS application 112 can receive a transaction code 144, such as a barcode, a QR code, a unique identifier, or the like via the P2P API 142. In at least one example, the POS application 112 can cause the transaction code 144 to be presented via a display of the merchant computing device 114 in association with a transaction between a customer and the merchant. For instance, in some examples, the transaction code 144 can be presented via a customer-facing display of a multi-device merchant computing device 114 (e.g., a merchant computing device including a customer-facing display coupled to a merchant-facing display), a rotatable display associated with the merchant computing device 114, a connectable device and/or display associated with the merchant computing device 114 (e.g., which may be integrated with a third-party merchant application or the POS application 112 via an API or the like), or the like. In such an example, a customer can use the sensor(s) 140 associated with the customer computing device 110 to interact with the transaction code 144. For instance, one of the sensor(s) 140 can be a camera and the customer can capture an image of a QR code. Through a series of communications, described below, the merchant and the customer can participate in a contactless payment for the transaction. In such an example, the merchant and the customer can be "users" or "peers" of the P2P payment platform and the P2P payment platform and the payment processing platform can perform techniques as described herein to process the contactless payment for the transaction.

In some examples, instead of presenting the transaction code 144 via the merchant computing device 114 at a brick-and-mortar store, the transaction code 144 can be presented via an online store of the merchant (e.g., in association with an ecommerce web page or the like). In such an example, operations described herein as being performed by the POS application 112 can be performed by another component on a client computing device. Furthermore, in at least one example, instead of the transaction code 144 being presented via the merchant computing device 114, the merchant can send a request, via the POS application 112 and techniques described herein, to the P2P server(s) 102 for a total amount of the transaction to be paid via a stored balance of the customer. In such an example, the request can be associated with a customer identifier (e.g., an alphanumeric identifier or the like) that is associated with the stored balance and the P2P processing component 116 can cause funds to be transferred from the stored balance of the customer, managed and/or maintained by the P2P payment platform, to the payment processing server(s) 104 for depositing in a stored balance associated with the merchant. In yet another example, the merchant can request, via the POS application 112, for a transaction code to be sent to the customer computing device 110. In such an example, the request can be associated with a customer identifier indicating where the transaction code is to be sent. In such an example, the P2P processing component 116 can cause a transaction code to be sent to the customer computing device 110 via a text message, email, in-app notification, instant application, or the like. In at least one example, as described below, the customer can interact with the transaction code (e.g., in lieu of a scan, capture, or other interaction with a sensor of the customer computing device 110) to initiate communications for processing payment for the transaction, as described herein.

Additional details associated with various device(s) and/or component(s) described above with reference to the example environment 100 are described below with reference to FIGS. 17 and 18.

Figure 2A:
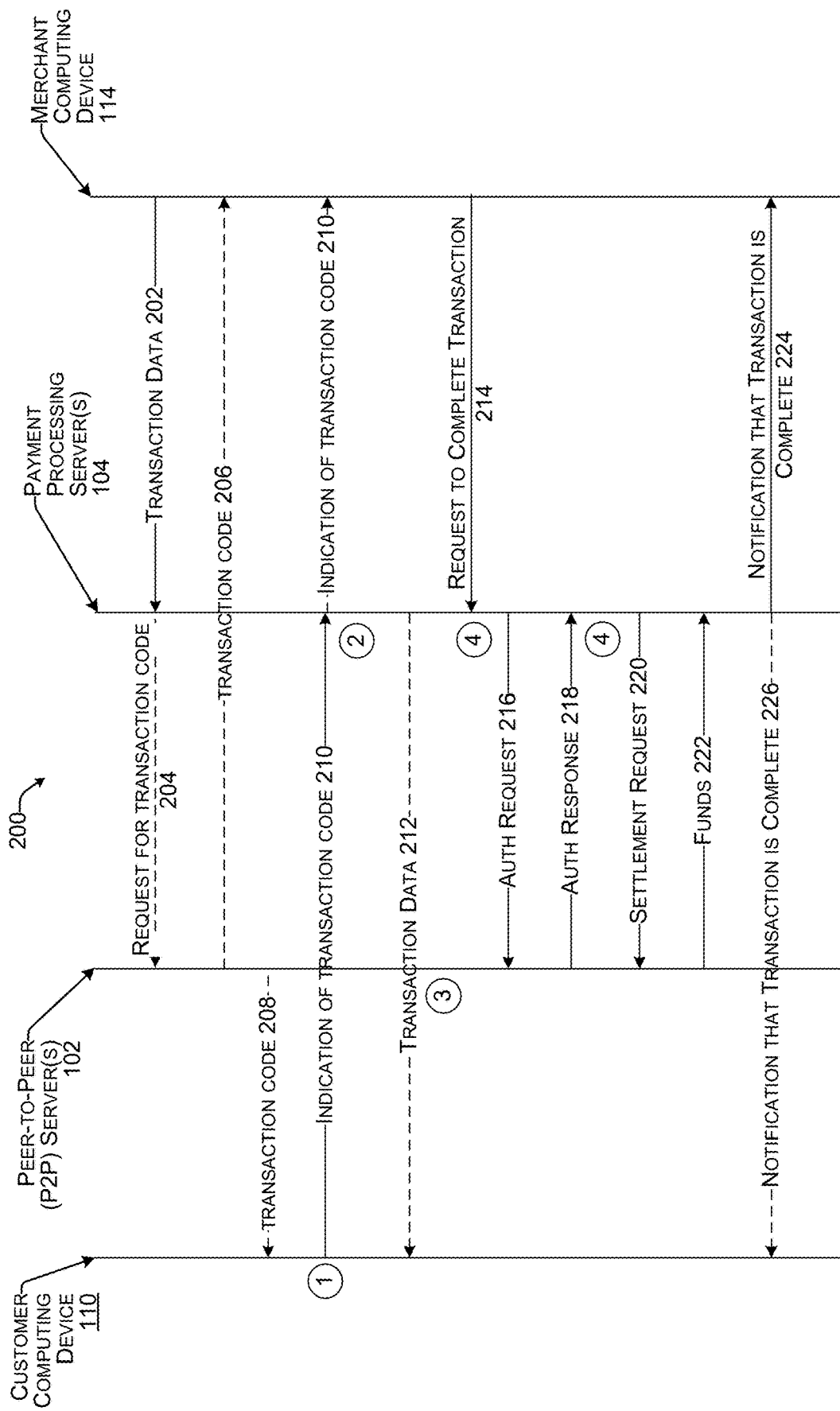
FIG. 2A illustrates an example process for processing payment for a transaction using a transaction code, as described herein.

FIG. 2A illustrates an example process 200, illustrated as a swim lane diagram, for processing payment for a transaction using a transaction code, as described herein. Components of the example environment 100 (e.g., the customer computing device 110, the P2P server(s) 102, the payment processing server(s) 104, and the merchant computing device 114) are represented by vertical lines. In at least one example, horizontal lines shown as originating from or terminating at a line corresponding to a particular component can represent communications sent from or received by the particular component. Additional details are provided below.

In at least one example, the POS application 112, on the merchant computing device 114, can generate transaction data associated with a transaction between a merchant and a customer. In at least one example, the POS application 112 can send the transaction data (e.g., via a transaction data communication 202) to the payment processing server(s) 104. In some examples, the transaction data can be sent to the payment processing server(s) 104 in near-real time. That is, as new transaction data is generated, such transaction data can be sent to the payment processing server(s) 104. In some examples, the transaction data can be sent in batches, at a particular frequency, after a lapse of a period of time, responsive to a condition being satisfied (e.g., a total cost of a transaction satisfying a threshold, a request to complete a transaction being received, etc.), or the like. In some examples, a portion of transaction data can be sent to the payment processing server(s) 104. In some examples, the portion of transaction data can correspond to an "event" (e.g., a new item added to a cart, etc.), etc. and such "event data" can be sent to the payment processing server(s) 104 on a per-event basis. In some examples, the payment processing component 126 can receive the transaction data from the POS application 112. In some examples, the payment processing component 126 can store the transaction data (e.g., in a data structure associated with the transaction). In at least one example, the transaction data communication 202 can be associated with a request for a transaction code to present via a user interface of the merchant computing device 114.

In some examples, the payment processing component 126 can send a request 204 for a transaction code to the P2P server(s) 102. In some examples, such a request 204 can be sent based at least in part on receiving the transaction data (and thus an indication of a new transaction) and/or a request received from the POS application 112. In at least one example, the P2P processing component 116 can receive the request 204 and, in some examples, can generate a transaction code based at least in part on the transaction data received from the payment processing component 126. That is, in some examples, a transaction code can be dynamic and, thus, specific to a transaction.

As described above, the transaction code can be any identifier encoded with information, such as a QR code, a barcode, a unique identifier, any other interactive code, or the like. In some examples, a transaction code can be a radio-frequency identifier (RFID) tag or other physical identifier that can be provided to the merchant. In some examples, the transaction code can be associated with data that can be associated with a resource locator (e.g., a URL) associated with a location (e.g., internet address) of the P2P payment platform and/or a deep link to the mobile payment application 108. In some examples, the transaction code can be specific to the transaction as it can be generated based at least in part on the transaction data and/or an indication of the transaction. That is, in some examples, the transaction code can be dynamically generated. However, in some examples, a transaction code can be particular to a merchant and may not be based on transaction data received from the payment processing server(s) 104. That is, in some examples, the transaction code can be static. In examples where the transaction code is static, the request 204 may be optional. In such examples, the payment processing component 126 can return a static transaction code that is associated with the merchant when a request for a transaction code is received (e.g., for presentation via a user interface of the merchant computing device 114).

In at least one example, the P2P processing component 116 can send the transaction code (e.g., via a transaction code communication 206) to the merchant computing device 114, via the payment processing component 126. In at least one example, the P2P processing component 116 can provide the transaction code via the P2P API 142, as described below with reference to FIG. 2B. In such an example, the payment processing component 126 can receive the transaction code from the P2P server(s) 102, via the P2P API 142, and can send the transaction code to the merchant computing device 114. In at least one example, the POS application 112 can receive the transaction code directly from the P2P server(s) 102, via the P2P API 142 (e.g., without the payment processing server(s) 104 having first received it).

In at least one example the POS application 112 can receive the transaction code and can cause the transaction code to be presented via a user interface. In at least one example, the transaction code can be presented via cart building user interface presented by the POS application 112. That is, the transaction code can be presented via the user interface while the merchant is adding one or more items to a virtual cart (e.g., a data structure associated with one or more items (e.g., goods, services, etc.) that a customer intends to purchase, or otherwise acquire, from a merchant) associated with the transaction. In some examples, the card building user interface can be presented prior to a payment selection user interface being presented. That is, in some examples, the transaction code can be presented prior to a payment selection user interface presented by the POS application 112. In an additional or alternative example, the transaction code can be presented in association with a payment selection user interface presented by the POS application 112. In some examples, the transaction code can be presented via a user interface associated with the POS application 112, for example with a completed transaction user interface (e.g., a user interface that presents information indicating a transaction is complete), a digital receipt user interface (e.g., a user interface that presents information associated with the transaction, payment, and the like), a loyalty user interface (e.g., a user interface for imputing loyalty information), a feedback user interface (e.g., a user interface for inputting feedback), or the like.

In some examples, instead of sending the transaction code to the payment processing server(s) 104, and ultimately the merchant computing device 114, the P2P processing component 116 can send the transaction code to the customer computing device 110 (e.g., via a transaction code communication 208). In some examples, the transaction code can be sent to the customer computing device 110 as a text message, email, in-app notification (e.g., presented via the mobile payment application 108), instant application, or the like. In such an example, instead of sending a request for a transaction code, the request 204 can be a request to send a transaction code to the customer computing device 110. In such an example, the request 204 can include customer contact information and/or type (e.g., phone number, alphanumeric/unique identifier, email address, etc.) and/or another customer identifier so that the P2P processing component 116 knows where to send the transaction code.

In an example where the transaction code is provided to the merchant computing device 114, the customer can cause an interaction between the customer computing device 110 and the transaction code. In at least one example, the interaction can provide an authorization by the customer that funds associated with their stored balance managed and/or maintained by the P2P payment platform are to be used for payment of the transaction. In some examples, the customer can utilize the sensor(s) 140 associated with the customer computing device 110 to capture an image or obtain data associated with the transaction code. For instance, if the transaction code is a QR code, a camera associated with the customer computing device 110 can capture an image of the QR code. In an example where the transaction code comprises an RFID tag, a NFC reader device can read data associated with the RFID tag via an interaction between the customer computing device 110 and the RFID tag (e.g., by bringing the customer computing device 110 within a threshold distance of the RFID tag such that the NFC reader can read the data associated therewith). In some examples, the sensor used to capture the image or otherwise obtain data associated with the transaction code can be native to the customer computing device 110. In some examples, the sensor used can be integrated into the mobile payment application 108. In some examples, if the sensor is a native sensor, the P2P processing component 116 can send a request to the customer computing device 110 requesting the customer confirm that they intend to use the P2P payment platform for payment of the transaction.

In at least one example, based at least in part on detecting an interaction between the customer computing device 110 and the transaction code, the customer computing device 110 can determine whether the customer computing device 110 is associated with the mobile payment application 108 (e.g., whether the mobile payment application 108 is downloaded thereon), as illustrated by the encircled number one. If the customer computing device 110 already has the mobile payment application 108 downloaded thereon, the customer computing device 110 can open the mobile payment application 108 and send an indication 210 of the interaction via the mobile payment application 108 to the P2P server(s) 102. If the customer computing device 110 does not have the mobile payment application 108 downloaded thereon, the customer computing device 110 can nevertheless cause functionality associated with the mobile payment application 108 to be availed via the customer computing device 110. In some examples, the P2P processing component 116 can request information associated with the customer prior to sending the indication 210. Additional details are described below with reference to FIG. 3.

In an example where the transaction code is provided to the customer computing device 110, the customer computing device 110 can detect an interaction with the transaction code via a user interface of the customer computing device 110. In at least one example, based at least in part on detecting an interaction with the transaction code, the customer computing device 110 can determine whether the customer computing device 110 is associated with the mobile payment application 108 (e.g., whether the mobile payment application 108 is downloaded thereon), as illustrated by the encircled number one. If the customer computing device 110 already has the mobile payment application 108 downloaded thereon, the customer computing device 110 can open the mobile payment application 108 and send an indication 210 of the interaction via the mobile payment application 108 to the P2P server(s) 102. If the customer computing device 110 does not have the mobile payment application 108 downloaded thereon, the customer computing device 110 can nevertheless cause functionality associated with the mobile payment application 108 to be availed via the customer computing device 110. In some examples, the P2P processing component 116 can request information associated with the customer prior to sending the indication 210. Additional details are described below with reference to FIG. 3.

In at least one example, the P2P server(s) 102 can receive the indication 210 of the interaction. In at least one example, the indication 210 can provide an indication that the customer approves the merchant as a payee in the P2P transaction to be facilitated by the P2P server(s) 102 and the payment processing server(s) 104. In examples where the mobile payment application 108 is installed on the customer computing device 110, the mobile payment application 108 can send the indication 210 (e.g., of the interaction between the customer computing device 110 and the transaction code) to the payment processing server(s) 104 (via the P2P server(s) 102). In at least one example, the P2P processing component 116 can send the indication 210 of the transaction code to the payment processing server(s) 104. In at least one example, the payment processing server(s) 104 can receive the indication 210 and can send the indication 210 to the merchant computing device 114. That is, in at least one example, the payment processing component 126 can send the indication 210 to the POS application 112. In at least one example, in response to receiving the indication 210 of the transaction code, the POS application 112, can terminate the presentation of the transaction code via the user interface of the merchant computing device 114.

In some examples, as illustrated at the encircled number two, the payment processing component 126 can compare received transaction data with context data associated with the indication 210 of the interaction with the transaction code to determine, or confirm, an association between the customer and the transaction. Additional details are described below with reference to FIG. 5.

In at least one example, based at least in part on receiving the indication 210 of the interaction, the payment processing component 126 can send at least a portion of the transaction data to the customer computing device 110 (e.g., via a transaction data communication 212). That is, in at least one example the payment processing component 126, can send at least a portion of the transaction data to the P2P processing component 116. In at least one example, the P2P processing component 116 can send the portion of the transaction data to the mobile payment application 108 for presentation via a user interface associated therewith. In at least one example, when the portion of transaction data is sent in association with cart building, indications of one or more items added to a virtual cart of the customer can be presented via cart building user interface presented by the mobile payment application 108. In some examples, the cart building user interface can be updated in near-real time, such that as an item is added to a virtual cart via the POS application 112, an indication of the item can be presented via a cart building interface presented by the mobile payment application 108.

In some examples, as the P2P processing component 116 receives transaction data, the P2P processing component 116 can analyze the transaction data to determine whether an incentive applies. Such a process, illustrated by the encircle number three, is described in more detail below with reference to FIG. 7.

In at least one example, the POS application 112 can send a request 214 to complete the transaction to the payment processing server(s) 104. In at least one example, the merchant can provide an input via a cart building user interface presented by the POS application 112 to indicate that the transaction is complete. In such an example, the POS application 112 can send the request 214 to complete the transaction to the payment processing component 126. That is, in at least one example, because the customer already interacted with the transaction code (e.g., via the merchant computing device 114 or the customer computing device 110), the payment processing component 126 can receive the request 214 to complete the transaction and can use the P2P payment platform for processing payment for the transaction. In at least one example, the payment processing component 126 can perform a risk analysis to determine whether to proceed with processing payment for the transaction, as illustrated by the encircled number four. Additional details are described below with reference to FIG. 10.

In at least one example, so long as a level of risk determined to be associated with the customer, the merchant, and/or the transaction is below a threshold, the payment processing component 126 can send an authorization request 216, via the P2P communication component 128, to the P2P server(s) 102. In at least one example, the P2P processing component 116 can receive the authorization request 216 via the payment processing communication component 118 and can determine whether to approve or deny the authorization request 216 based at least in part on transaction data received from the payment processing platform and/or a stored balance of the customer managed and/or maintained by the P2P payment platform. The P2P processing component 116 can send an authorization response 218 to the authorization request 216, which can be received by the payment processing server(s) 104 (e.g., the payment processing component 126). In least one example, if the stored balance associated with the customer is greater than, or equal to, the total cost of the transaction, the payment processing component 126 can send an authorization response 218 to the payment processing component 126. In some examples, the stored balance associated with the customer may be less than the total cost of the transaction. In at least one example, the P2P processing component 116 can authorize at least a portion of the cost of the transaction. In such an example, the P2P processing component 116 can send an authorization response 218 to the payment processing server(s) 104 indicating that at least the portion of the total cost of the transaction is approved. In some examples, even if the stored balance has insufficient funds, the P2P processing component 116 can still authorize the payment if the stored balance is linked to another payment source (e.g., a debit card or external bank account). However, while not shown in FIG. 2A, in some examples, if the stored balance is less than the total cost of the transaction or any portion of the total cost of the transaction, the P2P server(s) 102 can send an authorization response 218 to the payment processing server(s) 104 indicating that the payment is denied.

In at least one example, based at least in part on receiving the authorization response 218 from the P2P server(s) 102, and based at least in part on the authorization response 218 indicating that a payment for at least a portion of the total cost of the transaction is authorized, the payment processing component 126 can send a settlement request 220 to the P2P server(s) 102. In some examples, the payment processing component 126 can perform an additional or alternative risk analysis prior to sending the settlement request, as illustrated by the encircled number four. In at least one example, based at least in part on receiving the settlement request 220 from the payment processing server(s) 104, the P2P processing component 116 can access funds associated with the stored balance of the customer. The P2P processing component 116 can transfer the funds 222 from the P2P payment platform to the payment processing platform. That is, the P2P server(s) 102 can transfer funds 222, equal to at least a portion of the total cost of the transaction, from the stored balance of the customer to the payment processing server(s) 104 for depositing into a stored balance of the merchant. In such an example, the payment processing component 126 can receive the funds 222 and deposit at least a portion of the funds 222 into a stored balance of the merchant managed and/or maintained by the payment processing platform. In some examples, the payment processing component 126 can deposit the funds 222 into the stored balance of the merchant prior to receiving the funds 222 from the P2P server(s) 102. The P2P server(s) 102 can transfer the funds 222 to the payment processing server(s) 104, at which time, the payment processing component 126 can "repay" the payment processing platform for the funds 222 paid to the merchant.

In some examples, the payment processing component 126 can receive funds in real-time. In some examples, funds can be batch transferred from the P2P server(s) 102 to the payment processing server(s) 104 such that the batch, or otherwise grouped transfer, is associated with payments for transactions of multiple, different merchants. In such examples, the funds 222 can be associated with a transaction identifier and/or merchant identifier to indicate which stored balance the funds 222 are to be deposited. In some examples where the funds 222 may be transferred at a time after payment for a transaction is complete, the funds can be added (e.g., credited) to the stored balance of the merchant prior to the payment processing server(s) 104 actually receiving the funds.

In at least one example, based at least in part on payment for the transaction being complete, the payment processing component 126 can send a notification 224 that the transaction is complete to the POS application 112 and/or can send a notification 226 that the transaction is complete to the mobile payment application 108, via the P2P server(s) 102. In at least one example, the POS application 112 can present a user interface indicating that the transaction is complete. In at least one example, the mobile payment application 108 can present a user interface indicating that the transaction is complete. In some examples, the mobile payment application 108 can present a user interface to enable the customer to provide a gratuity (e.g., a tipping user interface), loyalty information, feedback, and/or the like. Additional details are provided below.

Figure 2B:
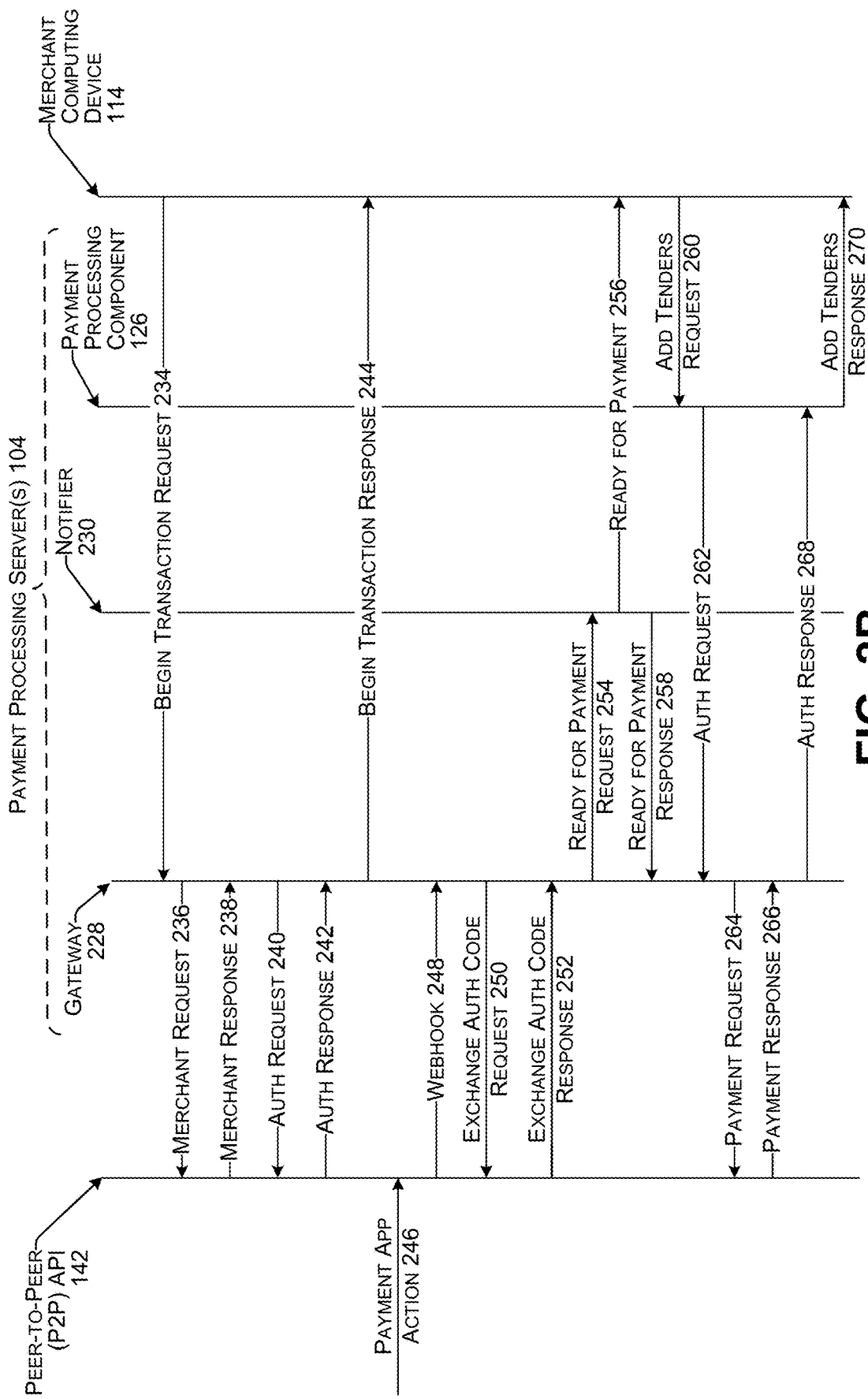
FIG. 2B illustrates additional details associated with the example process described above with reference to FIG. 2A

FIG. 2A illustrates a process 200, shown at a high-level, for processing a payment for a transaction using a P2P payment platform integrated with a payment processing platform. FIG. 2B illustrates additional details associated with one example implementation of the process 200 described above with reference to FIG. 2A. In FIG. 2B, the payment processing server(s) 104 can send one or more communications with the P2P API 142 to initiate a payment via the P2P payment platform. That is, in FIG. 2B, the payment processing server(s) 104 can set up the payment transaction with the P2P payment platform such that the P2P payment platform knows that a merchant is requesting a payment from a user (i.e., the customer) of the P2P payment platform.

FIG. 2B illustrates another swim-lane diagram with additional components that illustrates additional operations between devices and/or components of the environment 100 described above. As described above, the P2P payment platform can be integrated with the payment processing platform. In at least one example, such an integration can be achieved via an API, such as the P2P API 142. In at least one example, the P2P API 142 can exchange communications with a gateway 228, a notifier 230, and/or the payment processing component 126.

In at least one example, the gateway 228 can accept requests to provide a transaction code to a merchant computing device 114 (e.g., the POS application 112) and/or a customer computing device 110 (e.g., the mobile payment application 108). Furthermore, the gateway 228 can subscribe to webhooks, or other communications, from the P2P API 142. In some examples, the gateway 228 can send merchant information to the P2P API 142 to provide accurate and consistent data to the P2P API 142.

In some examples, the notifier 230 can be a component that avails notification services to the payment processing server(s) 104. In some examples, a merchant that desires to use techniques described herein can set up a configuration with the notifier 230 and register an application identifier (e.g., associated with the instance of the POS application 112, for example) with the notification service. In some examples, such a configuration can indicate one or more processes for providing updates to client computing devices, such as the merchant computing device 114 and/or the customer computing device 110. In at least one example, the notifier 230 can provide notifications to the merchant computing device 114 and/or the customer computing device 110 based on application identifier (e.g., identifying the instance of the POS application 112) and/or a client identifier (e.g., an identifier that the P2P payment platform can use to attribute API calls to a particular client integration).

In at least one example, the gateway 228, the notifier 230, and the payment processing component 126 can be associated with the payment processing server(s) 104. In some examples, the gateway 228, the notifier 230, and/or the payment processing component 126 can be components of the payment processing server(s) 104. In some examples, the gateway 228, the notifier 230, and/or the payment processing component 126, and/or services availed thereby, can be accessible to the payment processing server(s) 104, but may not be components of the payment processing server(s) 104.

Each of the components performing operations in FIG. 2B (e.g., the P2P API 142, the gateway 228, the notifier 230, the payment processing component 126, and the merchant computing device 114) are represented by vertical lines. In at least one example, horizontal lines shown as originating from or terminating at a line corresponding to a particular component can represent communications sent from or received by the particular component. Additional details are provided below.

In at least one example, the merchant computing device 114 can send a request 234 to begin a transaction, which can be received by the gateway 228. In some examples, the request 234 can originate from the POS application 112. In some examples, the request 234 can be associated with transaction data and/or a request for a transaction code as described above with reference to FIG. 2A (e.g., the transaction data communication 202 and/or the request 204 for a transaction code). That is, in some examples, the request 234 can be a request to retrieve a transaction code associated with authorization data corresponding to the customer (e.g., a URL, token, or the like). In some examples, the request 234 can include an application identifier (e.g., identifying the instance of the POS application 112), a client identifier (e.g., an identifier that the P2P payment platform can use to attribute API calls to a particular client integration), a transaction identifier (e.g., associated with the transaction), and/or the like.

In some examples, the request 234 can be a request to send a transaction code to a customer computing device 110. In such an example, the request 234 can be associated with a client identifier (e.g., an identifier that the P2P payment platform can use to attribute API calls to a particular client integration), a transaction identifier (e.g., associated with the transaction), customer contact information and/or type (e.g., phone number, alphanumeric/unique identifier, email address, etc.), and/or the like.

In at least one example, the gateway 228 can send a merchant request 236, to the P2P API 142, and can receive a merchant response 238 from the P2P API 142. In some examples, the merchant request 236 and merchant response 238 can be used to identify which merchant, of the various merchants associated with the payment processing platform, is associated with the transaction. That is, the merchant request 236 and the merchant response 238 can be to set up a "peer" in the P2P push-pull transaction (i.e., transfer of funds) facilitated by the P2P payment platform. Responsive to receiving the merchant response 238, the gateway 228 can send an authorization request 240 to the P2P API 142 and can receive an authorization response 242. Such an authorization request 240/response 242 can be different than the authorization request 216/response 218 of FIG. 2A in that the authorization request/response 240/242 can be to authorize access to the transaction code. Based at least in part on receiving the authorization response 242, the gateway 228 can send response 244 to the request 234 (e.g., a begin transaction response 244) to the merchant computing device 114. In at least one example, the response 244 can be associated with a transaction code, such as a QR code, barcode, or the like. That is, in some examples, the response 244 can be associated with the provisioning of the transaction code to the merchant computing device 114, as illustrated in communication 206 of FIG. 2A. In an example where the transaction code is being provided to the customer computing device 110, as illustrated in communication 208 of FIG. 2A, the response 244 can be sent to the customer computing device 110 via the P2P server(s) 102 instead of or in addition to the merchant computing device 114. In at least one example, after the gateway 228 has sent the response 244, the gateway 228 can wait and listen for an event (e.g., a payment application action 246 and/or communication (e.g., webhook) associated therewith).

In at least one example, the P2P API 142 can receive a payment application action 246, which can be an interaction with a provisioned transaction code associated with the P2P payment platform (e.g., provided to the customer computing device 110 and/or an indication of an interaction between the customer computing device 110 and the transaction code (e.g., provided to the merchant computing device 114). That is, in some examples, the indication 210 of the transaction code described above with reference to FIG. 2A can be indicative of the payment application action 246 (e.g., an interaction with the transaction code). In at least one example, the "payment application" referred to herein can be the mobile payment application 108, described above.

Based at least in part on receiving the payment application action 246, the P2P API 142 can send a webhook 248 to the gateway 228. In at least one example, the webhook 248 can be a resource locator (e.g., URL) that is accessible without authentication. In some examples, the P2P API 142 can call the webhook 248 with data describing events applicable to customer and/or customer computing device 110 actions. In some examples, the webhook 248 can obtain the authorization code from the payment application action 246 (e.g., when the customer approves the request to use the P2P payment platform for payment of the transaction by interacting with the transaction code provided to a customer computing device 110 and/or causing an interaction between the customer computing device 110 and a transaction code). That is, the webhook 248 can include authorization data received based at least in part on a customer interaction with a transaction code associated with the transaction (e.g., the customer has approved the merchant as a payee for the transaction). Based at least in part on receiving the webhook 248, the gateway 228 can send an exchange authorization code request 250 to the P2P API 142 and can receive an exchange authorization code response 252 from the P2P API 142. In at least one example, the webhook 248 can provide an authorization code that can be used for retrieving one or more tokens (e.g., access, or single-use, token and/or refresh, or multi-use, token). That is, the exchange authorization code request 250 can include the authorization code associated with the webhook 248 and the exchange authorization code response 252 can include the one or more tokens. In some examples, the gateway 228 can make a call to the mobile payment application 108 to obtain additional or alternative information associated with the customer (e.g., the customer name, alphanumeric/unique identifier, token, location information, etc.). Furthermore, in some examples, where the gateway 228 has access to refresh token (e.g., a token that was obtained via a previous authorization flow and can be used to generate a new access token), the exchange authorization code request 250 can include the refresh token, in addition to the authorization code, customer identifier, permissions, and/or the like.

After receiving the exchange authorization code response 252, the gateway 228 can then send a request 254 to the notifier 230 indicating that the P2P API 142 is ready for payment. That is, in at least one example, the event the gateway 228 is waiting and listening for is the webhook 248 and corresponding authorization (e.g., receipt of the exchange authorization code response 252). In at least one example, the request 254 can include an application identifier (e.g., identifying the instance of the POS application 112), a client identifier (e.g., an identifier that the P2P payment platform can use to attribute API calls to a particular client integration), a customer identifier (e.g., a unique identifier, such as an account number, token, etc.), a transaction identifier (e.g., associated with the transaction), an authorization code (e.g., the authorization code supplied by the webhook 248), and/or the like.

In at least one example, the notifier 230 can send a notification 256 to the merchant computing device 114 to notify the merchant computing device 114 that the gateway 228 is ready to take a payment. That is, the notification 256 can indicate that the payment state has advanced to a point where the merchant computing device 114 (e.g., the POS application 112) can begin a payment for a transaction. In at least one example, the notification 256 can be associated with customer data including, but not limited to, a customer identifier. In at least one example, the notifier 230 can also send a response 258 to the gateway 228, indicating that the notifier 230 sent the notification 256 to the merchant computing device 114.

It should be noted that, in some examples, the merchant computing device 114 can proceed without receiving the notification 256 (e.g., in an online/ecommerce example). In such an example, the merchant computing device 114 can complete approval on a web page (e.g., a online store of a merchant/ecommerce web page) and a callback can be returned to the merchant computing device 114 which can include an authorization code, such as the authorization code received with the exchange authorization code response 252. In such an example, the transaction can proceed without receiving the notification 256, so long as the authorization code is associated with a request such as the add tenders request 260 or another similar request. In such an example, the gateway 228 can receive the authorization code associated with such a request and exchange the authorization code for one or more tokens (e.g., access, etc.) for completing payment for the transaction.

In at least one example, the merchant computing device 114 can send a request (e.g., the add tenders request 260) to initialize processing payment of a transaction to the payment processing component 126. In some examples, the add tenders request 260 can be associated with the request to complete the transaction 214, in FIG. 2A. In at least one example, the add tenders request 260 can be associated with an authorization code (e.g., provided via the response 252), an identifier associated with the transaction, an identifier associated with the customer (e.g., phone number, email address, or alphanumeric/unique identifier), a name of the customer, and/or other data associated with the customer. The payment processing component 126 can receive the add tenders request 260 and can send an authorization request 262 to authorize payment of the transaction to the gateway 228. The gateway 228 can send a payment request 264 to the P2P API 142, and the P2P API 142 can send a payment response 266 to the gateway 228. In at least one example, the authorization request 216, of FIG. 2A, can comprise the authorization request 262 and the payment request 264. Based at least in part on receiving the payment response 266, the gateway 228 can send an authorization response 268 to the payment processing component 126. In at least one example, the authorization response 218, of FIG. 2A, can comprise the payment response 266 and the authorization response 268. The payment processing component 126 can then send a response (e.g., an add tenders response 270) to the add tenders request 260 to the merchant computing device 114. In at least one example, when the payment processing component 126 captures funds, the access token can be associated with the settlement request, such as the settlement request 220, described above with reference to FIG. 2A.

While FIGS. 2A and 2B reference a transfer of funds from the P2P payment platform to the payment processing platform, in some examples, the P2P processing component 116 can transfer funds to an external bank account of the merchant.

In some examples, a different endpoint can perform operations as described as being performed by the merchant computing device 114 in FIGS. 2A and 2B. In an example where such an endpoint is another client device, such as a customer computing device from which a customer is browsing an online store/ecommerce web page of a merchant and the transaction code is presented via the online store/ecommerce web page, the ready for payment notification 256 can be sent from the notifier 230 and/or the payment processing server(s) 104 to server(s) of the merchant and/or ecommerce server(s) associated with the merchant, and associated with a web browser from which the online store/ecommerce web page is being presented. In such an example, the communications described in FIG. 2B can be exchanged to facilitate a P2P payment as described herein.

Figure 3:
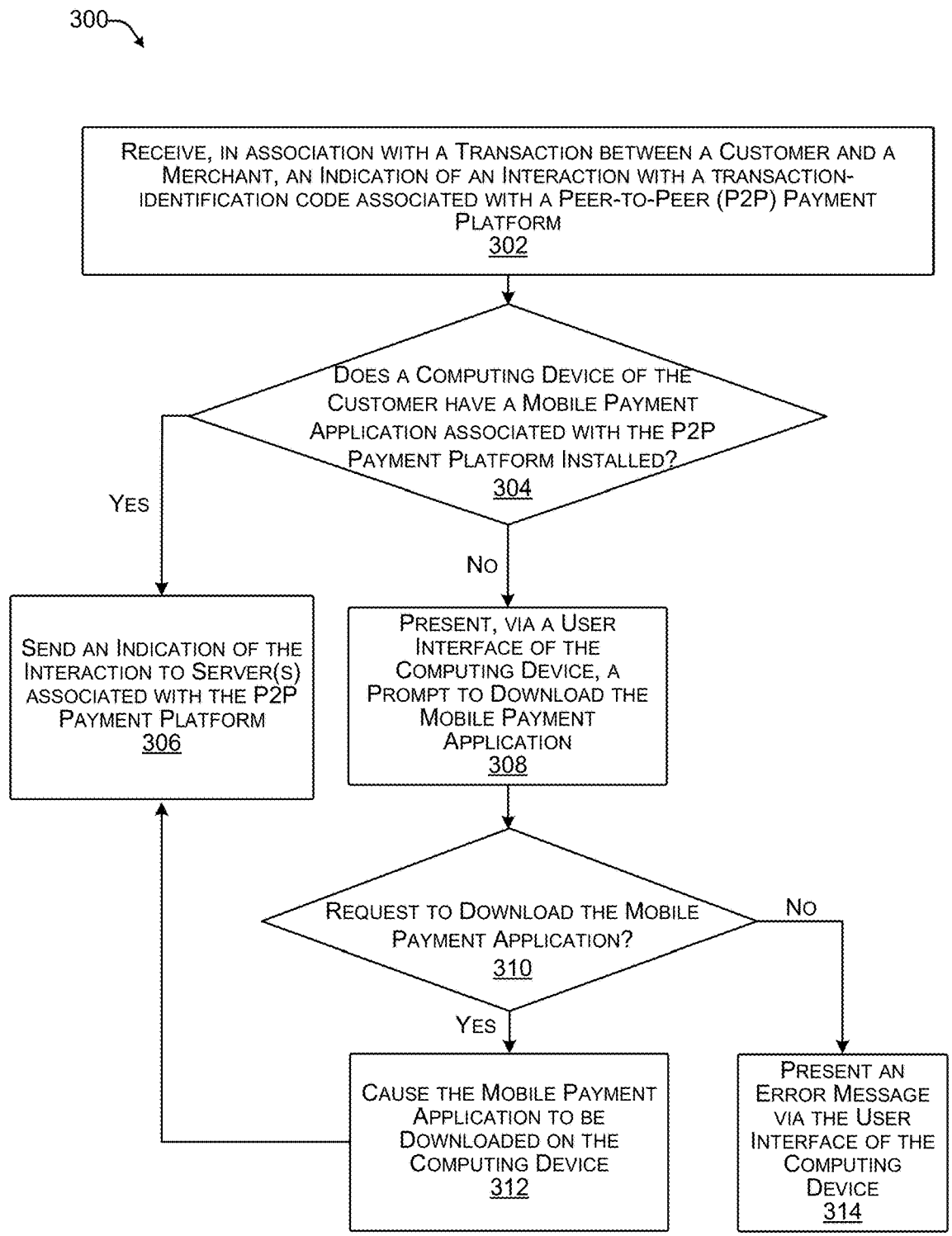
FIG. 3 illustrates an example process for initiating a payment for a transaction on a computing device of a customer, as described herein.

FIG. 3 illustrates an example process 300 for initiating a payment for a transaction on a computing device of a customer, as described herein.

At operation 302, the customer computing device 110 can receive, in association with a transaction between a customer and a merchant, an indication of an interaction with a transaction code associated with P2P payment platform. In at least one example, the customer can cause an interaction between the customer computing device 110 and the transaction code. In some examples, the customer can utilize the sensor(s) 140 associated with the customer computing device 110 to capture an image or obtain data associated with the transaction code. For instance, if the transaction code is a QR code, a camera associated with the customer computing device 110 can capture an image of the QR code. In an example where the transaction code comprises an RFID tag, a NFC reader device can read data associated with the RFID tag via an interaction between the customer computing device 110 and the RFID tag (e.g., by bringing the customer computing device 110 within a threshold distance of the RFID tag such that the NFC reader can read the data associated therewith).

In another example, the customer computing device 110 can receive the transaction code via a text message, email, in-app notification, or the like. In such an example, the customer can interact with the transaction code via a user interface presented by the customer computing device 110.

At operation 304, the customer computing device 110 can determine whether the computing device (e.g., the customer computing device 110) has a mobile payment application 108 associated with the P2P payment platform installed thereon. In at least one example, based at least in part on detecting an interaction with the transaction code, the customer computing device 110 can determine whether the customer computing device 110 is associated with the mobile payment application 108 (e.g., whether the mobile payment application 108 is downloaded thereon). Based at least in part on determining that the computing device (e.g., the customer computing device 110) has the mobile payment application 108 installed, the customer computing device 110 can send an indication of the interaction to server(s) associated with the P2P payment platform (e.g., the P2P server(s) 102), as illustrated at operation 306. That is, if the customer computing device 110 already has the mobile payment application 108 downloaded thereon, the customer computing device 110 can open the mobile payment application 108 and send an indication of the interaction via the mobile payment application 108 to the P2P server(s) 102.

In some examples, the sensor used to capture the image or otherwise obtain data associated with the transaction code can be native to the customer computing device. In some examples, the sensor used can be integrated into the mobile payment application 108. In at least one example, the customer computing device 110 can send an indication of the interaction to the P2P processing component 116, which can be associated with data indicating a source of the interaction (e.g., a native sensor or an integrated sensor). In at least one example, if the sensor used to scan, capture, or otherwise interact with the transaction code is a native sensor, the P2P processing component 116 can send a request to the customer computing device 110 for the customer to provide an input to confirm an intent to proceed via the P2P payment platform (e.g., which may be a prompt to open the mobile payment application 108 or an instant application associated therewith). In some examples, if an integrated sensor is used to scan, capture, or otherwise interact with the transaction code, such a confirmation may not be needed as the intent can be implied via the customer having previously opened the mobile payment application 108. However, in some examples, the P2P processing component 116 can nevertheless send an authorization request to the customer computing device 110 to or confirm authorization prior to opening the mobile payment application 108 and/or sending the indication to the payment processing platform. The P2P processing component 116 can receive the indication and send the indication to the payment processing server(s) 104. As described above, the payment processing component 126 can, in some examples, send the indication to the POS application 112.

At operation 308, based at least in part on determining that the computing device (e.g., the customer computing device 110) does not have the mobile payment application 108 installed, the customer computing device 110 can present, via a user interface of the computing device (e.g., the customer computing device 110), a prompt to download the mobile payment application 108. In at least one example, if the customer computing device 110 does not have the mobile payment application 108 downloaded thereon, the customer computing device 110 can nevertheless cause functionality associated with the mobile payment application 108 to be availed via the customer computing device 110. In at least one example, such functionality can be availed via an instant application. As described above, an instant application can be a portion of a full application, such as the mobile payment application 108, that enables the customer to perform a specific, discreet functionality availed via the mobile payment application 108. In an additional or alternative example, functionality associated with the mobile payment application 108 can be availed via the customer computing device on a web browser associated therewith. In examples where the mobile payment application 108 is not already downloaded on the customer computing device 110, the instant application or the web browser can prompt the customer to download the mobile payment application 108. In at least one example, the instant application and/or the web browser can include a prompt to prompt the customer to download the full mobile payment application 108.

At operation 310, the customer computing device 110 can determine whether a request to download the mobile payment application 108 has been received. Based at least in part on a request to download the mobile payment application 108 having been received, the computing device (e.g., the customer computing device 110) can cause the mobile payment application 108 to be downloaded on the computing device (e.g., the customer computing device 110), as illustrated at operation 312.

In some examples, where the mobile payment application 108 is not already downloaded on the customer computing device 110, and/or where the customer does not have an account or profile associated with the P2P payment platform, the P2P processing component 116 can initialize an onboarding process to onboard the customer to the P2P payment platform. That is, in some examples, the transaction code can cause the customer computing device 110 to send an indication of the transaction code to the P2P server(s) 102. Such an indication can include a device identifier, which can be used by the P2P processing component 116 to determine whether the device (e.g., the customer computing device 110) is associated with an account or profile associated with the P2P processing component 116. If the device is not associated with an account or profile, the P2P processing component 116 can send a request to the customer computing device 110 for information that can be used to generate an account or a profile. In some examples, such a request can be associated with an onboarding process. In some examples, based at least in part on detecting an interaction with the transaction code, a user interface can be presented via the customer computing device 110, which can prompt the customer to provide an identifier and/or otherwise authenticate with the P2P payment platform (e.g., username/password, biometric identifier, etc.). In at least one example, such a prompt can include an option to create an account. Responsive to the customer providing input requesting to create an account, the P2P processing component 116 can send a request to the customer computing device 110 for information that can be used to generate an account or a profile. In some examples, such a request can be associated with an onboarding process.

At operation 314, the customer computing device 110, can present an error message via the user interface. That is, if the customer does not opt to download the mobile payment application 108, in at least one example, the customer computing device 110 can present an error message that can notify the customer to use an alternative payment method. However, in some examples, if mobile payment application 108 is available via an instant application or web browser, the process described above, with reference to operations 312 and 306 can be performed via the instant application or web browser.

In an example where the customer does not opt to download the mobile payment application 108 and instead opts to pay with another payment instrument (e.g., credit card, debit card, etc.), the P2P processing component 116 can send a request to download the mobile payment application 108 and/or a prompt to onboard to the P2P payment platform at a time after payment is completed using the selected payment instrument. In some examples, the payment processing component 126 can send customer data and/or payment data associated with the selected payment instrument to the P2P payment platform to streamline onboarding of the customer.

Figure 4B:
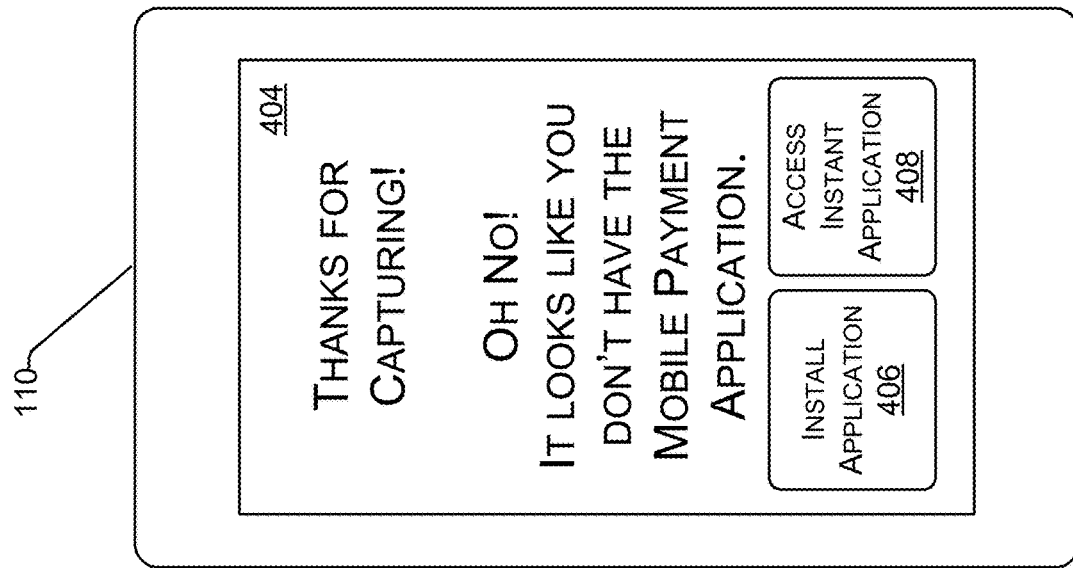
FIG. 4B illustrates an example GUI that can be presented via a computing device of a customer.
Figure 4A:
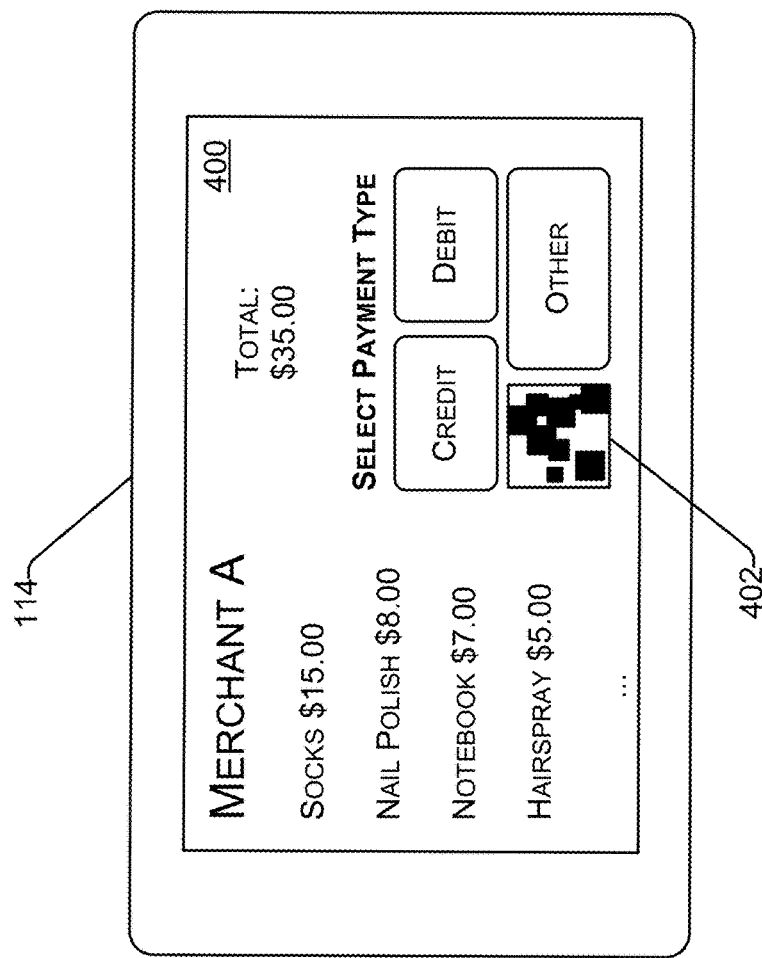
FIG. 4A illustrates an example graphical user interface (GUI) that can be presented via a computing device of a merchant.

FIG. 4A illustrates an example GUI 400 that can be presented via the merchant computing device 114. In at least one example, the POS application 112 can present a payment selection user interface that includes user interface element(s) representing payment option(s) for remitting payment for a transaction between a merchant and a customer (e.g., credit, debit, other). In at least one example, the GUI 400 can include a transaction code, such as a QR code 402, that can be associated with a P2P payment platform. As described above, the transaction code can include a resource locator associated with a location of the P2P payment platform and/or a deep link to the mobile payment application 108. In at least one example, the customer computing device 110 can interact with the transaction code, for example using the sensor(s) 140 associated therewith. For instance, a camera can capture an image of the QR code 402.

FIG. 4B illustrates an example GUI 404 that can be presented via the customer computing device 110. In at least one example, as described above with reference to operation 304 of FIG. 3, based at least in part on receiving an indication of an interaction between the customer computing device 110 and a transaction code, the customer computing device 110 can determine whether the mobile payment application 108 is installed on the customer computing device 110. Based at least in part on determining that the mobile payment application 108 is not installed on the customer computing device 110, the customer computing device 110 can present a GUI, similar to the GUI 404, that prompts the customer to install the mobile payment application 108 (e.g., via actuation of a first selectable control 406) and/or enables the customer to access functionality associated with the mobile payment application 108 via an instance application (e.g., via actuation of a second selectable control 408). Based at least in part on detecting an input associated with an actuation of the first selectable control 406, the customer computing device 110 can send a request to the P2P server(s) 102 to cause the mobile payment application 108 to be downloaded on the customer computing device 110. Based at least in part on detecting an input associated with an actuation of the second selectable control 408, the customer computing device 110 can send a request to the P2P server(s) 102 to cause a portion of the mobile payment application 108 to be downloaded on the customer computing device 110. In such an example, the customer may be able to perform a specific, discrete functionality via the instant application without downloading the full mobile payment application 108. In at least one example, the instant application can include a prompt to download the full mobile payment application 108.

In some examples, the GUI 404 can be presented via a web browser associated with the customer computing device 110.

Figure 5:
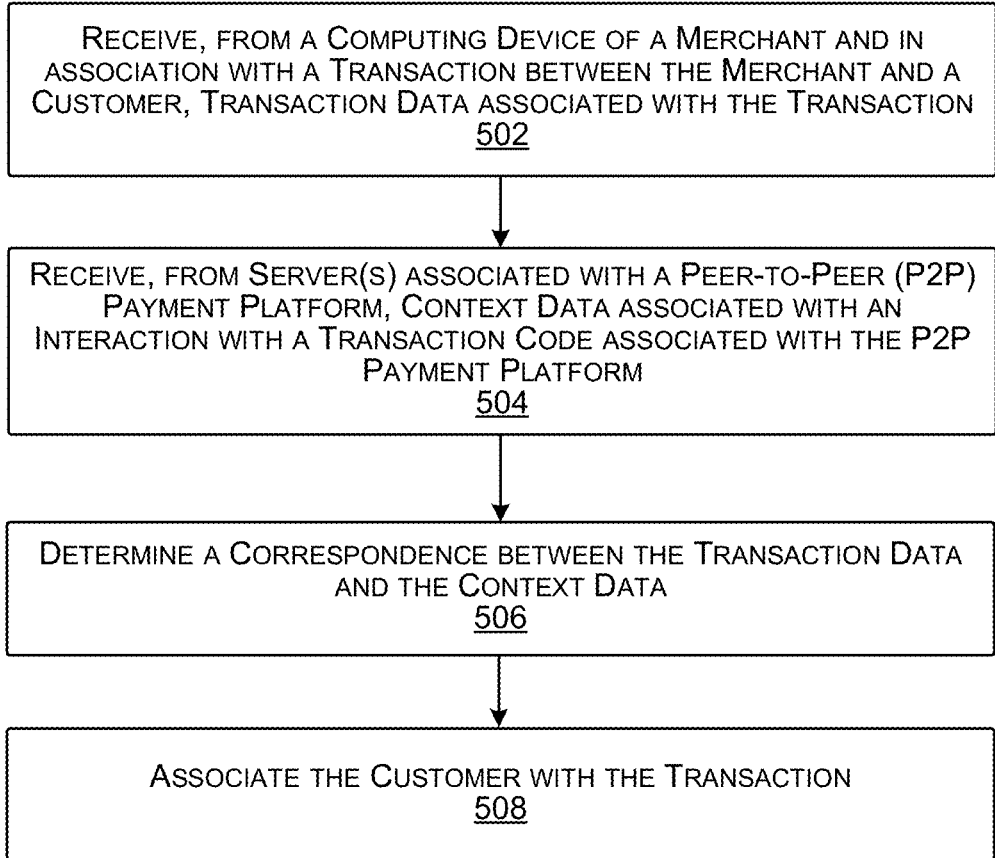
FIG. 5 illustrates an example process for associating a customer with a transaction based at least in part on determining a correspondence between transaction data and context data, as described herein.

FIG. 5 illustrates an example process 500 for associating a customer with a transaction based at least in part on determining a correspondence between transaction data and context data, as described herein.

At operation 502 the payment processing component 126 can receive, from a computing device of a merchant (e.g., the merchant computing device 114) and in association with a transaction between the merchant and a customer, transaction data associated with the transaction. As described above, in at least one example, the POS application 112 can configure the merchant computing device 114 as a POS terminal. In at least one example, the POS application 112 can generate transaction data associated with a transaction between a customer and a merchant. The transaction data can include item(s) to be purchased (or otherwise acquired) via the transaction, detail(s) associated with such item(s), item cost(s) associated with the item(s), a total cost of the item(s), an identifier of the merchant, an identifier of the merchant computing device 114, an identifier of the instance of the POS application 112, an identifier of the transaction, a location associated with the merchant computing device 114, a timestamp associated with the transaction, a datestamp associated with the transaction, and/or the like.

In at least one example, the POS application 112 can send transaction data to the payment processing component 126. In some examples, the transaction data can be sent to the payment processing component 126 in near-real time. That is, as new transaction data is generated, such transaction data can be sent to the payment processing component 126. In some examples, the transaction data can be sent in batches, at a particular frequency, after a lapse of a period of time, responsive to a condition being satisfied (e.g., a total cost of a transaction satisfying a threshold, a request to complete a transaction being received, etc.), or the like. In some examples, a portion of transaction data can be sent to the payment processing server(s) 104. In some examples, the portion of transaction data can correspond to an "event" (e.g., a new item added to a cart, etc.), etc. and such "event data" can be sent to the payment processing component 126 on a per-event basis. In some examples, the payment processing component 126 can receive the transaction data from the POS application 112. In some examples, the payment processing component 126 can store the transaction data (e.g., in a data structure associated with the transaction).

At operation 504, the payment processing component 126 can receive, from servers associated with a P2P payment platform (e.g., the P2P server(s) 102), context data associated with an interaction with a transaction code associated with the P2P payment platform. In at least one example, the P2P payment platform can receive an indication of an interaction, which can be between the customer computing device 110 and the transaction code (e.g., via a sensor associated with the customer computing device 110) or a customer and the transaction code (e.g., via a user interface of the customer computing device 110). In examples where the mobile payment application 108 is installed on the customer computing device 110, the mobile payment application 108 can send an indication of the transaction code (e.g., an indication of the interaction to the P2P server(s) 102. In at least one example, if the mobile payment application 108 is not installed on the customer computing device 110 at the time of the interaction, the indication of the interaction can be sent after the mobile payment application 108 is installed, via an instant application, via a web browser, or the like.

In at least one example, the indication of the interaction between the customer computing device 110 and the transaction code can be associated with context data. The context data can include, but is not limited to, a timestamp associated with the interaction, a location associated with the interaction, a transaction identifier, or the like. In some examples, the context data can include authorization data.

At operation 506, the payment processing component 126 can determine a correspondence between the transaction data and the context data. In at least one example, the payment processing component 126 can compare received transaction data with context data associated with the indication of the interaction between the transaction code 208 to determine, or confirm, an association between the customer and the transaction. In at least one example, the payment processing component 126 can compare a timestamp associated with the transaction data with the timestamp associated with the context data to determine a correspondence, or other correlation, between a customer and a transaction. In an additional or alternative example, the payment processing component 126 can compare the location associated with the transaction data with the location associated with the context data to determine a correspondence, or other correlation, between a customer and a transaction. In some examples, the payment processing component 126 can compare a transaction identifier associated with the transaction data with a transaction identifier associated with the context data to determine a correspondence, or other correlation, between a customer and a transaction.

At operation 508, the payment processing component 126 can associate the customer with the transaction. In at least one example, the payment processing component 126 can determine a correspondence between transaction data and context data, as described above. In such an example, the payment processing component 126 can determine that a particular customer is associated with a particular transaction. Based at least in part on such a determination, the payment processing component 126 can associate the customer with the transaction. That is, the payment processing component 126 can map, or otherwise associate, an identifier associated with the customer with an indication of the transaction (e.g., a data structure) associated with the payment processing server(s) 104.

In at least one example, based at least in part on associating the customer with the transaction, the payment processing component 126 can send transaction data, or a portion thereof, to the mobile payment application 108, as described above. That is, based at least in part on determining that a customer corresponds to a particular transaction, the payment processing component 126 can send transaction data, or a portion thereof, to the P2P server(s) 102, which can send the transaction data, or a portion thereof, to the mobile payment application 108 (associated with the customer). In an additional or alternative example, based at least in part on associating the customer with the transaction, the payment processing component 126 can cause funds to be transferred from a stored balance of the customer associated with the P2P payment platform to a stored balance of the merchant associated with the payment processing platform, as described above.

As described above, in some examples, a transaction code can be dynamic. That is, in some examples, a transaction code can be generated by the P2P processing component 116 based at least in part on receiving an indication of a transaction and/or a request to generate a transaction code associated with the transaction. In such examples, the transaction code can be encoded with information associated with the transaction. However, in other examples, a transaction code can be static. That is, the transaction code can be generated, provided to the merchant, and used for one or more transactions. In such an example, the transaction code can be encoded with information associated with the merchant, a location, a particular brick-and-mortar store, and/or the like. When a static transaction code is captured, or otherwise interacted with, using the customer computing device 110, the payment processing component 126, and an indication of the interaction is sent to the payment processing server(s) 104, the payment processing component 126 may not know which transaction the indication is associated with. As such, the payment processing component 126 can compare context data associated with the interaction with the transaction data to determine which transaction the indication is associated with. After the transaction has been associated with the customer, the payment processing component 126 can provide transaction data to the P2P server(s) 102 for facilitating contactless payments and/or other interactions with transactions, as described herein.

Figure 6B:
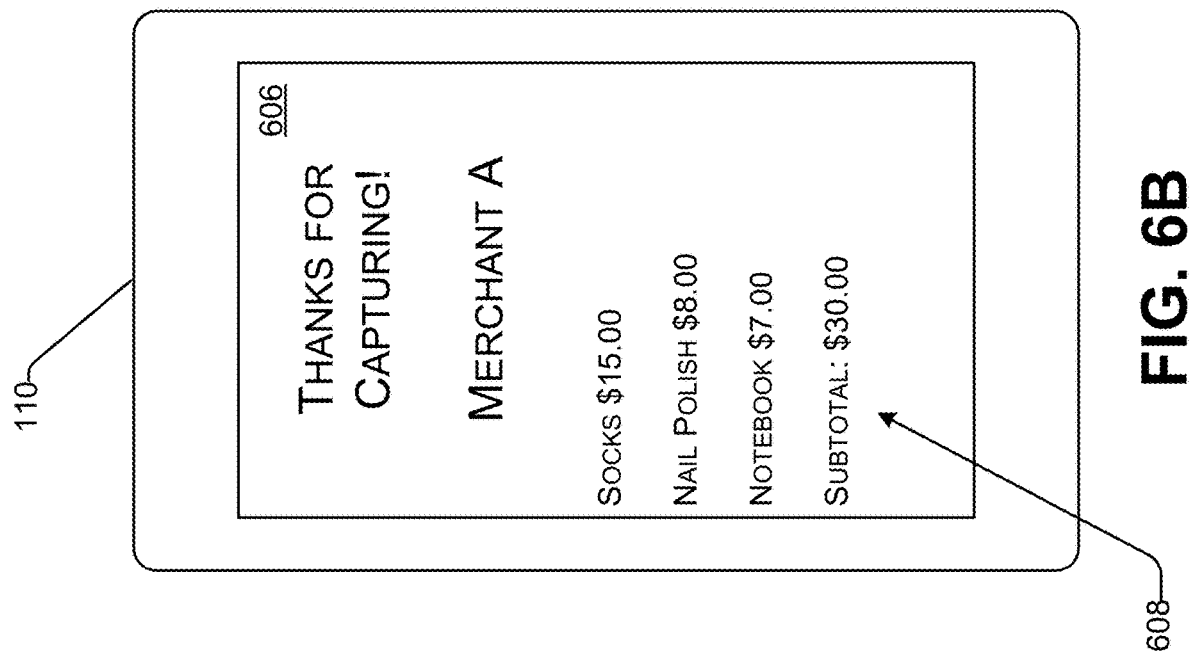
FIG. 6B illustrates an example GUI that can be presented via a computing device of a customer.
Figure 6A:
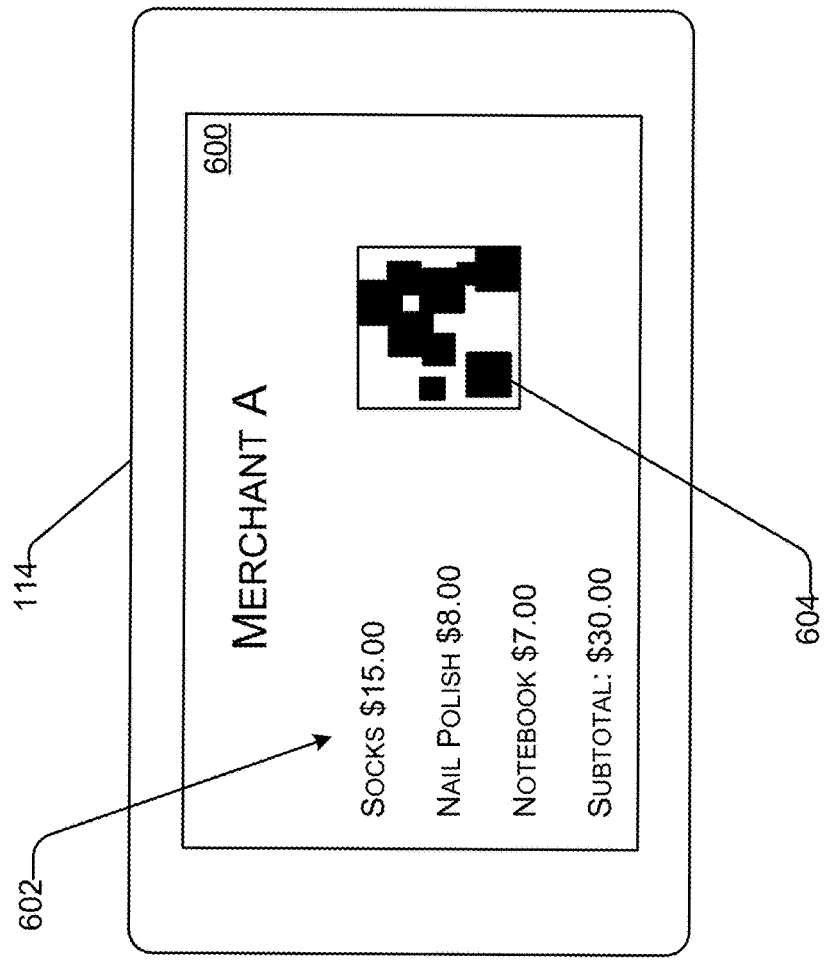
FIG. 6A illustrates an example GUI that can be presented via a computing device of a merchant.

FIG. 6A illustrates an example GUI 600 that can be presented via the merchant computing device 114. In at least one example, as the merchant adds item(s) to a virtual cart, user interface element(s) 602 can be presented via the GUI 600. In at least one example, the user interface element(s) 602, which can be text elements, images, icons, combinations of the foregoing, or the like, can represent individual item(s) added to the virtual cart and/or details associated therewith. In at least one example, the GUI 600 can include a transaction code, such as a QR code 604, that can be associated with a P2P payment platform. As described above, the transaction code can include a resource locator associated with a location of the P2P payment platform and/or a deep link to the mobile payment application 108. In at least one example, the customer computing device 110 can interact with the transaction code, for example using the sensor(s) 140 associated therewith. For instance, a camera can capture an image of the QR code 604. In some examples, the transaction code can be presented in association with a cart building user interface, as shown in FIG. 6A.

In at least one example, based at least in part on the customer interacting with the transaction code via the customer computing device 110, the payment processing server(s) 104 can cause at least a portion of transaction data associated with the transaction to be sent to the customer computing device 110. The customer computing device 110 can receive the transaction data, or a portion thereof, and the mobile payment application 108 can cause the transaction data, or the portion thereof, to be presented via a user interface, such as the GUI 606 illustrated in FIG. 6B. That is, the customer computing device 110 can present the GUI 606, which can include the same, or similar, transaction data as is being presented by the GUI 600. In at least one example, the GUI 606 can include user interface element(s) 608 representative of item(s) associated with the transaction. Such user interface element(s) 608 can be text elements, graphics, icons, images, and/or the like. In at least one example, the GUI 606 can be a cart building user interface that is presented by the mobile payment application 108.

In at least one example, if the transaction code is a static identifier (e.g., if the QR code 604 is static), the payment processing component 126 may first determine an association between the transaction and the customer, as described above with reference to FIG. 5, before sending the transaction data, or the portion thereof, to the customer computing device 110. In some examples, even if the transaction code is a dynamic identifier (e.g., if the QR code 604 is dynamic), the payment processing component 126 can compare transaction data and context data, as described above with reference to FIG. 5, to confirm an association between a customer and a transaction prior to sending the transaction data, or the portion there of, to the customer computing device 110.

Figure 7:
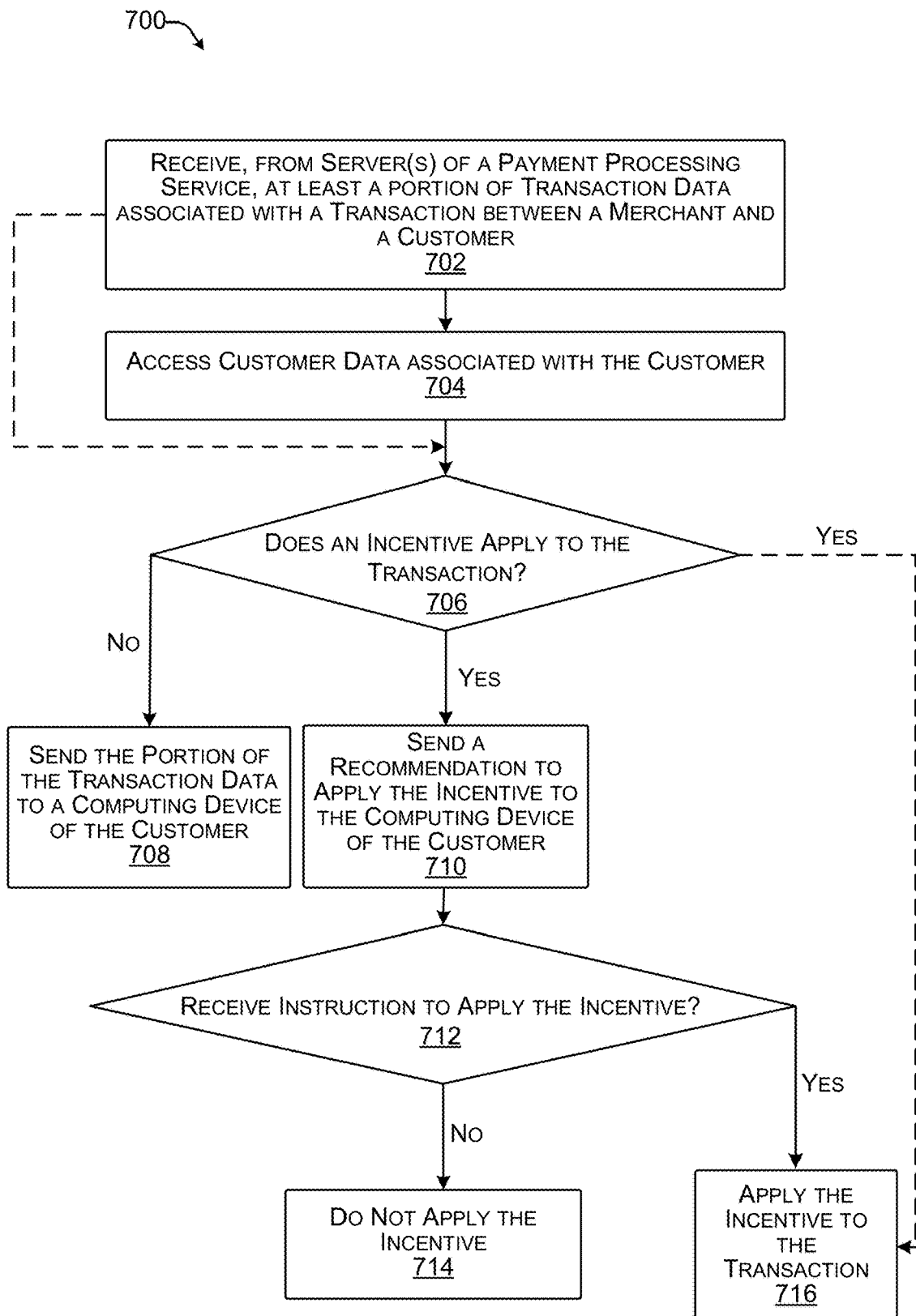
FIG. 7 illustrates an example process for determining whether an incentive applies to a transaction, as described herein.

FIG. 7 illustrates an example process 700 for determining whether an incentive applies to a transaction, as described herein.

At operation 702, the P2P processing component 116 can receive, from server(s) of a payment processing platform (e.g., the payment processing server(s) 104), at least a portion of transaction data associated with a transaction between a merchant and a customer. As described above, based at least in part on receiving an indication of an interaction associated with a transaction code and/or a determination of an association between the customer and the transaction, the payment processing component 126 can send at least a portion of transaction data associated with the transaction to the P2P server(s) 102. In at least one example, the P2P processing component 116 can receive the transaction data.

In at least one example, the payment processing component 126 can send transaction data to the P2P processing component 116. In some examples, the transaction data can be sent to the P2P processing component 116 in near-real time. That is, as new transaction data is received (e.g., from the POS application 112), such transaction data can be sent to the P2P processing component 116. In some examples, the transaction data can be sent in batches, at a particular frequency, after a lapse of a period of time, responsive to a condition being satisfied (e.g., a total cost of a transaction satisfying a threshold, a request to complete a transaction being received, etc.), or the like. In some examples, a portion of transaction data can be sent to the P2P processing component 116. In some examples, the portion of transaction data can correspond to an "event" (e.g., a new item added to a cart, etc.), etc. and such "event data" can be sent to the P2P processing component 116 on a per-event basis.

At operation 704, the P2P processing component 116 can access customer data associated with the customer. In at least one example, the customer can be a "user" of the P2P payment platform and thus, such data can be stored in the data store(s) 120, for example, in the user data 122. In at least one example, the user data 122 can indicate one or more incentives that are available for the customer.

At operation 706, the P2P processing component 116 can determine whether an incentive applies to the transaction. In at least one example, based at least in part on accessing the customer/user data associated with the customer, the P2P processing component 116 can determine whether the customer has any incentives available for the transaction. In an additional or alternative example, the P2P processing component 116 may determine whether the P2P payment platform has any incentives available for the transaction, without accessing the customer/user data, as illustrated by the dashed line from operation 702 to operation 706. An incentive can be associated with a discount, a loyalty reward, prioritized offer or booking, etc. In some examples, an incentive can be applied to or applicable for a previous transaction, a current transaction, or a future transaction. In some examples, the incentive can be associated with the merchant with which the transaction is associated, another merchant that is associated with the P2P payment platform and/or the payment processing platform, or a merchant that is not associated with either the P2P payment platform and/or the payment processing platform.

In some examples, an incentive can be particular to a merchant such that, if the transaction data indicates that a transaction is associated with the particular merchant, the incentive can be applicable to the transaction. In another example, an incentive can be particular to an item or bundle of items, such that if transaction data indicates that a transaction is associated with the item or bundle of items, the incentive can be applicable to the transaction. In some examples, an incentive can be associated with a location, or geo-fence, such that if transaction data indicates that a transaction is associated with the location, or within the geo-fence, the incentive can be applicable to the transaction. In some examples, an incentive can be associated with a MCC such that if transaction data indicates that a transaction is associated with a merchant associated with the MCC, the incentive can be applicable to the transaction. As described above, in some examples, incentives can be particular to a customer (e.g., an indication of such an incentive can be stored in the customer/user data). In some examples, incentives can be available to all users associated with the P2P payment platform, a subset of users associated with the P2P payment platform, or the like.

At operation 708, based at least in part on determining that an incentive does not apply to the transaction, the P2P processing component 116 can send the portion of the transaction data to a computing device of the customer (e.g., the customer computing device 110). That is, if no incentives are available and/or apply to the transaction, the P2P processing component 116 can send the transaction data, or the portion thereof, to the mobile payment application 108 for presentation on the customer computing device 110.

Figure 8:
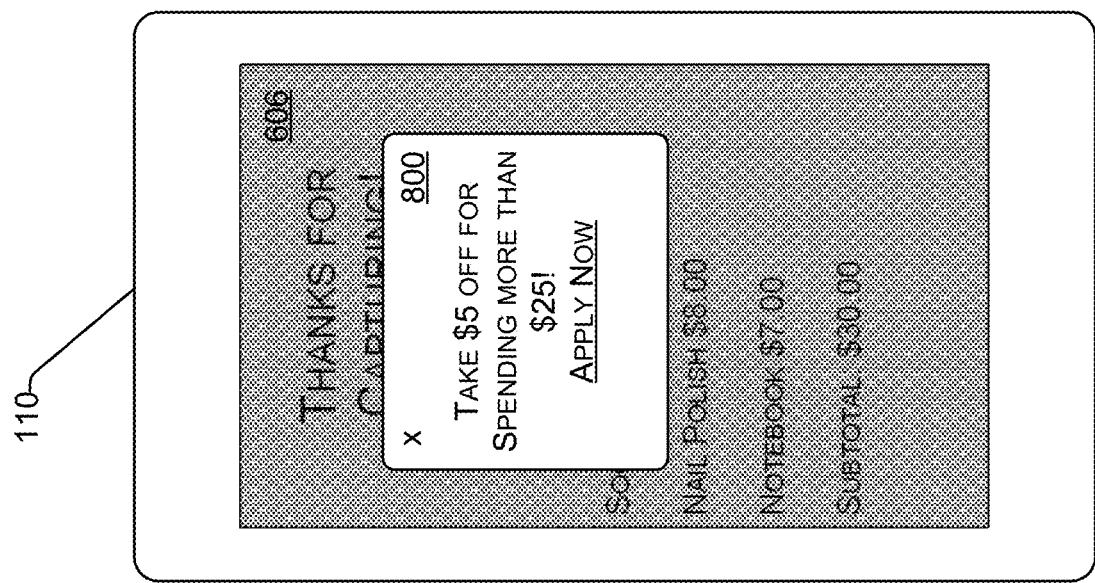
FIG. 8 illustrates an example recommendation that can be presented via a GUI presented via a computing device of a customer.

At operation 710, based at least in part on determining that an incentive applies to the transaction, the P2P processing component 116 can send a recommendation to apply the incentive to the computing device of the customer (e.g., the customer computing device 110). In at least one example, based at least in part on determining that an incentive applies to the transaction, the P2P processing component 116 can send a recommendation to the customer computing device 110. In such an example, the recommendation can identify the incentive and prompt the customer to provide an input indicating whether to apply the incentive to the transaction (or otherwise redeem the incentive). FIG. 8 illustrates a non-liming example of such a recommendation being presented via the GUI 606 of FIG. 6B above. That is, in at least one example, the P2P processing component 116 can cause a user interface element 800, which can be a pop-up, overlay, window, or the like to be presented via the GUI 606. In at least one example, the user interface element 800 can include one or more mechanisms that can be actuated to enable the customer to accept the recommendation (e.g., "Apply Now"), and have the incentive applied to the transaction, or reject the recommendation (e.g., the "x" in the upper left corner).

At operation 712, the P2P processing component 116 can determine whether an instruction to apply the incentive is received. At operation 714, based at least in part on determining that an instruction to apply the incentive is not received (e.g., the customer does not provide an input within a designated period of time and/or provides an input indicating not to apply the incentive), the P2P processing component 116 can determine not to apply the incentive. At operation 716, based at least in part on receiving an instruction to apply the incentive, the P2P processing component 116 can apply the incentive to the transaction. In such an example, the P2P processing component 116 can apply the incentive to the transaction such that when the transaction is complete, the P2P processing component 116 can settle the transaction having applied the incentive. In an example where an incentive is a coupon for later use, loyalty rewards, priority booking or the like, "application" of such an incentive may be associating the coupon, loyalty rewards, priority booking or the like with an account or profile of the customer. In an example where an incentive is a discount, "application" of such an incentive may be reducing the total cost of the transaction by the discount.

Figure 9:
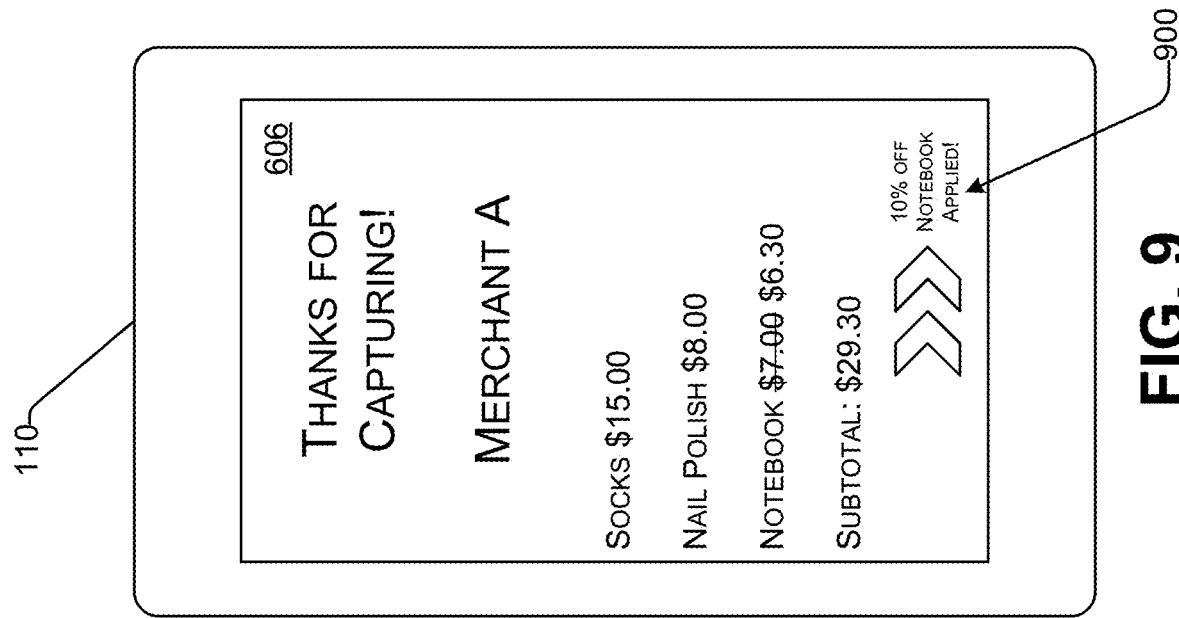
FIG. 9 illustrates an example of an updated GUI that can be presented via a computing device of a customer based at least in part on an application of an incentive to a transaction.

While operations 706-716 describe presenting a recommendation to apply an incentive and applying an incentive based at least in part on receiving an instruction to apply the incentive, in some examples, the processing component 116 can automatically apply an incentive that applies to a transaction. For instance, as illustrated by the dashed line from operation 706 to operation 716, in some examples, the P2P processing component 116 can automatically apply the incentive and, in such examples, can present an indication that the incentive was applied via a user interface presented by the mobile payment application 108. FIG. 9 illustrates non-liming example of such an indication being presented via the GUI 606 of FIG. 6B above. That is, in at least one example, the P2P processing component 116 can apply the incentive and can cause user interface element(s) 900 to be presented via the GUI 606. In some examples, the GUI 606 can be updated to include the user interface element(s) 900 after the incentive has been applied. In at least one example, the P2P processing component 116 can apply the incentive to the transaction such that when the transaction is complete, the P2P processing component 116 can settle the transaction having applied the incentive. As described above, in an example where an incentive is a coupon for later use, loyalty rewards, priority booking or the like, "application" of such an incentive may be associating the coupon, loyalty rewards, priority booking or the like with an account or profile of the customer. In an example where an incentive is a discount, "application" of such an incentive may be reducing the total cost of the transaction by the discount.

Figure 10:
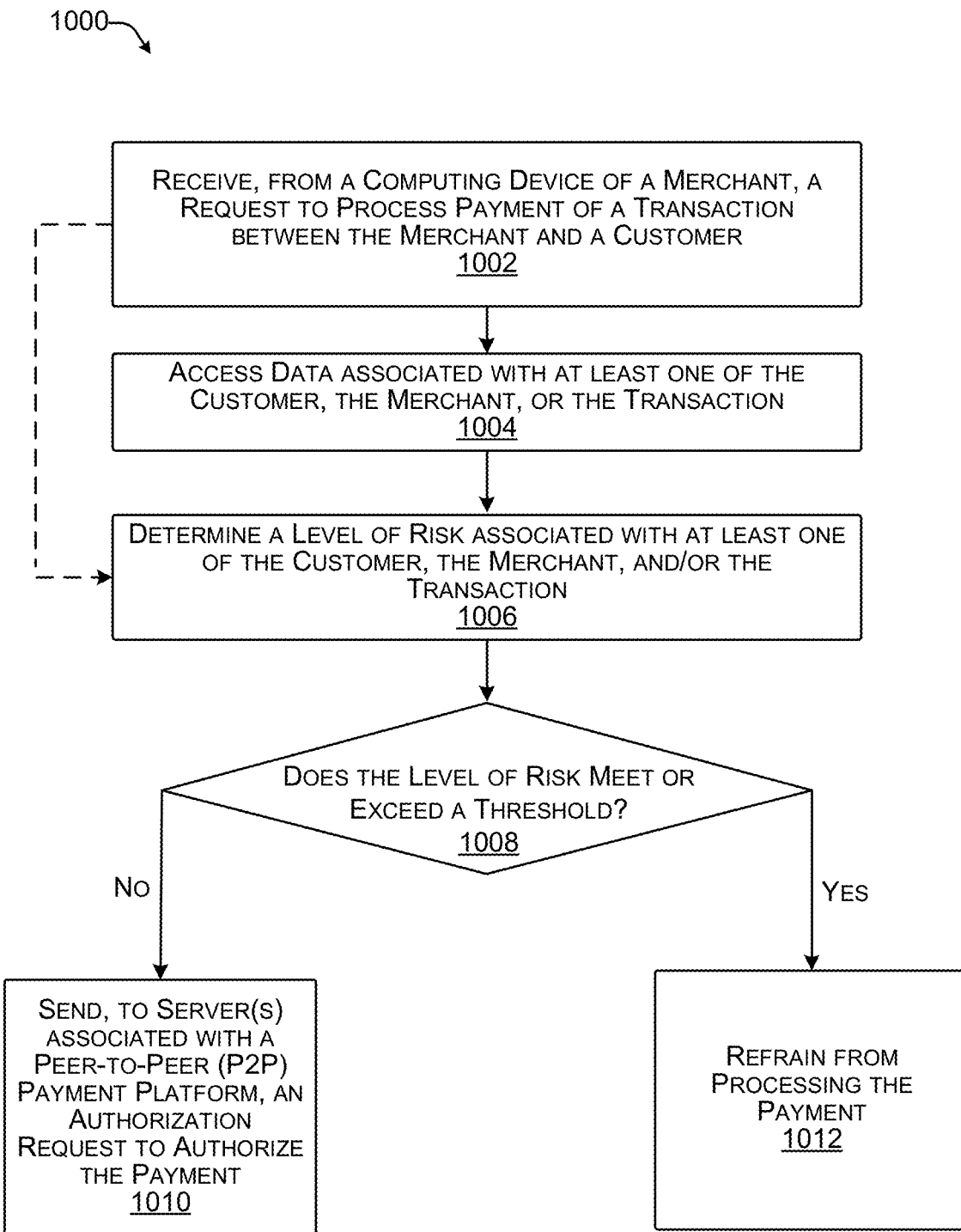
FIG. 10 illustrates an example process for determining whether to process payment for a transaction based at least in part on a level of risk, as described herein.

FIG. 10 illustrates an example process 1000 for determining whether to process payment for a transaction based at least in part on a level of risk associated with a customer, merchant, and/or transaction, as described herein.

At operation 1002, the payment processing component 126 can receive from a computing device of a merchant (e.g., the merchant computing device 114), a request to process payment of a transaction between the merchant and a customer. In at least one example, as described above, the POS application 112 can send a request to complete a transaction to the payment processing server(s) 104. In at least one example, the merchant can provide an input via a cart building user interface presented by the POS application 112 to indicate that the transaction is complete (and to initiate a payment flow). In such an example, the POS application 112 can send the request to complete the transaction to the payment processing component 126.

At operation 1004, the payment processing component 126 can access at least one of customer data 132 and/or merchant data 134, from the data store(s) 130 and/or transaction data associated with the transaction. In at least one example, the transaction can be associated with a customer. In some examples, the customer can be identified and/or associated with the transaction based at least in part on causing the customer computing device 110 to interact with a transaction-specific transaction code and/or receiving the transaction code at the customer computing device 110. In some examples, the customer can be identified and/or associated with the transaction based at least in part on comparing transaction data associated with the transaction with context data associated with an interaction between the customer computing device 110 and a transaction code, as described above with reference to FIG. 5. In at least one example, based at least in part on the transaction being associated with the customer, the payment processing component 126 can access a portion of the customer data 132 that corresponds to the customer, if such data is available.

In some examples, at least a portion of the customer data can be provided by the P2P server(s) 102 to the payment processing component 126. In some examples, such customer data can be data indicative of interactions and/or transactions of the customer using the P2P payment platform. In some examples, such customer data can be one or more indications of risk as determined by the P2P processing component 116. In some examples, such customer data can be provided by the P2P server(s) 102 based on process 1100 described below in the context of FIG. 11. In at least one example, a level of risk determined by a first-party P2P payment platform can be more credible or more heavily weighted in a risk analysis than a level of risk determined by a third-party P2P payment platform.

In some examples, the transaction can be associated with a merchant. That is, the request can be associated with an indication of the merchant such that the transaction is associated with the merchant. In at least one example, the payment processing component 126 can access a portion of the merchant data 134 associated with the merchant. In some examples, some merchant data can be provided by the P2P server(s) 102. In at least one example, the P2P processing component 116 can provide such merchant data based at least in part on the process 1100 described below in the context of FIG. 11.

At operation 1006, the payment processing component 126 can determine a level of risk associated with at least one of the customer, the merchant, or the transaction. In at least one example, the payment processing component 126 can determine a level of risk associated with the customer, the merchant, and/or the transaction using one or more risk models. In some examples, the level of risk can be based at least in part on the customer data 132, the merchant data 134, and/or the transaction data. In other examples, the level of risk can be determined by the payment processing component 126 without having accessed the customer data 132, the merchant data 134, and/or the transaction data, as illustrated by the dashed line from operation 1002 to operation 1006. In at least one example, the risk analysis can consider one or more factors that can be indicative of risk (e.g., chargeback, fraud, etc.).

At operation 1008, the payment processing component 126 can determine whether the level of risk meets or exceeds a threshold. In at least one example, the payment processing component 126, can analyze the level of risk and compare the level of risk with a threshold.

At operation 1010, based at least in part on determining that the level of risk does not meet or exceed the threshold, the payment processing component 126 can send, to server(s) associated with a P2P payment platform (e.g., the P2P server(s) 102), an authorization request to authorize the payment. That is, so long as the level of risk is below the threshold, the payment processing component 126 can send an authorization request to the P2P server(s) 102.

At operation 1012, based at least in part on determining that the level of risk associated with the customer meets or exceeds the threshold, the payment processing component 126 can refrain from processing the payment. That is, if the level of risk is at or above the threshold, the payment processing component 126 can determine that processing payment for the transaction is too risky and can refrain from sending an authorization request to the P2P server(s) 102.

Figure 11:
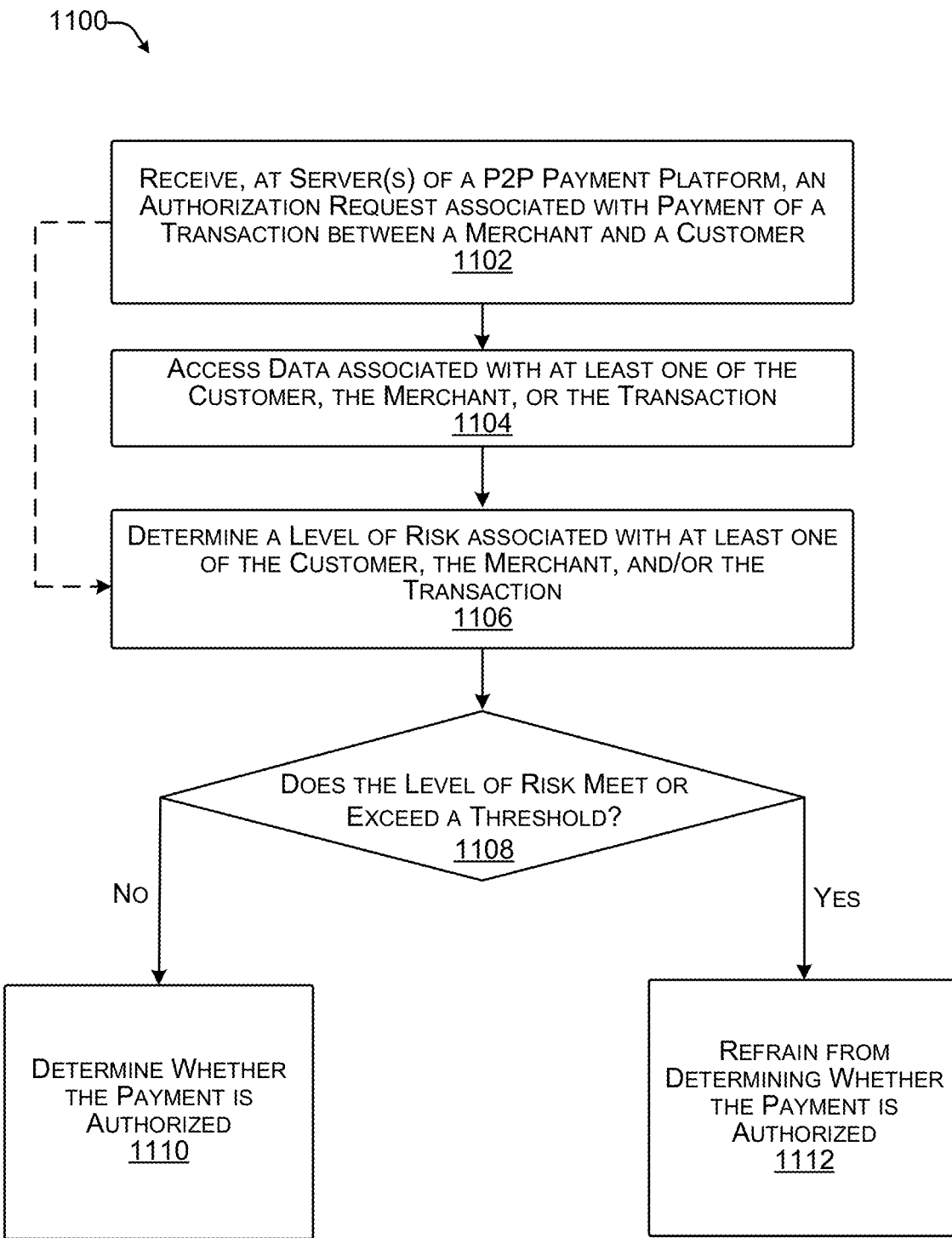
FIG. 11 illustrates an example process for determining whether a payment for a transaction is authorized based at least in part on a level of risk, as described herein.

FIG. 11 illustrates an example process 1100 for determining whether a payment for a transaction is authorized based at least in part on a level of risk associated with a customer, merchant, and/or transaction, as described herein.

At operation 1102, the P2P processing component 116 can receive, at server(s) of a P2P payment platform (e.g., the P2P server(s) 102), an authorization request associated with a payment of a transaction between a merchant and a customer. In at least one example, the payment processing component 126 can send the authorization request to the P2P processing component 116. In some examples, the payment processing component 126 can send the authorization request after having performed a risk analysis, as described above with reference to FIG. 10. That is, in some examples, the authorization request can be associated with a level of risk determined by the payment processing component 126. In some examples, the payment processing component 126 can send the authorization request responsive to receiving a request to complete a transaction (e.g., as a "pass through" without having first determined a level of risk associated with the customer or merchant).

At operation 1104, the P2P processing component 116 can access user data 122, from the data store(s) 120, associated with the customer and/or the merchant (e.g., who can be "users" of the P2P payment platform) and/or transaction data associated with the transaction. In at least one example, the transaction can be associated with a customer. In some examples, the customer can be identified and/or associated with the transaction based at least in part on causing the customer computing device 110 to interact with a transaction-specific transaction code and/or receiving the transaction code at the customer computing device 110. In some examples, the customer can be identified and/or associated with the transaction based at least in part on comparing transaction data associated with the transaction with context data associated with an interaction between the customer computing device 110 and a transaction code, as described above with reference to FIG. 5. In at least one example, based at least in part on the transaction being associated with the customer, the payment processing component 126 can associate an indication of the customer with the authorization request such that the P2P processing component 116 can access a portion of the user data 122 associated therewith from the data store(s) 120. In some examples, the authorization request can further be associated with an indication of the merchant, which can be another "user" of the P2P payment platform. In such examples, the P2P processing component 116 can access a portion of the user data 122 that corresponds to the merchant. In at least one example, the authorization request can additionally be associated with transaction data associated with the transaction.

At operation 1106, the P2P processing component 116 can determine a level of risk associated with at least one of the customer, the merchant, or the transaction. In at least one example, the P2P processing component 116 can determine a level of risk associated with the customer using one or more risk models. In some examples, the level of risk can be based at least in part on the user data 122. In other examples, the level of risk can be determined by the P2P processing component 116 without having accessed the user data 122, as illustrated by the dashed line from operation 1102 to operation 1106. In some examples, the level of risk can be determined based at least in part on data associated with the authorization request received from the payment processing component 126 (which, in some examples, can include an indication of a risk analysis performed by the payment processing component 126). In at least one example, the risk analysis can consider one or more factors that can be indicative of risk (e.g., chargeback, fraud, etc.).

At operation 1108, the P2P processing component 116 can determine whether the level of risk meets or exceeds a threshold. In at least one example, the P2P processing component 116, can analyze the level of risk and compare the level of risk with a threshold.

At operation 1110, based at least in part on determining that the level of risk does not meet or exceed the threshold, the P2P processing component 116 can determine whether the payment is authorized. That is, so long as the level of risk is below the threshold, the P2P processing component 116 can determine whether a stored balance associated with the customer is greater than or equal to an amount of the transaction. If the stored balance is greater than or equal to the amount of the transaction, the P2P processing component 116 can determine that the payment is authorized, as described above. In some examples, the P2P processing component 116 can send an indication of the level of risk determined for the customer to the payment processing server(s) 104.

At operation 1112, based at least in part on determining that the level of risk associated with the customer meets or exceeds the threshold, the P2P processing component 116 can refrain from determining whether to authorize the payment. That is, if the level of risk is at or above the threshold, the P2P processing component 116 can determine that processing payment for the transaction is too risky and can refrain from determining whether the payment is authorized. In some examples, the P2P processing component 116 can send an indication of such to the payment processing server(s) 102.

In at least one example, as described above, a transaction code can be presented via a user interface presented by the POS application 112 in association with a cart building user interface (e.g., as described above with reference to FIG. 6A) or in association with any user interface associated with a transaction, which can be presented prior to a payment selection user interface. In some examples, if the POS application 112 has not received an indication that the customer has caused an interaction between the customer computing device 110 and the transaction code prior to when the payment selection user interface is to be presented, the transaction code can be presented in association with a payment selection user interface, as illustrated in FIG. 12A.

Figures 12A, 12B:
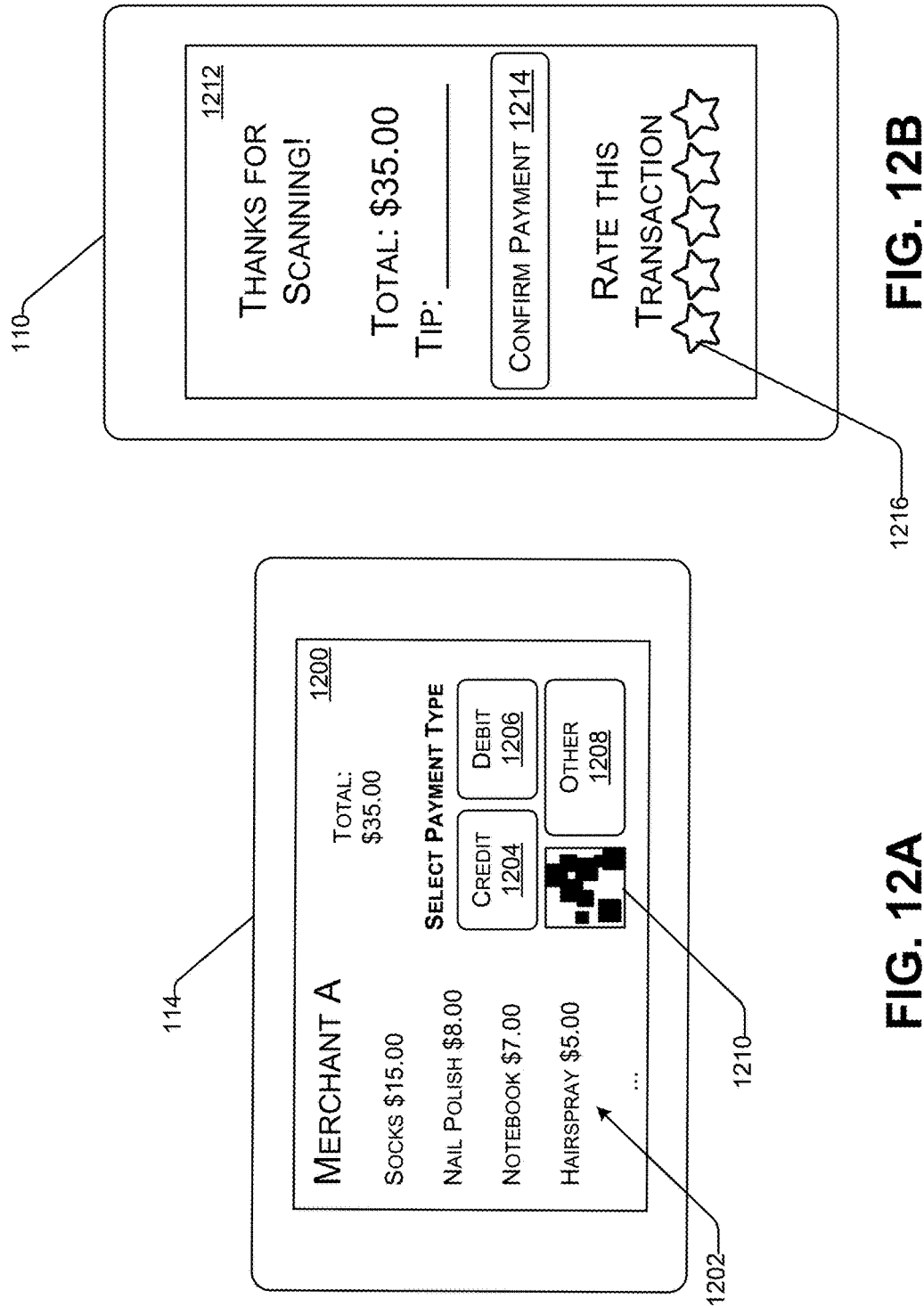
FIG. 12A illustrates an example GUI that can be presented via a computing device of a merchant.
FIG. 12B illustrates an example GUI that can be presented via a computing device of a customer.

FIG. 12A illustrates an example GUI 1200 that can be presented via the merchant computing device 114. In at least one example, the merchant can interact with a user interface, such as a cart building user interface, to indicate a completion of a transaction and to initiate a payment flow associated with processing payment for the transaction. In at least one example, based at least in part on receiving such an indication, the POS application 112 can present a payment selection user interface, such as the GUI 1200. In at least one example, the GUI 1200 can present user interface element(s) 1102 associated with transaction data of the transaction. In some examples, the user interface element(s) 1202 can indicate item(s) to be purchased in the transaction, a total amount of the transaction, and/or the like. In at least one example, the GUI 1200 can include selectable controls to enable the customer to indicate a payment type for payment of the transaction. In at least one example, the customer and/or the merchant can interact with the GUI 1200 to indicate a payment type for payment of the transaction. For instance, the customer and/or the merchant can select the control 1204 to indicate that the customer intends to use credit for payment of the transaction, control 1206 to indicate that the customer intends to use debit for payment of the transaction, control 1208 to indicate that the customer intends to use another payment type (e.g., cash, check, etc.) for payment of the transaction.

In at least one example, the GUI 1200 can include a transaction code, such as the QR code 1210. In at least one example, based at least in part on the customer causing an interaction between the customer computing device 110 and the transaction code, such as the QR code 1210, the mobile payment application 108 can send an indication of such an interaction to the P2P processing component 116 which can forward an indication of the interaction to the payment processing component 126 (e.g., via the P2P API 142), as described above. Based at least in part on the payment processing component 126 receiving the indication of the interaction between the customer computing device 110 and the transaction code, such as the QR code 1210, the payment processing component 126 can cause at least a portion of transaction data associated with the transaction to be presented via a user interface of the customer computing device 110. That is, in at least one example, the mobile payment application 108 can receive transaction data via the P2P processing component 116 from the payment processing component 126. In such an example, the mobile payment application 108 can cause the transaction data, or a portion thereof, to be presented via a user interface, such as a payment user interface, a tipping user interface, and/or a feedback user interface. The GUI 1212, as illustrated in FIG. 12B, is an example of a user interface wherein a customer can input a tip, confirm the payment (e.g., via an interaction with a selectable control 1214), and/or provide feedback associated with the transaction (e.g., via an interaction with user interface element(s) 1216).

In some examples, based at least in part on the customer inputting an amount for a tip, the P2P processing component 116 can transfer funds from the stored balance of the customer to the payment processing server(s) 104 based on the previous authorization (e.g., for the total amount of the transaction). In some examples, the previous authorization can be valid for a designated period of time such that a change to the total amount (e.g., via a refund, tip, etc.) can be authorized via the previous authorization. In some examples, a second authorization and settlement may need to be processed to cause funds associated with the tip to be transferred from the stored balance of the customer to the payment processing server(s) 104. In such examples, communications illustrated in FIGS. 2A and/or 2B, for example, can be performed to obtain the subsequent authorization. In such an example, another webhook, similar to the webhook 248 described above with reference to FIG. 2B, can be utilized to process the transfer of funds associated with the tip.

In some examples, a customer can use a first payment type (e.g., a credit card or debit card) to satisfy payment for at least a portion of a total cost of a transaction. The customer may desire to use funds from their P2P payment platform stored balance for a remaining portion of the total cost of the transaction or a tip. In such an example, techniques described herein can be applicable to obtaining authorization to access funds to satisfy the remaining portion of the total cost of the transaction and/or a tip. That is, in such examples, communications illustrated in FIG. 2B, for example, can be performed to obtain the authorization for the remaining portion of the total cost of the transaction and/or a tip. In some examples, a transaction code as described herein can be associated with a receipt (e.g., paper or electronic) or a user interface that informs the customer that the transaction is complete.

Techniques described herein can additionally be applicable to processing refunds. In such an example, a transaction code can be generated which, upon detecting an interaction therewith, can cause communications as illustrated above with reference to FIG. 2B to be performed so that the payment processing component 126 can transfer funds, equal to the refund and/or otherwise based at least in part on the refund, from the stored balance of the merchant associated with the payment processing platform to the stored balance of the customer associated with the P2P payment platform.

Figure 13:
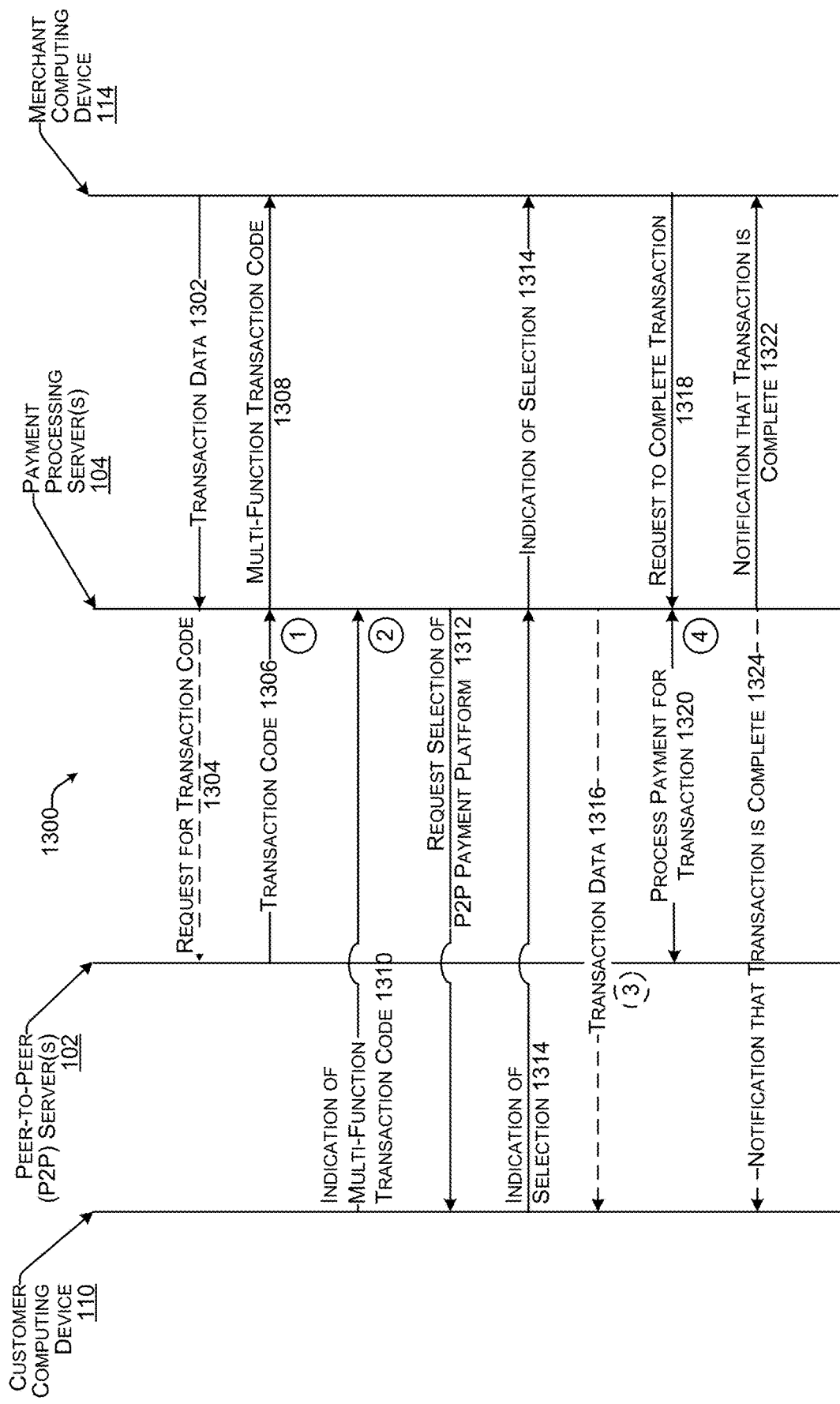
FIG. 13 illustrates another example process for processing payment for a transaction using a multi-function transaction code, as described herein.

FIG. 13 illustrates another example process 1300, illustrated as a swim lane diagram, for processing payment for a transaction using a multi-function transaction code (e.g., an "aggregate" transaction code), as described herein. Components of the example environment 100 (e.g., the customer computing device 110, the P2P server(s) 102, the payment processing server(s) 104, and the merchant computing device 114) are represented by vertical lines. In at least one example, horizontal lines shown as originating from or terminating at a line corresponding to a particular component can represent communications sent from or received by the particular component. Additional details are provided below.

In at least one example, the POS application 112 can generate transaction data associated with a transaction between a merchant and a customer. In at least one example, the POS application 112 can send the transaction data (e.g., via a transaction data communication 1302) to the payment processing server(s) 104. In some examples, the payment processing component 126 can receive the transaction data from the POS application 112. In some examples, the payment processing component 126 can store the transaction data (e.g., in a data structure associated with the transaction). In some examples, based at least in part on receiving the transaction data, the payment processing component 126, can send a request 1304 for a transaction code to the P2P server(s) 102. In at least one example, the P2P processing component 116 can receive the request 1304 and can generate a transaction code based at least in part on the transaction data received from the payment processing component 126. Additional details associated with the transaction data and request 1304 are described above with reference to FIG. 2A (e.g., the transaction data communication 202 and the request 204).

In at least one example, the P2P processing component 116 can send the transaction code to the payment processing server(s) 104 (e.g., via a transaction code communication 1306). That is, the payment processing component 126 can receive the transaction code from the P2P server(s) 102. Additional details associated with the P2P processing component 116 generating and sending the transaction code, via the P2P API 142, to the payment processing server(s) 104 is described above with reference to FIGS. 2A and 2B. In at least one example, the payment processing server(s) 104 can receive transaction codes from one or more other P2P payment platforms or service providers and/or data to be encoded in a transaction code. In such an example, the payment processing component 126 can generate a multi-function transaction code, as represented by the encircled number one, and described in more detail below with reference to FIG. 13. In at least one example, the payment processing component 126 can send the multi-function transaction code to the merchant computing device 114 (e.g., via a multi-function transaction code communication 1308). In some examples, the multi-function transaction code can include a resource locator associated with the payment processing platform.

In at least one example the POS application 112 can receive the multi-function transaction code and can cause the multi-function transaction code to be presented via a user interface. In at least one example, the multi-function transaction code can be presented via cart building user interface presented by the POS application 112. That is, the multi-function transaction code can be presented via the user interface while the merchant is adding one or more items to a virtual cart associated with the transaction. In some examples, the card building user interface can be presented prior to a payment selection user interface being presented. That is, in some examples, the multi-function transaction code can be presented prior to a payment selection user interface presented by the POS application 112. In an additional or alternative example, the multi-function transaction code can be presented in association with a payment selection user interface presented by the POS application 112. In some examples, the multi-function transaction code can be presented via a user interface associated with the POS application 112, for example with a completed transaction user interface or the like.

In at least one example, the customer can cause an interaction between the customer computing device 110 and the multi-function transaction code. In some examples, the customer can utilize the sensor(s) 140 associated with the customer computing device 110 to capture an image or obtain data associated with the multi-function transaction code. For instance, if the multi-function transaction code is a QR code, a camera associated with the customer computing device 110 can capture an image of the QR code. In an example where the multi-function transaction code comprises an RFID tag, a NFC reader device can read data associated with the RFID tag via an interaction between the customer computing device 110 and the RFID tag (e.g., by bringing the customer computing device 110 within a threshold distance of the RFID tag such that the NFC reader can read the data associated therewith). In some examples, the sensor used to capture the image or otherwise obtain data associated with the multi-function transaction code can be native to the customer computing device. In some examples, the sensor used can be integrated into the mobile payment application 108.

In at least one example, based at least in part on detecting an interaction between the customer computing device 110 and the multi-function transaction code, the customer computing device 110 can send the indication 1310 of the multi-function transaction code to the payment processing server(s) 104. In some examples, the payment processing component 126 can compare context data associated with the indication with transaction data associated with the transaction to associate the customer with the transaction, as represented by the encircled number two, and described in more detail in FIG. 5, above. In at least one example, the payment processing server(s) 104 can receive the indication 1310 and, because the transaction code is a multi-function transaction code, the payment processing component 126 can send a request 1312 to the customer computing device 110 to select one of the P2P payment platforms or other service providers associated with the multi-function transaction code. Based at least in part on receiving the request 1312, the customer computing device 110 can cause a user interface to be presented to enable the customer to provide an input indicating a selection of a P2P payment platform or other service provider. In some examples, such a user interface can be presented via an instant application, a progressive web application, a web browser, the mobile payment application 108 or another application installed on the customer computing device 110 that is associated with the payment processing platform, or the like. Additional details are described below with reference to FIGS. 15, 16A, and 16B.

In at least one example, based at least in part on detecting an input associated with a selection of a P2P payment platform or other service provider, the customer computing device 110 can send an indication 1314 of the selection to the payment processing server(s) 104. In at least one example, the payment processing component 126 can send the indication 1314 of the selection to the merchant computing device 114. That is, in at least one example, the payment processing component 126 can send the indication 1314 to the POS application 112. In at least one example, in response to receiving the indication, the POS application 112, can terminate the presentation of the multi-function transaction code via the user interface of the merchant computing device 114.

In at least one example, based at least in part on receiving the indication 1314 of the selection, the payment processing component 126 can send at least a portion of the transaction data to the customer computing device 110 (e.g., via a transaction data communication 1316). That is, in at least one example the payment processing component 126, can send at least a portion of the transaction data to the payment processing component 126. In at least one example the P2P processing component 116 can send the portion of the transaction data to the mobile payment application 108 for presentation via a user interface associated therewith. In at least one example, when the portion of transaction data is sent in association with cart building, indications of one or more items added to a virtual cart of the customer can be presented via cart building user interface presented by the mobile payment application 108. In some examples, the cart building user interface can be updated in near-real time, such that as an item is added to a virtual cart via the POS application 112, an indication of the item can be presented via a cart building interface presented by the mobile payment application 108.

In some examples, as the P2P processing component 116 receives transaction data, the P2P processing component 116 can analyze the transaction data to determine whether an incentive applies. Such a process, illustrated by the encircle number three, is described in more detail above with reference to FIG. 7.

In at least one example, the POS application 112 can send a request 1318 to complete the transaction to the payment processing server(s) 104. In at least one example, the merchant can provide an input via a cart building user interface presented by the POS application 112 to indicate that the transaction is complete. In such an example, the POS application 112 can send the request to complete the transaction to the payment processing component 126. In at least one example, the payment processing component 126 can perform a risk analysis to determine whether to proceed with processing payment for the transaction, as illustrated by the encircled number four, and can process payment for the transaction using the selected P2P payment. Additional details associated with risk analyses are described above with reference to FIGS. 10 and 11.

In at least one example, so long as a level of risk determined to be associated with the customer, merchant, and/or transaction is below a threshold, the payment processing component 126 can communicate, via one or more communications 1320, with the P2P server(s) 102 to process payment for the transaction. If the customer selects a different service provider for processing payment for the transaction, the payment processing component 136 can exchange communications with the selected service provider to process payment for the transaction.

In at least one example, based at least in part on receiving an indication that the payment was successful (e.g., from the P2P server(s) 102 or otherwise), the payment processing component 126 can send a notification 1322 that the transaction is complete to the POS application 112 and/or can send a notification 1324 that the transaction is complete to the mobile payment application 108, via the P2P server(s) 102. In at least one example, the POS application 112 can present a user interface indicating that the transaction is complete. In at least one example, the mobile payment application 108 can present a user interface indicating that the transaction is complete. In some examples, the mobile payment application 108 can present a user interface to enable the customer to provide a gratuity (e.g., a tipping user interface), loyalty information, feedback, and/or the like. Additional details are provided herein.

In FIG. 13, the multi-function transaction code can point back to the payment processing server(s) 104, which can prompt the customer to select a P2P payment option. However, in an alternative example, the multi-function transaction code can point to the P2P server(s) 102, as described above with reference to FIGS. 2A and 2B. In such an example, the P2P processing component 116 can prompt the customer to select a P2P payment option and, if the customer selects a P2P payment option different than the P2P payment platform, the P2P processing component 116 can prompt the customer to download the mobile payment application 108 and onboard and/or transfer data to the P2P payment platform.

Figure 14:
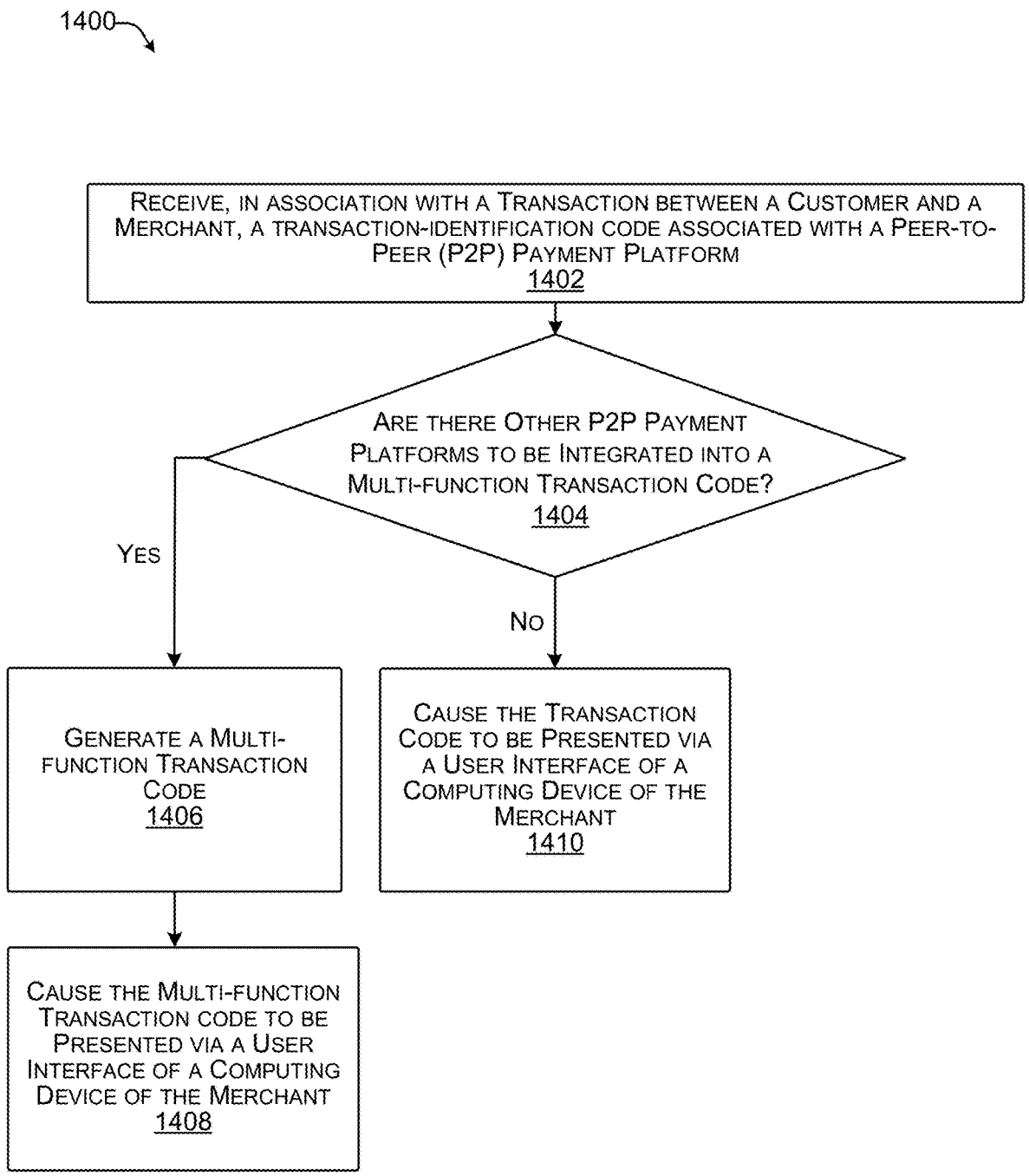
FIG. 14 illustrates an example process associated with causing a multi-function transaction code to be presented in association with a transaction, as described herein.

FIG. 14 illustrates an example process 1400 associated with causing a multi-function transaction code to be presented in association with a transaction, as described herein.

At operation 1402, the payment processing component 126 can receive, in association with the transaction between a customer and a merchant, a transaction code associated with a P2P payment platform. As described above, in at least one example, the P2P processing component 116 can send a transaction code to the payment processing server(s) 104. In such an example, the payment processing component 126 can receive the transaction code from the P2P server(s) 102. In at least one example, the transaction code can be received responsive to a request for a transaction code sent by the payment processing component 126. In some examples, the request can be associated with transaction data, such that the transaction code is specific to the transaction. In such examples, the transaction code can be dynamic. In some examples, the transaction code can be a static transaction code that can be provided to the payment processing server(s) 104 prior to the transaction, in association with the transaction, or the like. In some such examples, the static transaction code can be used with multiple transactions.

At operation 1404, the payment processing component 126 can determine whether there are other P2P payment platforms (or service providers) to be integrated into a multi-function transaction code. In at least one example, the payment processing component 126 can receive, from multiple P2P payment platforms or service providers that can be used for processing payments for transactions, data to be encoded into a transaction code. In some examples, the P2P payment platforms are associated with different service providers (e.g., third-party P2P payment platforms). In some examples, the other service providers can be third-party service providers.

At operation 1406, based at least in part on determining that there are other P2P payment platforms (or service providers) to be integrated into a multi-function transaction code, the payment processing component 126 can generate a multi-function transaction code and can cause the multi-function transaction code to be presented via user interface of a computing device of the merchant (e.g., the merchant computing device 114), as illustrated at operation 1408. In at least one example, the multi-function transaction code can be encoded with data associated with multiple, different P2P payment platforms and/or service providers. In some examples, data associated with the multi-function transaction code can be mapped to, or otherwise associated with, a table, which indicates the multiple P2P payment platforms and/or service providers that are associated with the multi-function transaction code. Like the transaction code, the multi-function transaction code can be a QR code, a barcode, unique identifier, or the like.

At operation 1410, based at least in part on determining that there are no other P2P payment platforms (or service providers) to be integrated into a multi-function transaction code, the payment processing component 126 can cause the transaction code to be presented via a user interface of a computing device of the merchant (e.g., the merchant computing device 114), as described above.

Figure 15:
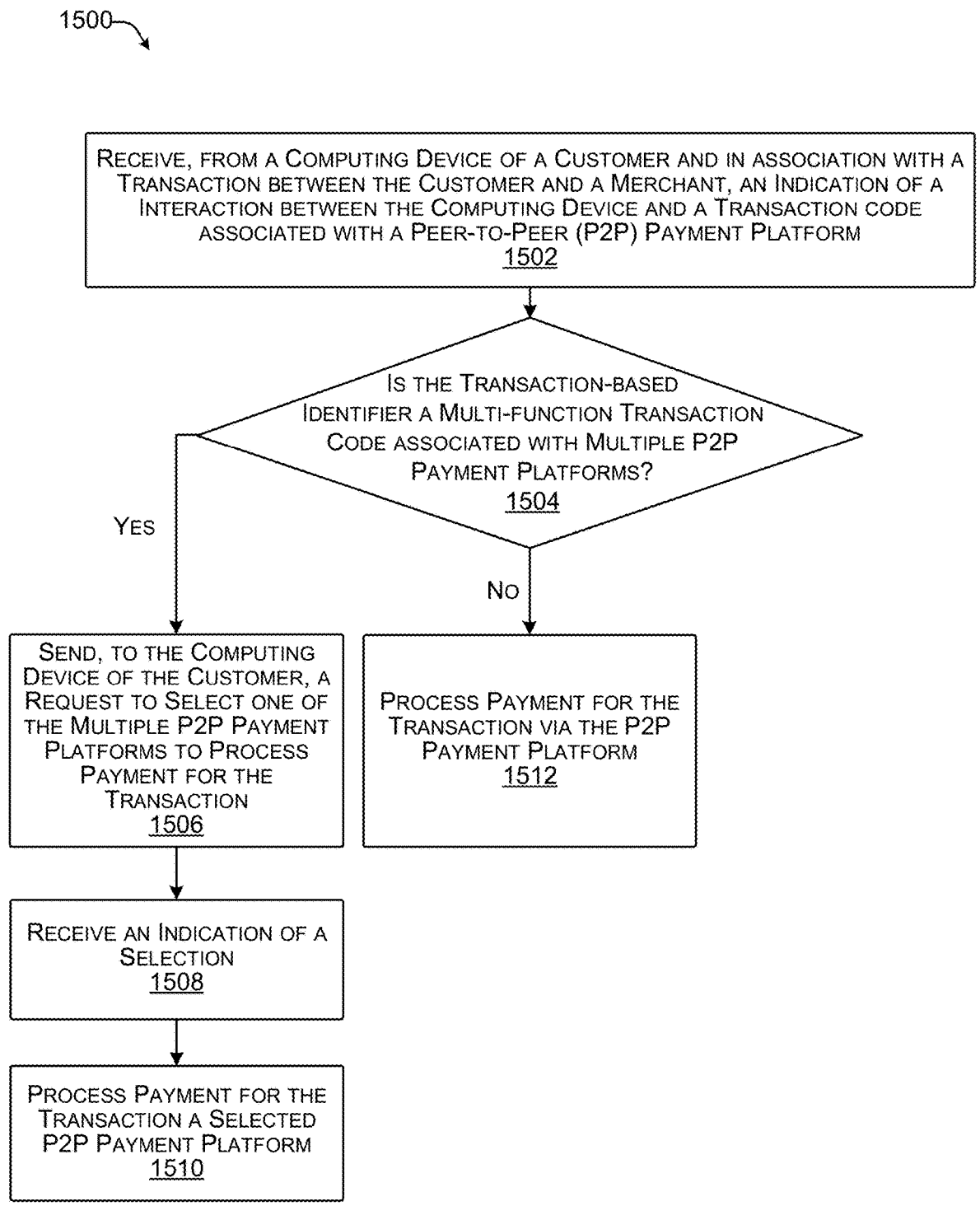
FIG. 15 illustrates an example process for processing payment for a transaction based at least in part on a selection of a peer-to-peer (P2P) payment platform, as described herein.

FIG. 15 illustrates an example process 1500 for processing payment for a transaction based at least in part on a selection of a peer-to-peer (P2P) payment platform, as described herein.

At operation 1502, the payment processing component 126 can receive, from a computing device of a customer (e.g., the customer computing device 110) and in association with the transaction between the customer and a merchant, an indication of an interaction between the computing device (e.g., the customer computing device 110) and the transaction code associated with a P2P payment platform. As described above, in at least one example, a customer can cause an interaction between the customer computing device 110 and a transaction code that can be presented at a point of sale, for example, via the merchant computing device 115 or otherwise. In some examples, one of the sensor(s) 150 associated with the customer computing device 110 can scan, capture, read, or otherwise obtain data associated with the transaction code via an interaction therewith and the customer computing device 110 can send an indication of the interaction between the customer computing device 110 and the transaction code to the payment processing server(s) 104. The payment processing component 126 can receive the indication.

At operation 1504, the payment processing component 126 can determine whether the transaction code is a multi-function transaction code associated with multiple P2P payment platforms. In at least one example, the payment processing component 126 can determine that the transaction code associated with the interaction is a multi-function transaction code. That is, the payment processing component 126 can perform a look-up or other search to determine that the transaction code is associated with multiple P2P payment platforms (or service providers).

At operation 1506, based at least in part on determining that the transaction code is a multi-function transaction code, the payment processing component 126 can send to the computing device of the customer (e.g., the customer computing device 110), a request to select one of the multiple P2P payment platforms to process payment for the transaction. In at least one example, the customer computing device 110 can present a user interface, based at least in part on receiving the request, that includes one or more selectable controls with which the customer can interact to select one of the P2P payment platforms (or other service providers). An example of such a user interface is provided below. In some examples, such a user interface can be presented via an instant application, a progressive web application, a web browser, the mobile payment application 108 or another application associated with the payment processing platform, or the like.

At operation 1508, the payment processing component 126 can receive an indication of a selection. In at least one example, the customer can interact with the user interface to provide an input indicating a selection of one of the multiple P2P payment platforms (or other service providers). The customer computing device 110 can send an indication of the selection to the payment processing component 126. The payment processing component 126 can therefore process payment for the transaction using the selected P2P payment platform, as illustrated at operation 1510. That is, the payment processing component 126 can send one or more communications (e.g., an authorization request, a settlement request, etc.) to the selected P2P payment platform to process payment for the transaction.

At operation 1512, based at least in part on determining that the transaction code is not a multi-function transaction code, the payment processing component 126 can process payment for the transaction via the P2P payment platform. That is, the payment processing component 126 can send one or more communications (e.g., an authorization request, a settlement request, etc.) to the P2P payment platform associated with the transaction code to process payment for the transaction.

Figure 16B:
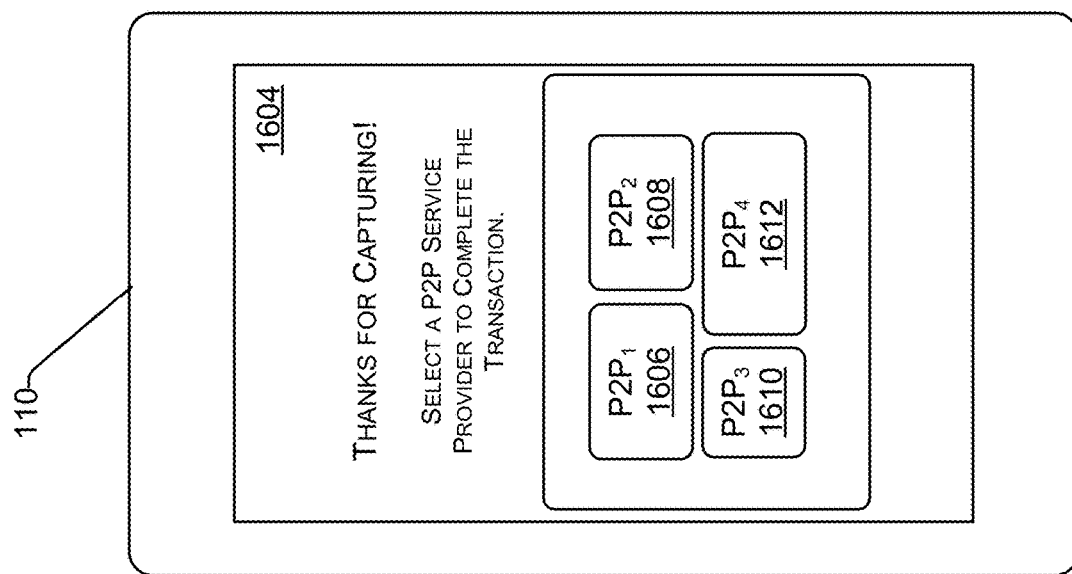
FIG. 16B illustrates an example GUI that can be presented via a computing device of a customer.
Figure 16A:
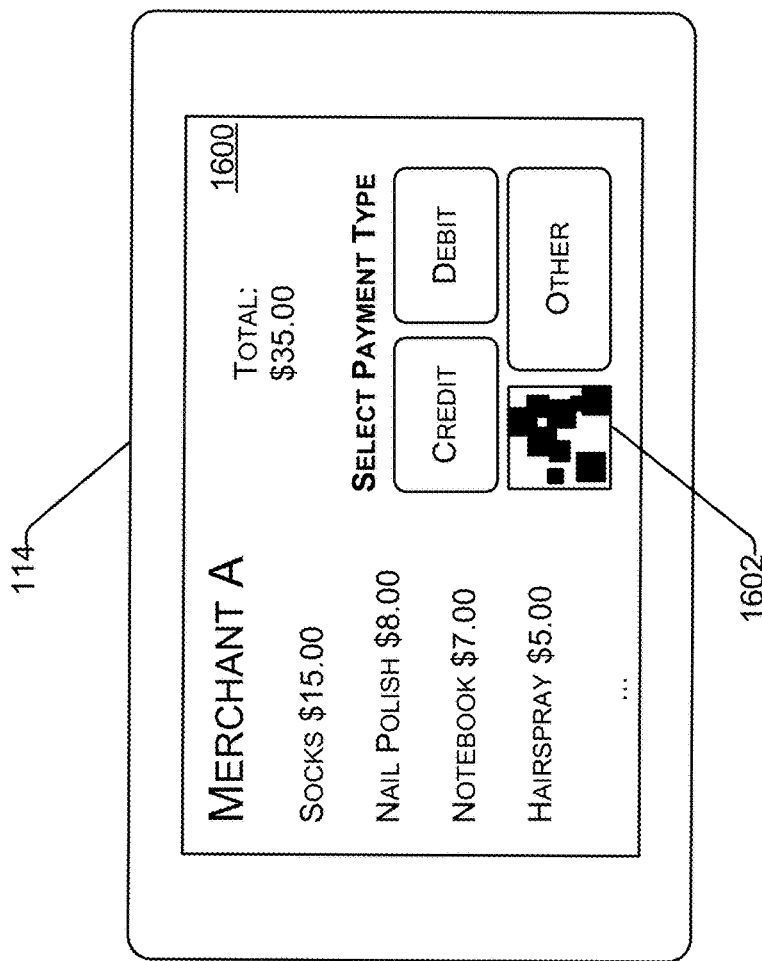
FIG. 16A illustrates an example GUI that can be presented via a computing device of a merchant.

FIG. 16A illustrates an example GUI that can be presented via the merchant computing device 114. FIG. 16A illustrates an example GUI 1600 that can be presented via the merchant computing device 114. In at least one example, the POS application 112 can present a payment selection user interface that includes user interface element(s) representing payment option(s) for remitting payment for a transaction between a merchant and a customer (e.g., credit, debit, other). In at least one example, the GUI 1600 can include a transaction code, such as a QR code 1602, that can be associated with at least one P2P payment platform. As described above, in at least one example, the transaction code can include a resource locator associated with a location of the P2P payment platform and/or a deep link to the mobile payment application 108. In some examples, as described above, the transaction code can be a multi-function transaction code that can be associated with multiple, different P2P payment platforms or other service providers. In at least one example, the customer computing device 110 can interact with the transaction code, for example, using the sensor(s) 140 associated therewith. For instance, a camera can capture an image of the QR code 1602.

In some examples, each different P2P payment platform and/or service provider can alternatively be associated with their own transaction code (e.g., instead of the GUI 1600 presenting a multi-function transaction code).

FIG. 16B illustrates an example GUI 1604 that can be presented via the customer computing device 110. In at least one example, based at least in part on determining that the transaction code is a multi-function transaction code, the payment processing component 126 can send to the customer computing device 110, a request to select one of the multiple P2P payment platforms to process payment for the transaction. In at least one example, the customer computing device 110 can present a user interface, such as the GUI 1604, based at least in part on receiving the request, that includes one or more selectable controls with which the customer can interact to select one of the P2P payment platforms (or other service providers). Four selectable controls are shown: selectable control 1606, selectable control 1608, selectable control 1610, and selectable control 1612.

Based at least in part on detecting an actuation of one of the selectable controls (1606-1610), the customer computing device 110 can send an indication of the selection to the payment processing component 126, as described above. In some examples, the GUI 1604 can be presented via an instant application, a progressive web application, a web browser, the mobile payment application 108 or another application associated with the payment processing platform, or the like.

Figure 17:
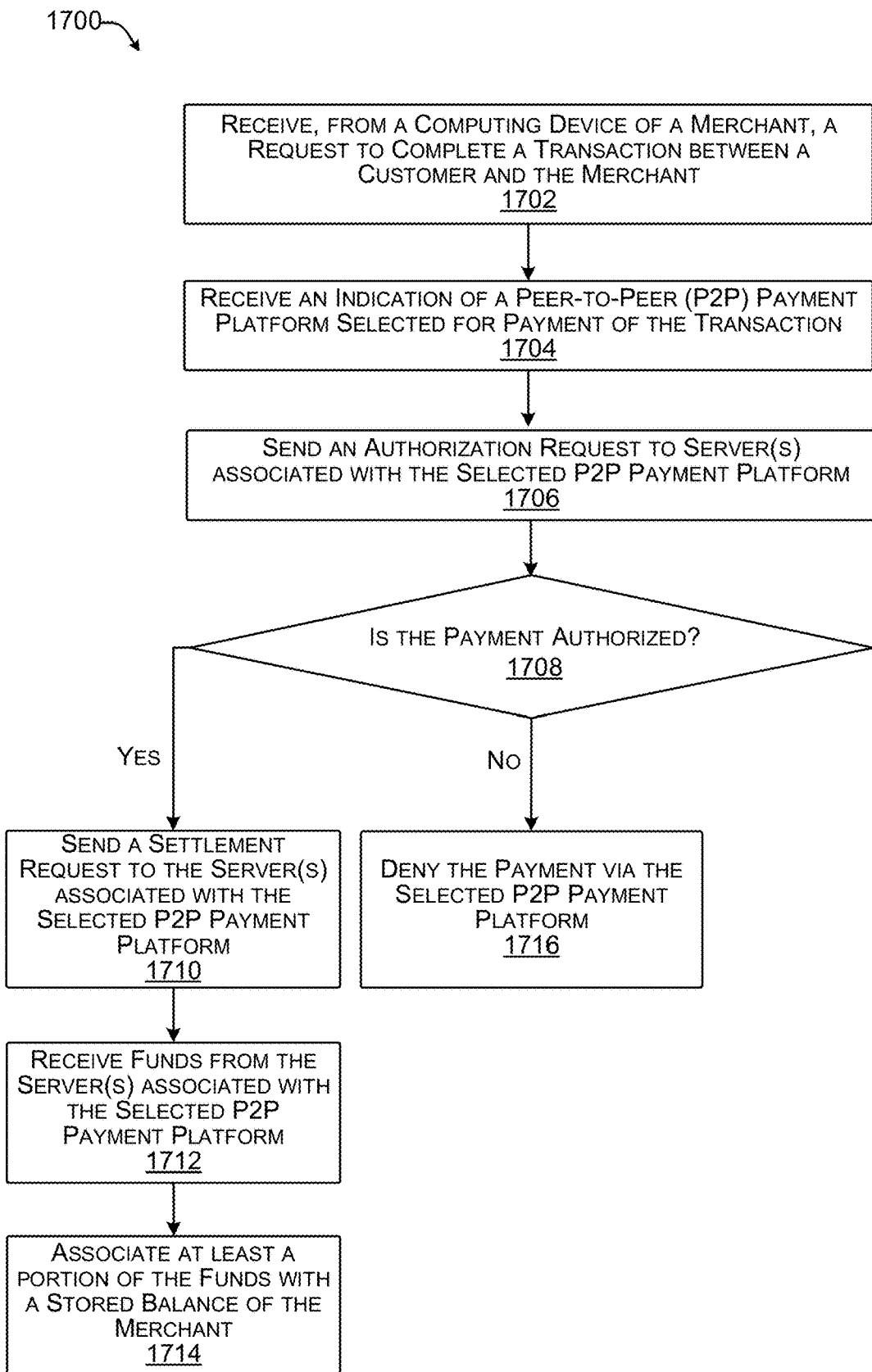
FIG. 17 illustrates additional details associated with the example process for processing payment for a transaction based at least in part on a selection of a P2P payment platform, as described herein.

FIG. 17 illustrates an example process 1700 including additional details associated with the example process for processing payment for a transaction based at least in part on a selection of a P2P payment platform, as described herein.

At operation 1702, the payment processing component 126 can receive, from a computing device of a merchant (e.g., the merchant computing device 114), a request to complete a transaction between a customer and the merchant. In at least one example, the POS application 112 can send a request to complete a transaction to the payment processing server(s) 104. In at least one example, the merchant can provide an input via a cart building user interface presented by the POS application 112 to indicate that the transaction is complete. In such an example, the POS application 112 can send the request to complete the transaction to the payment processing component 126. In at least one example, as described above, the payment processing component 126 can perform a risk analysis to determine whether to proceed with processing payment for the transaction. Additional details are described above with reference to FIG. 10.

At operation 1704, the payment processing component 126 can receive an indication of a P2P payment platform selected for payment of the transaction. As described above with reference to FIG. 14, the payment processing component 126 can receive an indication of a P2P payment platform selected for payment of the transaction. In examples where a transaction code is a multi-functional transaction code, the customer can interact with a user interface to select a P2P payment platform for processing payment of the transaction. In examples where a transaction code is not multi-functional (e.g., associated with a single P2P payment provider), an interaction between the customer computing device 110 and the transaction code can indicate a selection of the corresponding P2P payment platform.

At operation 1706, the payment processing component 126 can send an authorization request to server(s) associated with the selected P2P payment platform. In at least one example, the payment processing component 126 can send an authorization request, via the P2P communication component 128, to the P2P server(s) 102. In at least one example, the P2P processing component 117 can receive the authorization request via the payment processing communication component 118 and can determine whether to approve or deny the authorization request based at least in part on transaction data received from the payment processing platform and/or a stored balance of the customer managed and/or maintained by the P2P payment platform. In least one example, if the stored balance associated with the customer is greater than, or equal to, the total cost of the transaction, the payment processing component 126 can send an authorization approval (i.e., a response to the authorization request) to the payment processing component 126, via the payment processing communication component 118 and the P2P communication component 128. In some examples, the stored balance associated with the customer may be less than the total cost of the transaction. In at least one example, the P2P processing component 117 can authorize at least a portion of the cost of the transaction. In such an example, the P2P processing component 117 can send an authorization approval for at least the portion of the total cost of the transaction to the payment processing server(s) 104.

At operation 1708, the payment processing component 126 can determine whether the payment is authorized. In at least one example, the payment processing component 126 can receive a response to the authorization request. If the response indicates that the transaction is authorized, the payment processing component 126 can determine that the payment is authorized. If the response indicates that the transaction is not authorized, the payment processing component 126 can determine that the payment is not authorized.

At operation 1710, based at least in part on determining that the payment is authorized, the payment processing component 126 can send a settlement request to the server(s) associated with the selected P2P payment platform (e.g., the P2P server(s) 102). In at least one example, based at least in part on receiving the authorization approval from the P2P server(s) 102, the payment processing component 126 can send a settlement request to the P2P server(s) 102, via the P2P communication component 128. In at least one example, based at least in part on receiving the settlement request from the payment processing server(s) 104, the P2P processing component 117 can access funds associated with the stored balance of the customer. The P2P processing component 117 can transfer the funds from the P2P payment platform to the payment processing platform. That is, the P2P server(s) 102 can transfer funds, equal to at least a portion of the total cost of the transaction, from the stored balance of the customer to the payment processing server(s) 104 for associating with a stored balance of the merchant. In such an example, the payment processing component 126 can receive the funds, and deposit at least a portion of the funds into a stored balance of the merchant managed and/or maintained by the payment processing platform, as illustrated at operation 1714. As described above, in some examples, the payment processing component 126 can deposit the funds, or at least a portion thereof, into the stored balance of the merchant prior to receiving the funds from the P2P server(s) 102. That is, the P2P server(s) 102 can transfer the funds to the payment processing server(s) 104, at which time, the payment processing component 126 can "repay" the payment processing platform for the funds paid to the merchant.

At operation 1716, the payment processing component 126 can deny the payment via the selected P2P payment platform. In at least one example, if the payment is not authorized, the payment processing component 126 can send an indication that the payment is denied to the customer computing device 110 and/or the merchant computing device 114. In such an example, the customer can select another option for payment.

Figure 18:
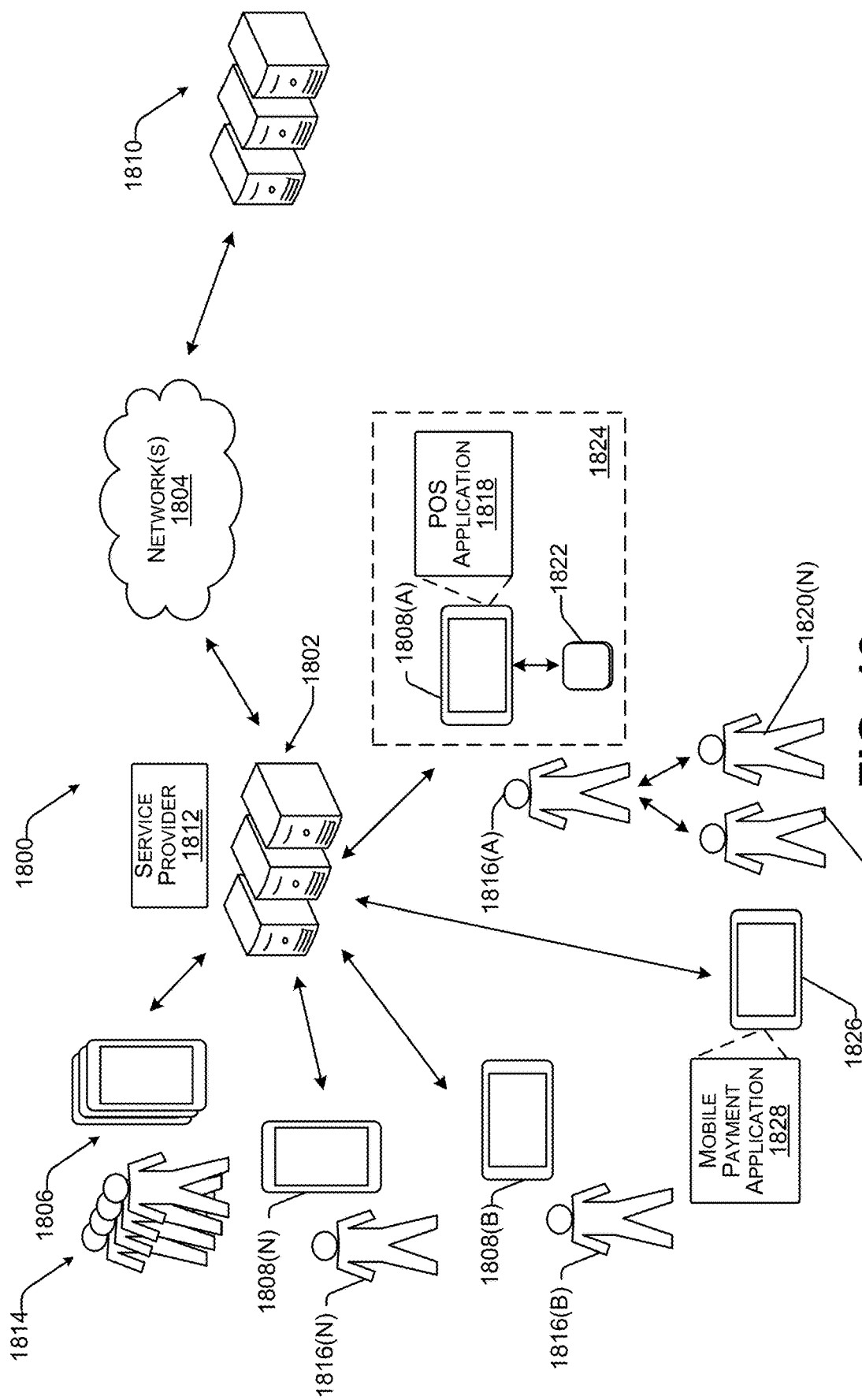
FIG. 18 illustrates an example environment within which techniques described herein can be performed.

FIG. 18 illustrates an example environment 1800. The environment 1800 includes server computing device(s) 1802 that can communicate over network(s) 1804 with user devices 1806 (which, in some examples can be merchant devices 1808 (individually, 1808(A)-1808(N))) and/or server computing device(s) 1810 associated with third-party service provider(s). The server computing device(s) 1802 can be associated with a service provider 1812 that can provide one or more services for the benefit of users 1814, as described below. Actions attributed to the service provider 1812 can be performed by the server computing device(s) 1802.

In at least one example, such as when the P2P payment platform and the payment processing platform are associated with a same service provider (e.g., the service provider 1812), the server computing device(s) 1802 can correspond to the P2P server(s) 102 and/or the payment processing server(s) 104 described above with reference to FIG. 1. In an example where the P2P payment platform and the payment processing platform are not associated with a same service provider, either the P2P server(s) 102 or the payment processing server(s) 104 can be associated with the server computing device(s) 1810 associated with third-party service provider(s). In at least one example, the network(s) 1804 can correspond with the network(s) 106 of FIG. 1.

The environment 1800 can include a plurality of user devices 1806, as described above. The individual of the user devices 1806 can correspond with the customer computing device 110 or the merchant computing device 114, as described above. Each one of the plurality of user devices 1806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1814. The users 1814 can be referred to as customers, buyers, merchants, sellers, borrowers, employees, employers, payors, payees, couriers and so on. The users 1814 can interact with the user devices 1806 via user interfaces presented via the user devices 1806. In at least one example, a user interface can be presented via a web browser, or the like. In other examples, a user interface can be presented via an application, such as a mobile application or desktop application, which can be provided by the service provider 1812 or which can be an otherwise dedicated application. In some examples, individual of the user devices 1806 can have an instance or versioned instance of an application, which can be downloaded from an application store, for example, which can present the user interface(s) described herein. Examples of such an application include the mobile payment application 108, the POS application 112, or the like. In at least one example, a user 1814 can interact with the user interface via touch input, spoken input, or any other type of input.

As described above, in at least one example, the users 1814 can include merchants 1816 (individually, 1816(A)-1816(N)). In an example, the merchants 1816 can operate respective merchant devices 1808, which can be user devices 1806 configured for use by merchants 1816. For the purpose of this discussion, a "merchant" can be any entity that offers items (e.g., goods or services) for purchase or other means of acquisition (e.g., rent, borrow, barter, etc.). The merchants 1816 can offer items for purchase or other means of acquisition via brick-and-mortar stores, mobile stores (e.g., pop-up shops, food trucks, etc.), online stores, combinations of the foregoing, and so forth. In some examples, at least some of the merchants 1816 can be associated with a same entity but can have different merchant locations and/or can have franchise/franchisee relationships. In additional or alternative examples, the merchants 1816 can be different merchants. That is, in at least one example, the merchant 1816(A) is a different merchant than the merchant 1816(B) and/or the merchant 1816(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1808 can have an instance of a POS application 1818 stored thereon. The POS application 1818 can correspond to the POS application 112 described above with reference to FIG. 1. The POS application 1818 can configure the merchant device 1808 as a POS terminal, which enables the merchant 1816(A) to interact with one or more customers 1820. As described above, the users 1814 can include customers, such as the customers 1820 shown as interacting with the merchant 1816(A). For the purpose of this discussion, a "customer" can be any entity that acquires items from merchants. While only two customers 1820 are illustrated in FIG. 18, any number of customers 1820 can interact with the merchants 1816. Further, while FIG. 18 illustrates the customers 1820 interacting with the merchant 1816(A), the customers 1820 can interact with any of the merchants 1816.

In at least one example, interactions between the customers 1820 and the merchants 1816 that involve the exchange of funds (from the customers 1820) for items (from the merchants 1816) can be referred to as "transactions." In at least one example, the POS application 1818 can determine transaction data associated with the POS transactions. Transaction data can include payment information, which can be obtained from a reader device 1822 associated with the merchant device 1808(A), user authentication data, purchase amount information, point-of-purchase information (e.g., item(s) purchased, date of purchase, time of purchase, etc.), etc. The POS application 1818 can send transaction data to the server computing device(s) 1802. Furthermore, the POS application 1818 can present a UI to enable the merchant 1816(A) to interact with the POS application 1818 and/or the service provider 1812 via the POS application 1818.

In at least one example, the merchant device 1808(A) can be a special-purpose computing device configured as a POS terminal (via the execution of the POS application 1818). In at least one example, the POS terminal may be connected to a reader device 1822, which is capable of accepting a variety of payment instruments, such as credit cards, debit cards, gift cards, short-range communication based payment instruments, and the like, as described below. In at least one example, the reader device 1822 can plug in to a port in the merchant device 1808(A), such as a microphone port, a headphone port, an audio-jack, a data port, or other suitable port. In additional or alternative examples, the reader device 1822 can be coupled to the merchant device 1808(A) via another wired or wireless connection, such as via a Bluetooth®, BLE, and so on. Additional details are described below with reference to FIG. 18. In some examples, the reader device 1822 can read information from alternative payment instruments including, but not limited to, wristbands and the like.

In some examples, the reader device 1822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1822, and communicate with the server computing device(s) 1802, which can provide, among other services, a payment processing platform. The server computing device(s) 1802 associated with the service provider 1812 can communicate with server computing device(s) 1810, as described below. In this manner, the POS terminal and reader device 1822 may collectively process transaction(s) between the merchants 1816 (e.g., merchant 1816(A)-1816(N)) and customers 1820 (e.g., customer 1820(A)-1820(N)). In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1822 of the POS system 1824 are shown as separate devices, in additional or alternative examples, the POS terminal and the reader device 1822 can be part of a single device. In some examples, the reader device 1822 can have a display integrated therein for presenting information to the customers 1820. In additional or alternative examples, the POS terminal can have a display integrated therein for presenting information to the customers 1820. POS systems, such as the POS system 1824, may be mobile, such that POS terminals and reader devices may process transactions in disparate locations across the world. POS systems can be used for processing card-present transactions and card-not-present (CNP) transactions, as described below.

A card-present transaction is a transaction where both a customer 1820 and his or her payment instrument are physically present at the time of the transaction. Card-present transactions may be processed by swipes, dips, taps, or any other interaction between a physical payment instrument (e.g., a card), or otherwise present payment instrument, and a reader device 1822 whereby the reader device 1822 is able to obtain payment data from the payment instrument. A swipe is a card-present transaction where a customer 1820(A) slides a card, or other payment instrument, having a magnetic strip through a reader device 1822 that captures payment data contained in the magnetic strip. A dip is a card-present transaction where a customer 1820(A) inserts a payment instrument having an embedded microchip (i.e., chip) into a reader device 1822 first. The dipped payment instrument remains in the payment reader until the reader device 1822 prompts the customer 1820(A) to remove the card, or other payment instrument. While the payment instrument is in the reader device 1822, the microchip can create a one-time code which is sent from the POS system 1824 to the server computing device(s) 1810 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1820 may tap or hover his or her payment instrument (e.g., card, electronic device such as a smart phone running a payment application, etc.) over a reader device 1822 to complete a transaction via short-range communication (e.g., NFC, RFID, Bluetooth®, BLE, etc.). Short-range communication enables the payment instrument to exchange information with the reader device 1822. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

In at least one example, a customer 1820(A) can interact with one of the user devices 1806 (e.g., a customer device 1826). In at least one example, the customer device 1826 can have an instance of a mobile payment application 1828 installed thereon. The mobile payment application 1828 can correspond to the mobile payment application 108 described above with reference to FIG. 1. In at least one example, the mobile payment application 1828 can present one or more user interfaces to enable the customer 1820(A) to send and/or receive funds via a P2P payment platform, as described above. In some examples, as described above, the mobile payment application 108 can exchange communications with the merchant device 1808(A) and/or the server computing device(s) 1802 to process contactless payments. That is, in at least one example, the mobile payment application 1828 can enable the customer to participate in a P2P transaction with the merchant via the P2P payment platform and payment processing platform described herein.

The POS system 1824, the server computing device(s) 1802, and/or the server computing device(s) 1810 may exchange payment information and transaction data to determine whether transactions are authorized. For example, the POS system 1824 may provide encrypted payment data, user authentication data, purchase amount information, point-of-purchase information, etc. (collectively, transaction data) to server computing device(s) 1802 over the network(s) 1804. The server computing device(s) 1802 may send some of the transaction data, as described above and otherwise described herein, to the server computing device(s) 1810. As described above, in at least one example, the server computing device(s) 1810 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1810 associated therewith) can send a fund transfer request to a server computing device of a card payment network (e.g., Mastercard®, VISA®, etc.) to determine whether the transaction is authorized or deficient. In at least one example, the service provider 1812 can serve as an acquirer and connect directly with the card payment network.

The card payment network (e.g., the server computing device(s) 1810 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1810 associated therewith) can make a determination as to whether the customer has the capacity to absorb the relevant charge associated with the payment transaction. In at least one example, the service provider 1812 can serve as an issuer and/or can partner with an issuer. The transaction is either approved or rejected by the issuer and/or the card payment network (e.g., the server computing device(s) 1810 associated therewith), and a payment authorization message is communicated from the issuer to the POS device via a path opposite of that described above, or via an alternate path.

As described above, the server computing device(s) 1810, which can be associated with payment service provider(s), may determine whether the transaction is authorized based on the transaction data, as well as information relating to parties to the transaction (e.g., the customer 1820 and/or the merchant 1816(A)). The server computing device(s) 1810 may send an authorization notification over the network(s) 1804 to the server computing device(s) 1802, which may send the authorization notification to the POS system 1824 over the network(s) 1804 to indicate whether the transaction is authorized. The server computing device(s) 1802 may also transmit additional information such as transaction identifiers to the POS system 1824. In one example, the server computing device(s) 1802 may include a merchant application and/or other functional components for communicating with the POS system 1824 and/or the server computing device(s) 1810 to authorize or decline transactions.

Based on the authorization notification that is received by the POS system 1824 from server computing device(s) 1802, the merchant 1816(A) may indicate to the customer 1820 whether the transaction has been approved. In some examples, approval may be indicated at the POS system 1824, for example, at a display of the POS system 1824. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1812 can provide, among other services, payment processing platforms, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1814 can access all of the services of the service provider 1812. In other examples, the users 1814 can have gradated access to the services, which can be based on risk tolerance, IDV outputs, subscriptions, and so on. In at least one example, access to such services can be availed to the merchants 1816 via the POS application 1818. In additional or alternative examples, each service can be associated with its own access point (e.g., application, web browser, etc.).

The service provider 1812 can offer payment processing platforms for processing payments on behalf of the merchants 1816, as described above. For example, the service provider 1812 can provision payment processing software, payment processing hardware and/or payment processing platforms to merchants 1816, as described above, to enable the merchants 1816 to receive payments from the customers 1820 when conducting POS transactions with the customers 1820. For instance, the service provider 1812 can enable the merchants 1816 to receive cash payments, payment card payments, and/or electronic payments from customers 1820 for POS transactions and the service provider 1812 can process transactions on behalf of the merchants 1816.

As the service provider 1812 processes transactions on behalf of the merchants 1816, the service provider 1812 can maintain accounts or balances for the merchants 1816 in one or more ledgers. For example, the service provider 1812 can analyze transaction data received for a transaction to determine an amount of funds owed to a merchant 1816(A) for the transaction. In at least one example, such an amount can be a total purchase price less fees charged by the service provider 1812 for providing the payment processing platforms. Based on determining the amount of funds owed to the merchant 1816(A), the service provider 1812 can deposit funds into an account of the merchant 1816(A). The account can have a stored balance, which can be managed by the service provider 1812. The account can be different from a conventional bank account at least because the stored balance is managed by a ledger of the service provider 1812 and the associated funds are accessible via various withdrawal channels including, but not limited to, scheduled deposit, same-day deposit, instant deposit, and a linked payment instrument.

A scheduled deposit can occur when the service provider 1812 transfers funds associated with a stored balance of the merchant 1816(A) to a bank account of the merchant 1816(A) that is held at a bank or other financial institution (e.g., associated with the server computing device(s) 1810). Scheduled deposits can occur at a prearranged time after a POS transaction is funded, which can be a business day after the POS transaction occurred, or sooner or later. In some examples, the merchant 1816(A) can access funds prior to a scheduled deposit. For instance, the merchant 1816(A) may have access to same-day deposits (e.g., wherein the service provider 1812 deposits funds from the stored balance to a linked bank account of the merchant on a same day as POS transaction, in some examples prior to the POS transaction being funded) or instant deposits (e.g., wherein the service provider 1812 deposits funds from the stored balance to a linked bank account of the merchant on demand, such as responsive to a request). Further, in at least one example, the merchant 1816(A) can have a payment instrument that is linked to the stored balance that enables the merchant to access the funds without first transferring the funds from the account managed by the service provider 1812 to the bank account of the merchant 1816(A).

In at least one example, the service provider 1812 may provide inventory management services. That is, the service provider 1812 may provide inventory tracking and reporting. Inventory management services may enable the merchant 1816(A) to access and manage a database storing data associated with a quantity of each item that the merchant 1816(A) has available (i.e., an inventory). Furthermore, in at least one example, the service provider 1812 can provide catalog management services to enable the merchant 1816 (A) to maintain a catalog, which can be a database storing data associated with items that the merchant 1816(A) has available for acquisition (i.e., catalog management services). In at least one example, the catalog may include a plurality of data items and a data item of the plurality of data items may represent an item that the merchant 1861(A) has available for acquisition. The service provider 1812 can offer recommendations related to pricing of the items, placement of items on the catalog, and multi-party fulfilment of the inventory.

In at least one example, the service provider 1812 can provide business banking services, which allow the merchant 1816(A) to track deposits (from payment processing and/or other sources of funds) into an account of the merchant 1816(A), payroll payments from the account (e.g., payments to employees of the merchant 1816(A)), payments to other merchants (e.g., business-to-business) directly from the account or from a linked debit card, withdrawals made via scheduled deposit and/or instant deposit, etc. Furthermore, the business banking services can enable the merchant 1816(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1816 to visualize their cash flow to track their financial health, set aside money for upcoming obligations (e.g., savings), organize money around goals, etc.

In at least one example, the service provider 1812 can provide financing services and products, such as via business loans, consumer loans, fixed term loans, flexible term loans, and the like. In at least one example, the service provider 1812 can utilize one or more risk signals to determine whether to extend financing offers and/or terms associated with such financing offers.

In at least one example, the service provider 1812 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1812 can offer different types of capital loan products. For instance, in at least one example, the service provider 1812 can offer a daily repayment loan product, wherein a capital loan is repaid daily, for instance, from a portion of transactions processed by the payment processing platform on behalf of the borrower. Additionally and/or alternatively, the service provider 1812 can offer a monthly repayment loan product, wherein a capital loan is repaid monthly, for instance, via a debit from a bank account linked to the payment processing platform. The credit risk of the merchant may be evaluated using risk models that take into account factors, such as payment volume, credit risk of similarly situated merchants, past transaction history, seasonality, credit history, and so on.

Additionally or alternatively, the service provider 1812 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1816. The service provider 1812 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1812 (e.g., from payments owed to the merchant from payments processed on behalf of the merchant, funds transferred to the merchant, etc.). The service provider 1812 can offer specific financial products, such as payment instruments, tied specifically to the loan products. For example, in one implementation, the service provider 1812 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1812 can provide web-development services, which enable users 1814 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1816. In at least one example, the service provider 1812 can recommend and/or generate content items to supplement omni-channel presences of the merchants 1816. That is, if a merchant of the merchants 1816 has a web page, the service provider 1812—via the web-development or other services—can recommend and/or generate additional content items to be presented via other channel(s), such as social media, email, etc.

Furthermore, the service provider 1812 can provide payroll services to enable employers to pay employees for work performed on behalf of employers. In at least one example, the service provider 1812 can receive data that includes time worked by an employee (e.g., through imported timecards and/or POS interactions), sales made by the employee, gratuities received by the employee, and so forth. Based on such data, the service provider 1812 can make payroll payments to employee(s) on behalf of an employer via the payroll service. For instance, the service provider 1812 can facilitate the transfer of a total amount to be paid out for the payroll of an employee from the bank of the employer to the bank of the service provider 1812 to be used to make payroll payments. In at least one example, when the funds have been received at the bank of the service provider 1812, the service provider 1812 can pay the employee, such as by check or direct deposit, often a day, a week, or more after when the work was actually performed by the employee. In additional or alternative examples, the service provider 1812 can enable employee(s) to receive payments via same-day or instant deposit based at least in part on risk and/or reliability analyses performed by the service provider 1812.

Moreover, in at least one example, the service provider 1812 can provide employee management services for managing schedules of employees. Further, the service provider 1812 can provide appointment services for enabling users 1814 to set schedules for scheduling appointments and/or users 1814 to schedule appointments.

In some examples, the service provider 1812 can provide restaurant management services to enable users 1814 to make and/or manage reservations, to monitor front-of-house and/or back-of-house operations, and so on. In such examples, the merchant device(s) 1808 and/or server computing device(s) 1802 can be configured to communicate with one or more other computing devices, which can be located in the front-of-house (e.g., POS device(s)) and/or back-of-house (e.g., kitchen display system(s) (KDS)). In at least one example, the service provider 1812 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1812 can provide fulfilment services, which can use couriers for delivery, wherein couriers can travel between multiple locations to provide delivery services, photography services, etc. Couriers can be users 1814 who can travel between locations to perform services for a requesting user 1814 (e.g., deliver items, capture images, etc.). In some examples, the courier can receive compensation from the service provider 1812. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1812 can receive requests for courier services, automatically assign the requests to active couriers, and communicate dispatch instructions to couriers via user interface (e.g., application, web browser, or other access point) presented via respective devices 1806.

In some examples, the service provider 1812 can provide omni-channel fulfillment services. For instance, if a customer places an order with a merchant and the merchant cannot fulfill the order because one or more items are out of stock or otherwise unavailable, the service provider 1812 can leverage other merchants and/or sales channels that are part of the platform of the service provider 1812 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 1812 can enable conversational commerce via conversational commerce services, which can use one or more machine learning mechanisms to analyze messages exchanged between two or more users 1814, voice inputs into a virtual assistant or the like, to determine intents of user(s) 1814. In some examples, the service provider 1812 can utilize determined intents to automate customer service, offer promotions, provide recommendations, or otherwise interact with customers in real-time. In at least one example, the service provider 1812 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 1812 (e.g., the server computing device(s) 1802) can provide a P2P payment service, via a P2P payment platform as described herein, that enables P2P payments between two or more users 1814. In at least one example, the service provider 1812 can communicate with instances of a payment application (or other access points) installed on devices 1806 configured for operation by users, such as the customers 1820(A)-1820(N). An example of such a payment application is the mobile payment application 1828 described above, which can be installed on a customer computing device 1826. In an example, an instance of the payment application executing on a first device operated by a payor can send a request to the service provider 1812 to transfer an amount of funds (e.g., fiat currency or non-fiat currency such as cryptocurrency, securities, and related assets) from an account of the payor to an account of a payee (e.g., a P2P payment). In at least one example, the customer 1820(A) can be a payor and/or a payee (i.e., a user) and the payment processing platform described herein can be a payor and/or a payee on behalf of one or more merchants. The service provider 1812 can facilitate the transfer and can send a notification to an instance of the payment application executing on a second mobile device operated by the payee that the transfer is in process (or has been completed). In some examples, the service provider 1812 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1812 funds the request to payee on behalf of the payor, to speed up the transfer process and compensate for any lags that may be attributed to payor's financial network.

In some implementations, the service provider 1812 can trigger the P2P payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The P2P process can be initiated through a particular application executing on the user devices 1806 (e.g., the mobile payment application 1828).

In some embodiments, the P2P process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the P2P process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1812. For instance, the service provider 1812 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1806 (e.g., mobile device or conventional personal computer (PC)) based on instructions transmitted to and from the server computing device(s) 1802 (which, in such an example can be called a "messaging server"). In some instances, the messaging application can include a payment application with messaging capability that enables users of the payment application to communicate with one another. In such instances, the payment application can be executed on the user device 1806 based on instructions transmitted to and from the server computing device(s) 1802 (e.g., the payment service discussed in this description or another payment service that supports payment transactions).

In at least some embodiments, the P2P process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1812 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1820(A) may be new to the service provider 1812 such that the user 1820(A) that has not registered (e.g., subscribed to receive access to one or more services offered by the service provider) with the service provider 1812. The service provider 1812 can offer onboarding services for registering a potential user 1820(A) with the service provider 1812. In some examples, onboarding can involve presenting various questions, prompts, and the like to a potential user 1820(A) to obtain information that can be used to generate a profile for the potential user 1820(A). In at least one example, the service provider 1812 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1820(A) providing all necessary information, the potential user 1820(A) can be onboarded to the service provider 1812. In such an example, any limited or short-term access to services of the service provider 1812 can be transitioned to more permissive (e.g., less limited) or longer-term access to such services.

The service provider 1812 can be associated with IDV services, which can be used by the service provider 1812 for compliance purposes and/or can be offered as a service, for instance to third-party service providers (e.g., associated with the server computing device(s) 1810). That is, the service provider 1812 can offer IDV services to verify the identity of users 1814 seeking to use or using their services. Identity verification requires a customer (or potential customer) to provide information that is used by compliance departments to prove that the information is associated with an identity of a real person or entity. In at least one example, the service provider 1812 can perform services for determining whether identifying information provided by a user 1814 accurately identifies the customer (or potential customer) (i.e., Is the customer who they say they are?).

The service provider 1812 is capable of providing additional or alternative services and the services described above are offered as a sampling of services. In at least one example, the service provider 1812 can exchange data with the server computing device(s) 1810 associated with third-party service providers. Such third-party service providers can provide information that enables the service provider 1812 to provide services, such as those described above. In additional or alternative examples, such third-party service providers can access services of the service provider 1812. That is, in some examples, the third-party service providers can be subscribers, or otherwise access, services of the service provider 1812.

Techniques described herein can be configured to operate in both real-time/online and offline modes. "Online" modes refer to modes when devices are capable of communicating with the service provider 1812 (e.g., the server computing device(s) 1802) and/or the server computing device(s) 1810 via the network(s) 1804. In some examples, the merchant device(s) 1808 are not capable of connecting with the service provider 1812 (e.g., the server computing device(s) 1802) and/or the server computing device(s) 1810, due to a network connectivity issue, for example. In additional or alternative examples, the server computing device(s) 1802 are not capable of communicating with the server computing device(s) 1810 due to network connectivity issue, for example. In such examples, devices may operate in "offline" mode where at least some payment data is stored (e.g., on the merchant device(s) 1808) and/or the server computing device(s) 1802 until connectivity is restored and the payment data can be transmitted to the server computing device(s) 1802 and/or the server computing device(s) 1810 for processing.

In at least one example, the service provider 1812 can be associated with a hub, such as an order hub, an inventory hub, a fulfillment hub and so on, which can enable integration with one or more additional service providers (e.g., associated with the additional server computing device(s) 1810). In some examples, such additional service providers can offer additional or alternative services and the service provider 1812 can provide an interface or other computer-readable instructions to integrate functionality of the service provider 1812 into the one or more additional service providers.

Techniques described herein are directed to services provided via a distributed system of user devices 1806 that are in communication with one or more server computing devices 1802 of the service provider 1812. That is, techniques described herein are directed to a specific implementation—or, a practical application—of utilizing a distributed system of user devices 1806 that are in communication with one or more server computing devices 1802 of the service provider 1812 to perform a variety of services, as described above. The unconventional configuration of the distributed system described herein enables the server computing device(s) 1802 that are remotely-located from end-users (e.g., users 1814) to intelligently offer services based on aggregated data associated with the end-users, such as the users 1814 (e.g., data associated with multiple, different merchants and/or multiple, different buyers), in some examples, in near-real time. Accordingly, techniques described herein are directed to a particular arrangement of elements that offer technical improvements over conventional techniques for performing payment processing platforms and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1812, and those outside of the control of the service provider 1812, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing platforms and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1814 and user devices 1806. Furthermore, such features are changed dynamically based on the profiles of the users involved interacting with the GUIs. As such, techniques described herein are directed to improvements to computing systems.

Figure 19:
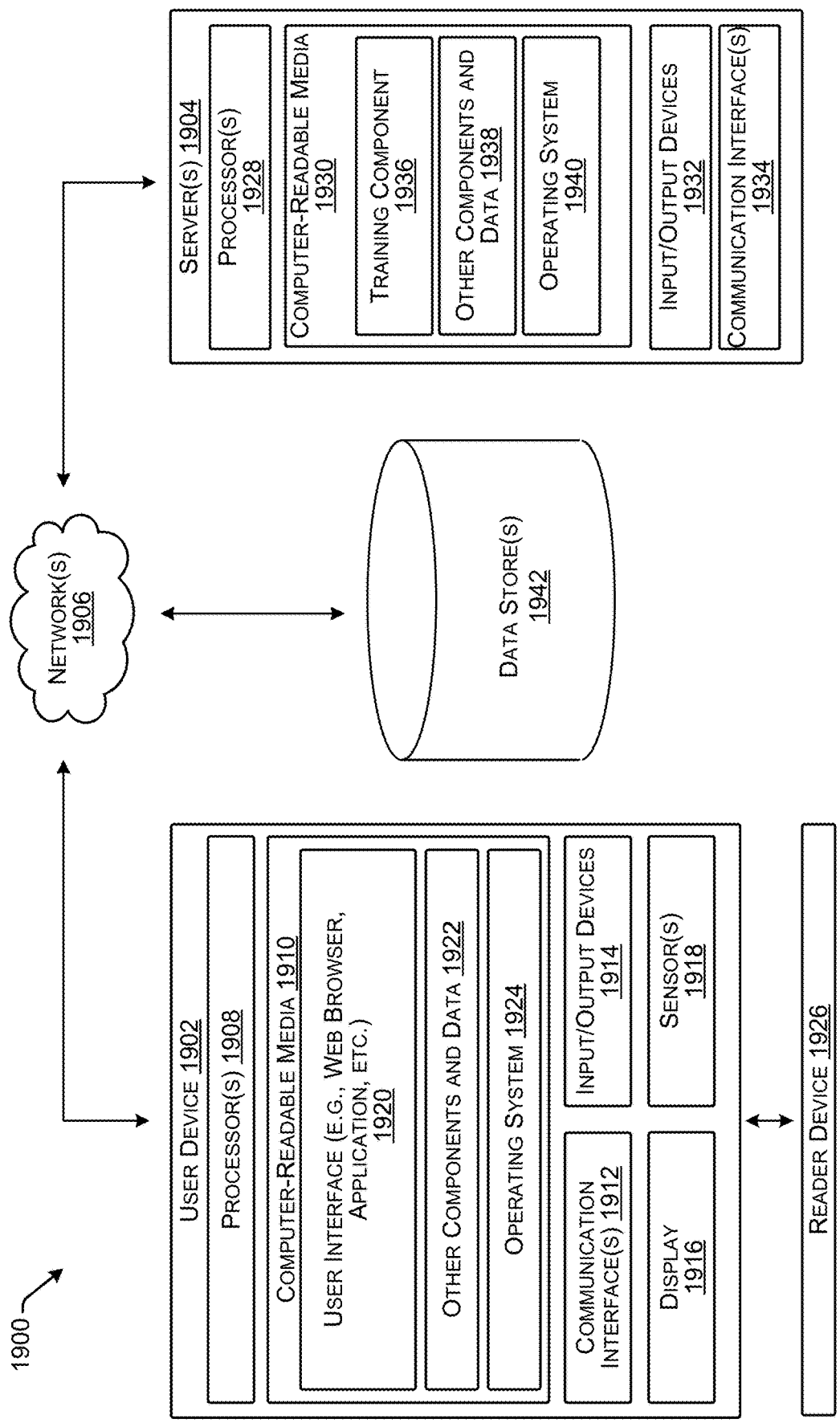
FIG. 19 illustrates additional details associated with components of the example environment.

FIG. 19 depicts an illustrative block diagram illustrating a system 1900 for performing techniques described herein. The system 1900 includes a user device 1902, that communicates with server computing device(s)(e.g., server(s) 1904) via network(s) 1906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1902 is illustrated, in additional or alternate examples, the system 1900 can have multiple user devices, as described above with reference to FIG. 17.

In at least one example, the customer computing device 110 of FIG. 1 can correspond to the user device 1902. In at least one example, the merchant computing device 114 of FIG. 1 can correspond to the user device 1902. In at least one example, the P2P server(s) 102 and/or the payment processing server(s) 104 can correspond to the server(s) 1904. In at least one example, the network(s) 106 can correspond to the network(s) 1906.

In at least one example, the user device 1902 can be any suitable type of computing device, e.g., portable, semi-portable, semi-stationary, or stationary. Some examples of the user device 1902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1902 can be any computing device capable of sending communications and performing the functions according to the techniques described herein. The user device 1902 can include devices, e.g., payment card readers, or components capable of accepting payments, as described below.

In the illustrated example, the user device 1902 includes one or more processors 1908, one or more computer-readable media 1910, one or more communication interface(s) 1912, one or more input/output (I/O) devices 1914, a display 1916, and sensor(s) 1918.

In at least one example, each processor 1908 can itself comprise one or more processors or processing cores. For example, the processor(s) 1908 can be implemented as one or more microprocessors, microcomputers, microcontrollers, digital signal processors, central processing units, state machines, logic circuitries, and/or any devices that manipulate signals based on operational instructions. In some examples, the processor(s) 1908 can be one or more hardware processors and/or logic circuits of any suitable type specifically programmed or configured to execute the algorithms and processes described herein. The processor(s) 1908 can be configured to fetch and execute computer-readable processor-executable instructions stored in the computer-readable media 1910.

Depending on the configuration of the user device 1902, the computer-readable media 1910 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1910 can include, but is not limited to, RAM, ROM, EEPROM, flash memory, solid-state storage, magnetic disk storage, optical storage, and/or other computer-readable media technology. Further, in some examples, the user device 1902 can access external storage, such as RAID storage systems, storage arrays, network attached storage, storage area networks, cloud storage, or any other medium that can be used to store information and that can be accessed by the processor(s) 1908 directly or through another computing device or network. Accordingly, the computer-readable media 1910 can be computer storage media able to store instructions, modules or components that can be executed by the processor(s) 1908. Further, when mentioned, non-transitory computer-readable media exclude media such as energy, carrier signals, electromagnetic waves, and signals per se.

The computer-readable media 1910 can be used to store and maintain any number of functional components that are executable by the processor(s) 1908. In some implementations, these functional components comprise instructions or programs that are executable by the processor(s) 1908 and that, when executed, implement operational logic for performing the actions and services attributed above to the user device 1902. Functional components stored in the computer-readable media 1910 can include a user interface 1920 to enable users to interact with the user device 1902, and thus the server(s) 1904 and/or other networked devices. In at least one example, the user interface 1920 can be presented via a web browser, or the like. In other examples, the user interface 1920 can be presented via an application, such as a mobile application or desktop application, which can be provided by a service provider 1812 associated with the server(s) 1904, or which can be an otherwise dedicated application. For example, the user interface 1920 can be presented via the mobile payment application 108 or the POS application 112, described above with reference to FIG. 1. In at least one example, a user can interact with the user interface via touch input, spoken input, gesture, or any other type of input. The word "input" is also used to describe "contextual" input that may not be directly provided by the user via the user interface 1920. For example, user's interactions with the user interface 1920 are analyzed using, e.g., natural language processing techniques, to determine context or intent of the user, which may be treated in a manner similar to "direct" user input.

Depending on the type of the user device 1902, the computer-readable media 1910 can also optionally include other functional components and data, such as other modules and data 1922, which can include programs, drivers, etc., and the data used or generated by the functional components. In addition, the computer-readable media 1910 can also store data, data structures and the like, that are used by the functional components. Further, the user device 1902 can include many other logical, programmatic and physical components, of which those described are merely examples that are related to the discussion herein.

In at least one example, the computer-readable media 1910 can include additional functional components, such as an operating system 1924 for controlling and managing various functions of the user device 1902 and for enabling basic user interactions.

The communication interface(s) 1912 can include one or more interfaces and hardware components for enabling communication with various other devices, such as over the network(s) 1906 or directly. For example, communication interface(s) 1912 can enable communication through one or more network(s) 1906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1902 can further include one or more input/output (I/O) devices 1914. The I/O devices 1914 can include speakers, a microphone, a camera, and various user controls (e.g., buttons, a joystick, a keyboard, a keypad, etc.), a haptic output device, and so forth. The I/O devices 1914 can also include attachments that leverage the accessories (audio-jack, USB-C, Bluetooth, etc.) to connect with the user device 1902.

In at least one example, user device 1902 can include a display 1916. Depending on the type of computing device(s) used as the user device 1902, the display 1916 can employ any suitable display technology. For example, the display 1916 can be a liquid crystal display, a plasma display, a light emitting diode display, an OLED (organic light-emitting diode) display, an electronic paper display, or any other suitable type of display able to present digital content thereon. In at least one example, the display 1916 can be an augmented reality display, a virtually reality display, or any other display able to present and/or project digital content. In some examples, the display 1916 can have a touch sensor associated with the display 1916 to provide a touchscreen display configured to receive touch inputs for enabling interaction with a graphic interface presented on the display 1916. Accordingly, implementations herein are not limited to any particular display technology. Alternatively, in some examples, the user device 1902 may not include the display 1916, and information can be presented by other means, such as aurally, haptically, etc.

In addition, the user device 1902 can include sensor(s) 1918. The sensor(s) 1918 can include a GPS device able to indicate location information. Further, the sensor(s) 1918 can include, but are not limited to, an accelerometer, gyroscope, compass, proximity sensor, camera, microphone, and/or a switch. In at least one example, the sensor(s) 140 can correspond to the sensor(s) 1918 described herein.

In some example, the GPS device can be used to identify a location of a user. In at least one example, the location of the user can be used by the service provider 1812, described above, to provide one or more services. That is, in some examples, the service provider 1812 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1714 and/or for sending users 1714 notifications regarding available appointments with merchant(s) located proximate to the users 1714. In at least one example, location can be used for taking payments from nearby customers when they leave a geofence, or location can be used to initiate an action responsive to users 1714 enter a brick-and-mortar store of a merchant. Location can be used in additional or alternative ways as well.

Additionally, the user device 1902 can include various other components that are not shown, examples of which include removable storage, a power source, such as a battery and power control unit, a barcode scanner, a printer, a cash drawer, and so forth.

In addition, in some examples, the user device 1902 can include, be connectable to, or otherwise be coupled to a reader device 1926, for reading payment instruments and/or identifiers associated with payment objects. In some examples, as described above, the reader device 1926 can plug in to a port in the user device 1902, such as a microphone port, a headphone port, an audio-jack, a data port, or other suitable port. In additional or alternative examples, the reader device 1926 can be coupled to the user device 1902 via another wired or wireless connection, such as via a Bluetooth®, BLE, and so on. The reader device 1926 can include a read head for reading a magnetic strip of a payment card, and further can include encryption technology for encrypting the information read from the magnetic strip. Additionally or alternatively, the reader device 1926 can be an EMV payment reader, which in some examples, can be embedded in the user device 1902. Moreover, numerous other types of readers can be employed with the user device 1902 herein, depending on the type and configuration of the user device 1902.

The reader device 1926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1926 may include hardware implementation, such as slots, magnetic tracks, and rails with one or more sensors or electrical contacts to facilitate detection and acceptance of a payment instrument. That is, the reader device 1926 may include hardware implementations to enable the reader device 1926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1926 may also include a biometric sensor to receive and process biometric characteristics and process them as payment instruments, given that such biometric characteristics are registered with the payment processing platform and/or P2P payment platform and connected to a financial account with a bank server.

The reader device 1926 may include processing unit(s), computer-readable media, a reader chip, a transaction chip, a timer, a clock, a network interface, a power supply, and so on. The processing unit(s) of the reader device 1926 may execute one or more modules and/or processes to cause the reader device 1926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1926, the computer-readable media may include volatile memory (such as RAM), non-volatile memory (such as ROM, flash memory, miniature hard drive, memory card, or the like), or some combination thereof. In at least one example, the computer-readable media of the reader device 1926 may include at least one module for performing various functions as described herein.

The reader chip may perform functionalities to control the operations and processing of the reader device 1926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 196, which may provide a clock signal indicating a time. Furthermore, the reader chip may perform functionality to control the network interface, which may interface with the network(s) 1906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1902, which can be a POS terminal, and the reader device 1926 are shown as separate devices, in additional or alternative examples, the user device 1902 and the reader device 1926 can be part of a single device, which may be a battery-operated device. In such an example, components of both the user device 1902 and the reader device 1926 may be associated with the single device. In some examples, the reader device 1926 can have a display integrated therewith, which can be in addition to (or as an alternative of) the display 1916 associated with the user device 1902.

The server(s) 1904 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1904 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1904 can include one or more processors 1928, one or more computer-readable media 1930, one or more I/O devices 1932, and one or more communication interfaces 1934. Each processor 1928 can be a single processing unit or a number of processing units, and can include single or multiple computing units or multiple processing cores. The processor(s) 1928 can be implemented as one or more microprocessors, microcomputers, microcontrollers, digital signal processors, central processing units, state machines, logic circuitries, and/or any devices that manipulate signals based on operational instructions. For example, the processor(s) 1928 can be one or more hardware processors and/or logic circuits of any suitable type specifically programmed or configured to execute the algorithms and processes described herein. The processor(s) 1928 can be configured to fetch and execute computer-readable instructions stored in the computer-readable media 1930, which can program the processor(s) 1928 to perform the functions described herein.

The computer-readable media 1930 can include volatile and nonvolatile memory and/or removable and non-removable media implemented in any type of technology for storage of information, such as computer-readable instructions, data structures, program modules, or other data. Such computer-readable media 1930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1904, the computer-readable media 1930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1930 can be used to store any number of functional components that are executable by the processor(s) 1928. In many implementations, these functional components comprise instructions or programs that are executable by the processors 1928 and that, when executed, specifically configure the one or more processors 1928 to perform the actions attributed above to the service provider 1812 and/or payment processing platform. Functional components stored in the computer-readable media 1930 can optionally include a training component 1936 and one or more other components and data 1938.

The training component 1936 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1902 and/or the server(s) 1904 for use at a time after the data models have been trained (e.g., at runtime).

The one or more other components and data 1938 can include the P2P processing component 116, the payment processing communication component 119, the payment processing component 126, and/or the P2P communication component 128, the functionality of which is described, at least partially, above. Further, the one or more other components and data 1938 can include programs, drivers, etc., and the data used or generated by the functional components. Further, the server(s) 1904 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Components are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1930 can additionally include an operating system 1940 for controlling and managing various functions of the server(s) 1904.

The server(s) 1904 can further be equipped with various I/O devices 1932. Such I/O devices 1932 can include a display, various user interface controls (e.g., buttons, joystick, keyboard, mouse, touch screen, biometric or sensory input devices, etc.), audio speakers, connection ports and so forth.

The communication interface(s) 1934 can include one or more interfaces and hardware components for enabling communication with various other devices, such as over the network(s) 1906 or directly. For example, communication interface(s) 1934 can enable communication through one or more network(s) 1906, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

In at least one example, the system 1900 can include data store(s) 1942 that can be configured to store data that is accessible, manageable, and updatable. In some examples, the data store(s) 1942 can be integrated with the user device 1902 and/or the server(s) 1904. In other examples, as shown in FIG. 19, the data store(s) 1942 can be located remotely from the server(s) 1904 and can be accessible to the server(s) 1904. The data store(s) 1942 can comprise multiple databases and/or servers connected locally and/or remotely via the network(s) 1906.

In at least one example, the data store(s) 1942 can store user data, customer data, and/or merchant data, stored balances, etc., as described above. The data store(s) 120 and/or 130, described above with reference to FIG. 1, can correspond to the data store(s) 1942 described herein.

Furthermore, in at least one example, the data store(s) 1942 can store inventory database(s) and/or catalog database(s). An inventory database can store data associated with a quantity of each item that a merchant has available to the merchant. Furthermore, a catalog database can store data associated with items that a merchant has available for acquisition. The data store(s) 1942 can store additional or alternative types of data as described herein, such as incentive data, or the like.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts or swim lane diagrams showing example processes involving techniques as described herein. The processes illustrated are described with reference to FIGS. 1, 17, and 19 for convenience and ease of understanding. However, the processes illustrated are not limited to being performed using components described in FIGS. 1, 17, and 19, and such components are not limited to performing the processes illustrated herein.

Furthermore, in some examples, the processes described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes can be combined in whole or in part with each other or with other processes.

Further, the GUIs described above are non-limiting examples of GUIs that can be presented via computing devices. In additional or alternative examples, additional or alternative content can be presented via the GUIs and/or additional or alternative configurations can be imagined. As such, the GUIs are provided for illustrative purposes and should not be construed as limiting.

A. A payment processing platform configured to process a transaction by interaction with a peer-to-peer (P2P) payment platform, the payment processing platform comprising: a point-of-sale (POS) device comprising: a touchscreen configured to face a customer for customer selection of a payment type using the touchscreen; and a POS application configured to: generate transaction data associated with the transaction, wherein the transaction is between a merchant and the customer; receive a Quick Response (QR) code associated with the P2P payment platform; present, via the touchscreen, the QR code to the customer before presenting a payment type selection user interface to the customer; and after receiving selection of the payment type via the touchscreen or an indication, from the payment processing platform, that the customer captured the QR code using a computing device of the customer, complete the transaction via one or more server computing devices associated with the payment processing platform; and the one or more server computing devices associated with the payment processing platform configured to: receive an indication, from one or more server computing devices associated with the P2P payment platform, that the customer captured the QR code using the computing device of the customer; transmit the indication that that the customer captured the QR code using the computing device of the customer to the POS application; in response to receiving the indication that the customer captured the QR code using the computing device of the customer, send an authorization request to the one or more server computing devices associated with the P2P payment platform to authorize payment for the transaction; and in response to receiving an authorization response to the authorization request, settle funds between the merchant and the customer by depositing funds received from the P2P payment platform into a merchant account of the merchant, wherein the funds were associated with a customer account of the customer of the P2P payment platform before being deposited into the merchant account.

B. The payment processing platform as clause A recites, wherein the QR code is received via an Application Programming Interface (API) of the P2P payment platform.

C. The payment processing platform as clause A or B recites, wherein the QR code is received via the one or more server computing devices associated with the payment processing platform, and wherein the one or more server computing devices associated with the payment processing platform are configured to (i) obtain the QR code via an Application Programming Interface (API) of the P2P payment platform and (ii) send the QR code to the POS application.

D. The payment processing platform as any of clauses A-C recites, wherein the QR code is specific to at least one of the transaction or the merchant.

E. The payment processing platform as any of clauses A-D recites, wherein the one or more server computing devices associated with the payment processing platform are further configured to: receive the transaction data from the POS application; compare the transaction data with context data associated with the indication that the customer captured the QR code using the computing device of the customer to determine that the customer is associated with the transaction; and transmit the indication that the customer captured the QR code using the computing device of the customer to the POS application based at least in part on a determination that the customer is associated with the transaction.

F. A method, implemented at least in part by a point-of-sale (POS) application, executable by a computing device of a merchant, the method comprising: generating, by the POS application, transaction data associated with a transaction between the merchant and a customer, wherein the POS application is associated with a payment processing platform; receiving, at the POS application, a transaction code associated with a peer-to-peer (P2P) payment platform; presenting, by the POS application, the transaction code via a user interface of the computing device of the merchant; and based at least in part on receiving an indication of an interaction between a computing device of the customer and the transaction code, causing, by the POS application, at least a portion of the transaction data to be presented via a mobile payment application associated with the P2P payment platform on the computing device of the customer.

G. The method as clause F recites, wherein the transaction code is associated with a resource locator to a location of the P2P payment platform.

H. The method as clause F or G recites, wherein the transaction code is associated with a deep link to the mobile payment application.

I. The method as clause H recites, wherein if the mobile payment application is not installed on the computing device of the customer, causing the mobile payment application to be installed on the computing device of the customer or enabling use of the mobile payment application on the computing device of the customer via an instant application.

J. The method as any of clauses F-I recites, wherein the user interface is a cart building user interface for adding one or more items to a virtual cart.

K. The method as clause J recites, wherein the portion of the transaction data comprises an indication of the one or more items, wherein the indication of the one or more items is presented via another cart building user interface presented by the mobile payment application in near-real time.

L. The method as any of clauses F-K recites, wherein the transaction code is presented before a payment type selection user interface.

M. The method as any of clauses F-L recites, wherein the user interface is a payment type selection user interface.

N. The method as any of clauses F-M recites, wherein the portion of the transaction data comprises a total cost of the transaction and wherein the total cost of the transaction is presented via a tipping user interface, a reward user interface, or a feedback user interface presented by the mobile payment application.

O. A method, implemented at least in part by one or more server computing devices associated with a payment processing platform, the method comprising: receiving, from a point-of-sale (POS) application associated with the payment processing platform, on a computing device of a merchant, transaction data associated with a transaction between a customer and the merchant, wherein the POS application causes a transaction code to be presented via a display of the computing device of the merchant; receiving an indication of an interaction between a computing device of the customer and the transaction code; transmitting the indication of the interaction between the computing device of the customer and the transaction code to the POS application; based at least in part on receiving the indication of the interaction between the computing device of the customer and the transaction code, sending an authorization request to one or more server computing devices associated with a peer-to-peer (P2P) payment platform to authorize payment for the transaction; and based at least in part on receiving a response to the authorization request, settling funds between the merchant and the customer by depositing at least a portion of funds received from the P2P payment platform into a merchant account of the merchant, wherein the funds were associated with a customer account of the customer of the P2P payment platform before being deposited into the merchant account.

P. The method as clause O recites, wherein the merchant account is associated with a stored balance maintained by the payment processing platform and the customer account is associated with a stored balance maintained by the P2P payment platform.

Q. The method as clause O or P recites, further comprising: accessing customer data associated with the customer; determining a level of risk associated with the customer based at least in part on the customer data; and settling the funds between the merchant and the customer based at least in part on a determination that the level of risk is below a threshold.

R. The method as any of clauses O-Q recites, wherein the indication of the interaction between the computing device of the customer and the transaction code is received via an Application Programming Interface (API) associated with the P2P payment platform.

S. The method as any of clauses O-R recites, wherein the transaction code is a multi-function transaction code associated with multiple P2P payment platforms and the indication of the interaction is received from the computing device of the customer, the method further comprising: sending, to the computing device of the customer, a request to select one of the multiple P2P payment platforms; receiving, from the computing device of the customer, an indication of a selection of the P2P payment platform; and sending the authorization request to the one or more server computing devices associated with the P2P payment platform based at least in part on the selection of the P2P payment platform.

T. The method as any of clauses O-S recites, wherein based at least in part on receiving the indication of the interaction between the computing device of the customer and the transaction code, causing at least a portion of the transaction data to be presented via a mobile payment application associated with the P2P payment platform on the computing device of the customer.

U. A peer-to-peer (P2P) payment platform configured to process a transaction by interaction with a payment processing platform, the P2P payment platform comprising: a mobile payment application configured to: capture, using a camera integrated with the mobile payment application, a Quick Response (QR) code associated with the P2P payment platform, wherein the QR code is presented via a computing device of a merchant in association with a transaction between the merchant and a customer with which the mobile payment application is associated; and send an indication that the customer captured the QR code using a computing device of the customer to one or more server computing devices associated with the P2P payment platform; and the one or more server computing devices associated with the P2P payment platform configured to: receive, at a first time and from one or more server computing devices associated with the payment processing platform, an indication of the transaction; send the QR code to the one or more server computing devices associated with the payment processing platform; receive, at a second time after the first time and from the mobile payment application, the indication that the customer captured the QR code using the computing device of the customer; send the indication that the customer captured the QR code using the computing device of the customer to the one or more server computing devices associated with the payment processing platform; receive, from the one or more server computing devices associated with payment processing platform, a request to authorize payment for the amount of the transaction; based on receiving the request, authorize payment for the amount of the transaction based on a balance associated with a customer account of the customer maintained by the P2P payment platform; and based on authorizing the payment, transmit funds from the customer account of the customer to the one or more server computing devices associated with payment processing platform for depositing the funds into a merchant account of the merchant associated with the payment processing platform.

V. The P2P payment platform as clause U recites, wherein sending the QR code to the one or more server computing devices associated with payment processing platform comprises sending the QR code via an Application Programming Interface (API) of the P2P payment platform.

W. The P2P payment platform as clause U or V recites, wherein the QR code is generated in response to receiving the indication of the transaction from the one or more server computing devices associated with the payment processing platform and the QR code is specific to at least one of the merchant or the transaction.

X. The P2P payment platform as any of clauses U-W recites, wherein the one or more server computing devices associated with the P2P payment platform are configured to: receive, from the one or more server computing devices associated with the payment processing platform, a request for the QR code; and generate the QR code responsive to receiving the request.

Y. The P2P payment platform as any of clauses U-X recites, wherein the QR code is caused to be presented while one or more items are being added to a virtual cart via a point-of-sale (POS) application on the computing device of the merchant, prior to presentation of a payment type selection user interface presented via the computing device of the merchant, or in association with the payment type selection user interface.

Z. A method, implemented at least in part by a mobile payment application, associated with a peer-to-peer (P2P) payment platform, executable by a computing device of a customer, the method comprising: detecting an interaction between the computing device of the customer and a transaction code associated with the P2P payment platform, wherein the transaction code is presented via a computing device of a merchant in association with a transaction between the merchant and the customer; sending an indication of the interaction between the computing device of the customer and the transaction code to one or more server computing devices associated with the P2P payment platform; receiving, based at least in part on sending the indication of the interaction between the computing device of the customer and the transaction code to the one or more server computing devices associated with the P2P payment platform, at least a portion of transaction data associated with the transaction, wherein the transaction data is generated, at least in part, by a point-of-sale (POS) application executing on the computing device of the merchant; and presenting at least the portion of the transaction data via a user interface associated with the mobile payment application.

AA. The method as clause Z recites, wherein the transaction code is associated with (i) a resource locator associated with a location of the P2P payment platform or (ii) a deep link to the mobile payment application.

AB. The method as clause Z or AA recites, wherein the interaction comprises a capture using a camera integrated with the mobile payment application.

AC. The method as any of clauses Z-AB recites, wherein the interaction comprises a capture using a native camera associated with the computing device of the customer, the method further comprising presenting, via the user interface, a prompt for the customer to provide an input indicating whether to present data associated with the transaction code via the mobile payment application, an instant application, or a web browser.

AD. The method as clause AC recites, wherein based at least in part on determining that the transaction code is captured via the native camera, sending an authentication request to the one or more server computing devices associated with the P2P payment platform.

AE. The method as any of clauses Z-AD recites, wherein at least the portion of the transaction data comprises one or more items being added to a virtual cart, and wherein the user interface comprises a cart building user interface.

AF. The method as any of clauses Z-AE recites, wherein at least the portion of the transaction data comprises a total cost of the transaction, and wherein the user interface comprises a tipping user interface.

AG. The method as any of clauses Z-AF recites, wherein the portion of the transaction data comprises an identification of the merchant, and wherein the user interface further presents an incentive associated with the merchant.

AH. The method as any of clauses Z-AG recites, wherein the portion of the transaction data comprises an identification of an item to be purchased via the transaction, and wherein the user interface further presents an incentive associated with the item.

AI. A method, implemented at least in part by a server computing device associated with a peer-to-peer (P2P) payment platform, the method comprising: sending, at a first time, a transaction code to a payment processing platform, wherein the transaction code is presented via a computing device of a merchant in association with a transaction between a customer and the merchant; receiving, at a second time, an indication of an interaction between the transaction code and a computing device of the customer; sending the indication of the interaction between the transaction code and the computing device of the customer to one or more server computing devices associated with the payment processing platform; receiving, from the one or more server computing devices associated with the payment processing platform, transaction data associated with the transaction, the transaction data including an amount of the transaction; determining whether to authorize payment for the amount of the transaction; and based at least in part on determining to authorize the payment, transmitting funds from a customer account of the customer that is associated with the P2P payment platform to the one or more server computing devices associated with the payment processing platform for depositing at least a portion of the funds into a merchant account of the merchant associated with the payment processing platform.

AJ. The method as clause AI recites, wherein, based at least in part on sending the indication of the interaction between the transaction code and the computing device of the customer to the one or more server computing devices associated with the payment processing platform, receiving, from the one or more server computing devices associated with the payment processing platform, at least a portion of transaction data associated with the transaction.

AK. The method as clause AJ recites, wherein at least the portion of the transaction data is associated with at least one of an indication of the merchant or an item associated with the transaction and, based at least in part on receiving at least the portion of the transaction data: determining that an incentive is applicable to at least the merchant or the item; applying the incentive to the transaction; and causing a notification indicating that the incentive was applied to be presented via a user interface presented via a mobile payment application, associated with the P2P payment platform, on the computing device of the customer.

AL. The method as clause AJ or AK recites, wherein at least the portion of the transaction data is associated with one or more items associated with the transaction and, based at least in part on receiving at least the portion of the transaction data, causing at least the portion of the transaction data to be presented via a cart building user interface presented via a mobile payment application associated with the P2P payment platform on the computing device of the customer in near real-time.

AM. The method as any of clauses AJ-AL recites, wherein at least the portion of the transaction data is associated with a total cost of the transaction and, based at least in part on receiving at least the portion of the transaction data, causing at least the portion of the total cost of the transaction via a tipping user interface to be presented via a mobile payment application on the computing device of the customer.

AN. The method as clause AM recites, further comprising: receiving, via an input to the tipping user interface, a tip amount to be added to the total cost of the transaction; determining, based at least in part on a determination to authorize the payment, that the tip amount is also authorized; and transmitting additional funds, equal to the tip amount, from the customer account of the customer to the one or more server computing devices associated with the payment processing platform for depositing the additional funds into the merchant account.

AO. A payment processing platform comprising: a point-of-sale (POS) application, executable by a POS device of a merchant, configured to: generate transaction data associated with the transaction, wherein the transaction is between the merchant and a customer, and the transaction data includes a first timestamp; and receive a Quick Response (QR) code associated with a peer-to-peer (P2P) payment platform, wherein the QR code is caused to be presented via the POS application in association with the transaction; and one or more server computing devices associated with the payment processing platform configured to: receive, from one or more server computing devices associated with the P2P payment platform, an indication that the customer captured the QR code using a sensor of a computing device of the customer, wherein the indication is associated with context data indicating at least a second timestamp when the customer captured the QR code using the sensor of the computing device of the customer; determine, based at least in part on correlating the first timestamp and the second timestamp, that the customer is associated with the transaction; and associate the customer with the transaction, wherein the association causes a movement of funds between an account of the customer maintained by the P2P payment platform and an account of the merchant maintained by the payment processing platform to process payment for the transaction.

AP. The payment processing platform as clause AO recites, wherein the POS application receives the QR code via an Application Programming Interface (API) of the P2P payment platform.

AQ. The payment processing platform as clause AO or AP recites, wherein the QR code is specific to the transaction and comprises a resource locator to a location of the P2P payment platform or a deep link to a mobile payment application on the computing device of the customer.

AR. The payment processing platform as any of clauses AO-AQ recites, wherein the QR code is encoded with at least one of an identifier of the merchant, a location of the merchant, or a POS location, and the QR code comprises a resource locator to a location of the P2P payment platform or a deep link to a mobile payment application on the computing device of the customer.

AS. A method, implemented at least in part by at least one server computing device of a payment processing platform, the method comprising: receiving, from a point-of-sale (POS) application, associated with the payment processing platform, on a computing device of a merchant, transaction data associated with a transaction between the merchant and a customer; receiving, from one or more server computing devices associated with a peer-to-peer (P2P) payment platform, a transaction code associated with the P2P payment platform, wherein the transaction code is caused to be presented via a user interface presented by the POS application; receiving, from the one or more server computing devices associated with the P2P payment platform, an indication of an interaction between a computing device of the customer and the transaction code, wherein the indication is associated with context data associated with the interaction; determining, based at least in part on comparing the transaction data with the context data, that the customer is associated with the transaction; and associating the customer with the transaction, wherein the association causes at least a portion of the transaction data to be provided to a mobile payment application, associated with the P2P payment platform, on the computing device of the customer.

AT. The method as clause AS recites, wherein the user interface is a cart building user interface for adding one or more items to a virtual cart.

AU. The method as clause AS or AT recites, wherein the transaction code is presented in association with the user interface prior to a payment type selection user interface being presented.

AV. The method as any of clauses AS-AU recites, wherein the user interface is a payment type selection user interface.

AW. The method as any of clauses AS-AV recites, wherein the transaction data includes a first timestamp and the context data includes a second timestamp and, determining that the customer is associated with the transaction comprises correlating the first timestamp and the second timestamp.

AX. The method as any of clauses AS-AW recites, wherein the transaction data includes a first location and the context data includes a second location and, determining that the customer is associated with the transaction comprises correlating the first location and the second location.

AY. The method as any of clauses AS-AX recites, wherein at least the portion of the transaction data is associated with one or more items associated with the transaction, the method further comprising causing an indication of the one or more items to be presented via a cart building user interface presented via the mobile payment application.

AZ. The method as any of clauses AS-AY recites, wherein at least the portion of the transaction data is associated with a total cost of the transaction, the method further comprising causing the total cost of the transaction to be presented via a tipping user interface presented via the mobile payment application.

BA. The method as any of clauses AS-AZ recites, wherein at least the portion of the transaction data is associated with at least one of an item associated with the transaction or the merchant, the method further comprising causing an incentive associated with at least one of the item or the merchant to be presented via another user interface presented via the mobile payment application.

BB. The method as any of clauses AS-BA recites, wherein the association further causes a movement of funds from an account of the customer maintained by the P2P payment platform to an account of the merchant maintained by the payment processing platform to process payment for the transaction.

BC. A system comprising: one or more processors; and one or more computer-readable media comprising instructions that, when executed by the one or more processors, cause the system to perform operations comprising: receiving, from a point-of-sale (POS) application, associated with a payment processing platform, on a computing device of a merchant, transaction data associated with a transaction between the merchant and a customer; receiving, from one or more server computing devices associated with a peer-to-peer (P2P) payment platform, a transaction code associated with the P2P payment platform, wherein the transaction code is caused to be presented in association with a user interface presented via the POS application; receiving, from the one or more server computing devices associated with P2P payment platform, an indication of an interaction between a computing device of the customer and the transaction code, wherein the indication is associated with context data associated with the transaction; determining, based at least in part on comparing the transaction data with the context data, that the customer is associated with the transaction; and associating the customer with the transaction, wherein the association causes at least a portion of the transaction data to be provided to a mobile payment application, associated with the P2P payment platform, on the computing device of the customer.

BD. The system as clause BC recites, wherein the user interface is a cart building user interface for adding one or more items to a virtual cart and wherein the transaction code is presented via the cart building user interface prior to a payment type selection user interface being presented.

BE. The system as clause BC or BD recites, wherein the transaction data includes a first timestamp and the context data includes a second timestamp and determining that the customer is associated with the transaction comprises correlating the first timestamp and the second timestamp.

BF. The system as any of clauses BC-BE recites, wherein the transaction data includes a first location and the context data includes a second location and determining that the customer is associated with the transaction comprises correlating the first location and the second location.

BG. The system as any of clauses BC-BF recites, wherein at least the portion of the transaction data comprises at least one of: an indication of one or more items associated with the transaction; a total cost of the transaction; or an indication of the merchant associated with the transaction.

BH. The system as any of clauses BC-BG recites, wherein the association further causes a movement of funds from an account of the customer maintained by the P2P payment platform to an account of the merchant maintained by the payment processing platform to process payment for the transaction.

BI. A payment processing platform configured to process a transaction by interaction with a peer-to-peer (P2P) payment platform, the payment processing platform comprising: a point-of-sale (POS) device comprising: a touchscreen configured to face a customer for customer selection of a payment type using the touchscreen; and a POS application configured to: generate transaction data associated with the transaction, wherein the transaction is between a merchant and the customer; receive a Quick Response (QR) code associated with the P2P payment platform; present, via the touchscreen, the QR code to the customer before presenting a payment type selection user interface to the customer; and after receiving selection of the payment type via the touchscreen or an indication, from the payment processing platform, that the customer captured the QR code using a computing device of the customer, complete the transaction via one or more server computing devices associated with the payment processing platform; and the one or more server computing devices associated with the payment processing platform configured to: receive an indication, from one or more server computing devices associated with the P2P payment platform, that the customer captured the QR code using the computing device of the customer; transmit the indication that that the customer captured the QR code using the computing device of the customer to the POS application; in response to receiving the indication that the customer captured the QR code using the computing device of the customer, send an authorization request to the one or more server computing devices associated with the P2P payment platform to authorize payment for the transaction; and in response to receiving an authorization response to the authorization request, settle funds between the merchant and the customer by depositing funds received from the P2P payment platform into a merchant account of the merchant, wherein the funds were associated with a customer account of the customer of the P2P payment platform before being deposited into the merchant account.

BJ. The payment processing platform as clause BI recites, wherein the QR code is received via an Application Programming Interface (API) of the P2P payment platform.

BK. The payment processing platform as clause BI or BJ recites, wherein the QR code is received via the one or more server computing devices associated with the payment processing platform, and wherein the one or more server computing devices associated with the payment processing platform are configured to (i) obtain the QR code via an Application Programming Interface (API) of the P2P payment platform and (ii) send the QR code to the POS application.

BL. The payment processing platform as any of clauses BI-BK recites, wherein the QR code is specific to at least one of the transaction or the merchant.

BM. The payment processing platform as any of clauses BI-BL recites, wherein the one or more server computing devices associated with the payment processing platform are further configured to: receive the transaction data from the POS application; compare the transaction data with context data associated with the indication that the customer captured the QR code using the computing device of the customer to determine that the customer is associated with the transaction; and transmit the indication that the customer captured the QR code using the computing device of the customer to the POS application based at least in part on a determination that the customer is associated with the transaction.

BN. A method, implemented at least in part by a point-of-sale (POS) application, executable by a computing device of a merchant, the method comprising: generating, by the POS application, transaction data associated with a transaction between the merchant and a customer, wherein the POS application is associated with a payment processing platform; receiving, at the POS application, a transaction code associated with a payment making platform; presenting, by the POS application, the transaction code via a user interface of the computing device of the merchant; and based at least in part on receiving an indication of an interaction between a computing device of the customer and the transaction code, causing, by the POS application, at least a portion of the transaction data to be presented via a mobile payment application associated with the payment making platform on the computing device of the customer.

BO. The method as clause BN recites, wherein the transaction code is associated with a resource locator to a location of the payment making platform.

BP. The method as clause BN or BO recites, wherein the transaction code is associated with a deep link to the mobile payment application.

BQ. The method as clause BP recites, wherein if the mobile payment application is not installed on the computing device of the customer, causing the mobile payment application to be installed on the computing device of the customer or enabling use of the mobile payment application on the computing device of the customer via an instant application.

BR. The method as any of clauses BN-BQ recites, wherein the user interface is a cart building user interface for adding one or more items to a virtual cart.

BS. The method as clause BR recites, wherein the portion of the transaction data comprises an indication of the one or more items, wherein the indication of the one or more items is presented via another cart building user interface presented by the mobile payment application in near-real time.

BT. The method as any of clauses BN-BS recites, wherein the transaction code is presented before a payment type selection user interface.

BU. The method as any of clauses BN-BT recites, wherein the user interface is a payment type selection user interface.

BV. The method as any of clauses BN-BU recites, wherein the portion of the transaction data comprises a total cost of the transaction and wherein the total cost of the transaction is presented via a tipping user interface, a reward user interface, or a feedback user interface presented by the mobile payment application.

BW. A method, implemented at least in part by one or more server computing devices associated with a payment processing platform, the method comprising: receiving, from a point-of-sale (POS) application associated with the payment processing platform and executing on a computing device of a merchant, transaction data associated with a transaction between a customer and the merchant, wherein the POS application causes a transaction code to be presented via a display of the computing device of the merchant; receiving an indication of an interaction between a computing device of the customer and the transaction code; transmitting the indication of the interaction between the computing device of the customer and the transaction code to the POS application; based at least in part on receiving the indication of the interaction between the computing device of the customer and the transaction code, sending an authorization request to one or more server computing devices associated with a payment making platform to authorize payment for the transaction; and based at least in part on receiving a response to the authorization request, settling funds between the merchant and the customer by depositing an amount of funds associated with the transaction into a merchant account of the merchant.

BX. The method as clause BW recites, wherein the funds were associated with a customer account of the customer of the payment making platform before being deposited into the merchant account, wherein the merchant account is associated with a stored balance maintained by the payment processing platform and the customer account is associated with a stored balance maintained by the payment making platform.

BY. The method as clause BW or BX recites, further comprising: accessing customer data associated with the customer; determining a level of risk associated with the customer based at least in part on the customer data; and settling the funds between the merchant and the customer based at least in part on a determination that the level of risk is below a threshold.

BZ. The method as any of clauses BW-BY recites, wherein the indication of the interaction between the computing device of the customer and the transaction code is received via an Application Programming Interface (API) associated with the payment making platform.

CA. The method as any of clauses BW-BZ recites, wherein the transaction code is a multi-function transaction code associated with multiple payment making platforms and the indication of the interaction is received from the computing device of the customer, the method further comprising: sending, to the computing device of the customer, a request to select one of the multiple payment making platforms; receiving, from the computing device of the customer, an indication of a selection of the payment making platform; and sending the authorization request to the one or more server computing devices associated with the payment making platform based at least in part on the selection of the payment making platform.

CB. The method as any of clauses BW-CA recites, wherein based at least in part on receiving the indication of the interaction between the computing device of the customer and the transaction code, causing at least a portion of the transaction data to be presented via a mobile payment application associated with the payment making platform on the computing device of the customer.

CC. A peer-to-peer (P2P) payment platform configured to process a transaction by interaction with a payment processing platform, the P2P payment platform comprising: a mobile payment application configured to: capture, using a camera integrated with the mobile payment application, a Quick Response (QR) code associated with the P2P payment platform, wherein the QR code is presented via a computing device of a merchant in association with a transaction between the merchant and a customer with which the mobile payment application is associated; and send, to one or more server computing devices associated with the P2P payment platform, an indication that the customer captured the QR code using a computing device of the customer; and the one or more server computing devices associated with the P2P payment platform configured to: receive, at a first time and from one or more server computing devices associated with the payment processing platform, an indication of the transaction; send the QR code to the one or more server computing devices associated with the payment processing platform; receive, at a second time after the first time and from the mobile payment application, the indication that the customer captured the QR code using the computing device of the customer; send, to the one or more server computing devices associated with the payment processing platform, the indication that the customer captured the QR code using the computing device of the customer; receive, from the one or more server computing devices associated with payment processing platform, a request to authorize payment for an amount of the transaction; based on receiving the request, authorize payment for the amount of the transaction based on a balance associated with a customer account of the customer maintained by the P2P payment platform; and based on authorizing the payment, transmit funds from the customer account of the customer to the one or more server computing devices associated with payment processing platform for depositing the funds into a merchant account of the merchant associated with the payment processing platform.

CD. The P2P payment platform as clause CC recites, wherein sending the QR code to the one or more server computing devices associated with payment processing platform comprises sending the QR code via an Application Programming Interface (API) of the P2P payment platform.

CE. The P2P payment platform as clause CC or CD recites, wherein the QR code is generated in response to receiving the indication of the transaction from the one or more server computing devices associated with the payment processing platform and the QR code is specific to at least one of the merchant or the transaction.

CF. The P2P payment platform as any of clauses CC-CE recites, wherein the one or more server computing devices associated with the P2P payment platform are configured to: receive, from the one or more server computing devices associated with the payment processing platform, a request for the QR code; and generate the QR code responsive to receiving the request.

CG. The P2P payment platform as any of clauses CC-CF recites, wherein the QR code is caused to be presented while one or more items are being added to a virtual cart via a point-of-sale (POS) application on the computing device of the merchant, prior to presentation of a payment type selection user interface presented via the computing device of the merchant, or in association with the payment type selection user interface.

CH. A method, implemented at least in part by a mobile payment application executing on a computing device of a customer and associated with a payment making platform, the method comprising: detecting, by the mobile payment application, an interaction between the computing device of the customer and a transaction code associated with the payment making platform, wherein the transaction code is presented via a computing device of a merchant in association with a transaction between the merchant and the customer; sending, by the mobile payment application, an indication of the interaction between the computing device of the customer and the transaction code to one or more server computing devices associated with the payment making platform; receiving, by the mobile payment application and based at least in part on sending the indication of the interaction between the computing device of the customer and the transaction code to the one or more server computing devices associated with the payment making platform, at least a portion of transaction data associated with the transaction, wherein the transaction data is generated, at least in part, by a point-of-sale (POS) application executing on the computing device of the merchant; and presenting, by the mobile payment application via a user interface, at least the portion of the transaction data.

CI. The method as clause CH recites, wherein the transaction code is associated with (i) a resource locator associated with a location of the payment making platform or (ii) a deep link to the mobile payment application.

CJ. The method as clause CH or CI recites, wherein the interaction comprises a capture using a camera integrated with the mobile payment application.

CK. The method as any of clauses CH-CJ recites, wherein the interaction comprises a capture using a native camera associated with the computing device of the customer, the method further comprising presenting, via the user interface, a prompt for the customer to provide an input indicating whether to present data associated with the transaction code via the mobile payment application, an instant application, or a web browser.

CL. The method as clause CK recites, wherein based at least in part on determining that the transaction code is captured via the native camera, sending an authentication request to the one or more server computing devices associated with the payment making platform.

CM. The method as any of clauses CH-CL recites, wherein at least the portion of the transaction data comprises one or more items being added to a virtual cart, and wherein the user interface comprises a cart building user interface.

CN. The method as any of clauses CH-CM recites, wherein at least the portion of the transaction data comprises a total cost of the transaction, and wherein the user interface comprises a tipping user interface.

CO. The method as any of clauses CH-CN recites, wherein the portion of the transaction data comprises an identification of the merchant, and wherein the user interface further presents an incentive associated with the merchant.

CP. The method as any of clauses CH-CO recites, wherein the portion of the transaction data comprises an identification of an item to be purchased via the transaction, and wherein the user interface further presents an incentive associated with the item.

CQ. A method, implemented at least in part by one or more server computing devices associated with a payment making platform, the method comprising: sending, by the one or more server computing devices associated with the payment making platform and at a first time, a transaction code to a payment processing platform, wherein the transaction code is presented via a computing device of a merchant in association with a transaction between a customer and the merchant; receiving, by the one or more server computing devices associated with the payment making platform and at a second time, an indication of an interaction between the transaction code and a computing device of the customer; sending, by the one or more server computing devices associated with the payment making platform, the indication of the interaction between the transaction code and the computing device of the customer to one or more server computing devices associated with the payment processing platform; receiving, by the one or more server computing devices associated with the payment making platform and from the one or more server computing devices associated with the payment processing platform, transaction data associated with the transaction, the transaction data including an amount of the transaction; determining, by the one or more server computing devices associated with the payment making platform, whether to authorize payment for the amount of the transaction; and based at least in part on determining to authorize the payment, transmitting, by the one or more server computing devices associated with the payment making platform, funds from a customer account of the customer that is associated with the payment making platform to the one or more server computing devices associated with the payment processing platform for depositing at least a portion of the funds into a merchant account of the merchant associated with the payment processing platform.

CR. The method as clause CQ recites, wherein, based at least in part on sending the indication of the interaction between the transaction code and the computing device of the customer to the one or more server computing devices associated with the payment processing platform, receiving, from the one or more server computing devices associated with the payment processing platform, at least a portion of transaction data associated with the transaction.

CS. The method as clause CR recites, wherein at least the portion of the transaction data is associated with at least one of an indication of the merchant or an item associated with the transaction and, based at least in part on receiving at least the portion of the transaction data: determining that an incentive is applicable to at least the merchant or the item; applying the incentive to the transaction; and causing a notification indicating that the incentive was applied to be presented via a user interface presented via a mobile payment application, associated with the payment making platform, on the computing device of the customer.

CT. The method as clause CR or CS recites, wherein at least the portion of the transaction data is associated with one or more items associated with the transaction and, based at least in part on receiving at least the portion of the transaction data, causing at least the portion of the transaction data to be presented via a cart building user interface presented via a mobile payment application associated with the payment making platform on the computing device of the customer in near real-time.

CU. The method as any of clauses CR-CT recites, wherein at least the portion of the transaction data is associated with a total cost of the transaction and, based at least in part on receiving at least the portion of the transaction data, causing at least the portion of the total cost of the transaction via a tipping user interface to be presented via a mobile payment application on the computing device of the customer.

CV. The method as clause CU recites, further comprising: receiving, via an input to the tipping user interface, a tip amount to be added to the total cost of the transaction; determining, based at least in part on a determination to authorize the payment, that the tip amount is also authorized; and transmitting additional funds, equal to the tip amount, from the customer account of the customer to the one or more server computing devices associated with the payment processing platform for depositing the additional funds into the merchant account.

CW. A payment processing platform comprising: a point-of-sale (POS) application, executable by a POS device of a merchant, configured to: generate transaction data associated with the transaction, wherein the transaction is between the merchant and a customer, and the transaction data includes a first timestamp; and receive a Quick Response (QR) code associated with a peer-to-peer (P2P) payment platform, wherein the QR code is caused to be presented via the POS application in association with the transaction; and one or more server computing devices associated with the payment processing platform configured to: receive, from one or more server computing devices associated with the P2P payment platform, an indication that the customer captured the QR code using a sensor of a computing device of the customer, wherein the indication is associated with context data indicating at least a second timestamp indicating when the customer captured the QR code using the sensor of the computing device of the customer; determine, based at least in part on correlating the first timestamp and the second timestamp, that the customer is associated with the transaction; and associate the customer with the transaction, wherein the association causes a movement of funds between an account of the customer maintained by the P2P payment platform and an account of the merchant maintained by the payment processing platform to process payment for the transaction.

CX. The payment processing platform as clause CW recites, wherein the POS application receives the QR code via an Application Programming Interface (API) of the P2P payment platform.

CY. The payment processing platform as clause CW or CX recites, wherein the QR code is specific to the transaction and comprises a resource locator to a location of the P2P payment platform or a deep link to a mobile payment application on the computing device of the customer.

CZ. The payment processing platform as any of clauses CW-CY recites, wherein the QR code is encoded with at least one of an identifier of the merchant, a location of the merchant, or a POS location, and the QR code comprises a resource locator to a location of the P2P payment platform or a deep link to a mobile payment application on the computing device of the customer.

DA. A method, implemented at least in part by one or more server computing devices associated with a payment processing platform, the method comprising: receiving, by the one or more server computing devices associated with the payment processing platform and from a point-of-sale (POS) application associated with the payment processing platform, on a computing device of a merchant, transaction data associated with a transaction between the merchant and a customer; receiving, by the one or more server computing devices associated with the payment processing platform and from one or more server computing devices associated with a payment making platform, a transaction code associated with the payment making platform, wherein the transaction code is presented via a user interface associated with the POS application; receiving, by the one or more server computing devices associated with the payment processing platform and from the one or more server computing devices associated with the payment making platform, an indication of an interaction between a computing device of the customer and the transaction code, wherein the indication is associated with context data associated with the interaction; determining, by the one or more server computing devices associated with the payment processing platform and based at least in part on comparing the transaction data with the context data, that the customer is associated with the transaction; and causing, by the one or more server computing devices associated with the payment processing platform, an association between the customer and the transaction, wherein the association causes at least a portion of the transaction data to be provided to a mobile payment application, associated with the payment making platform, on the computing device of the customer.

DB. The method as clause DA recites, wherein the user interface is a cart building user interface for adding one or more items to a virtual cart.

DC. The method as clause DA or DB recites, wherein the transaction code is presented in association with the user interface prior to a payment type selection user interface being presented.

DD. The method as any of clauses DA-DC recites, wherein the user interface is a payment type selection user interface.

DE. The method as any of clauses DA-DD recites, wherein the transaction data includes a first timestamp and the context data includes a second timestamp and, determining that the customer is associated with the transaction comprises correlating the first timestamp and the second timestamp.

DF. The method as any of clauses DA-DE recites, wherein the transaction data includes a first location and the context data includes a second location and, determining that the customer is associated with the transaction comprises correlating the first location and the second location.

DG. The method as any of clauses DA-DF recites, wherein at least the portion of the transaction data is associated with one or more items associated with the transaction, the method further comprising causing an indication of the one or more items to be presented via a cart building user interface presented via the mobile payment application.

DH. The method as any of clauses DA-DG recites, wherein at least the portion of the transaction data is associated with a total cost of the transaction, the method further comprising causing the total cost of the transaction to be presented via a tipping user interface presented via the mobile payment application.

DI. The method as any of clauses DA-DH recites, wherein at least the portion of the transaction data is associated with at least one of an item associated with the transaction or the merchant, the method further comprising causing an incentive associated with at least one of the item or the merchant to be presented via another user interface presented via the mobile payment application.

DJ. The method as any of clauses DA-DI recites, wherein the association further causes a movement of funds from an account of the customer maintained by the payment making platform to the payment processing platform to process payment for the transaction.

DK. A system comprising: one or more processors; and one or more computer-readable media comprising instructions that, when executed by the one or more processors, cause the system to perform operations comprising: receiving, from a point-of-sale (POS) application, associated with a payment processing platform, on a computing device of a merchant, transaction data associated with a transaction between the merchant and a customer; receiving, from one or more server computing devices associated with a payment making platform, a transaction code associated with the payment making platform, wherein the transaction code is presented in association with a user interface associated with the POS application; receiving, from the one or more server computing devices associated with payment making platform, an indication of an interaction between a computing device of the customer and the transaction code, wherein the indication is associated with context data associated with the transaction; determining, based at least in part on comparing the transaction data with the context data, that the customer is associated with the transaction; and causing an association between the customer and the transaction, wherein the association causes at least a portion of the transaction data to be provided to a mobile payment application, associated with the payment making platform, on the computing device of the customer.

DL. The system as clause DK recites, wherein the user interface is a cart building user interface for adding one or more items to a virtual cart and wherein the transaction code is presented via the cart building user interface prior to a payment type selection user interface being presented.

DM. The system as clause DK or DL recites, wherein the transaction data includes a first timestamp and the context data includes a second timestamp and determining that the customer is associated with the transaction comprises correlating the first timestamp and the second timestamp.

DN. The system as any of clauses DK-DM recites, wherein the transaction data includes a first location and the context data includes a second location and determining that the customer is associated with the transaction comprises correlating the first location and the second location.

DO. The system as any of clauses DK-DN recites, wherein at least the portion of the transaction data comprises at least one of: an indication of one or more items associated with the transaction; a total cost of the transaction; or an indication of the merchant associated with the transaction.

DP. The system as any of clauses DK-DO recites, wherein the association further causes a movement of funds from an account of the customer maintained by the payment making platform to an account of the merchant maintained by the payment processing platform to process payment for the transaction.

While the example clauses described above are described with respect to one particular implementation, it should be understood that, in the context of this document, the content of the example clauses can also be implemented via a method, device, system, a computer-readable medium, and/or another implementation. Additionally, any of example clauses A-DP may be implemented alone or in combination with any other one or more of the example clauses A-DP.

What is claimed is:

1. A payment processing platform configured to process a transaction by interaction with a peer-to-peer (P2P) payment platform, the payment processing platform comprising:
   a point-of-sale (POS) device comprising:
      a touchscreen configured to face a customer for customer selection of a payment type using the touchscreen; and
      a POS application configured to:
         generate transaction data associated with the transaction, wherein the transaction is between a merchant and the customer;
         receive a Quick Response (QR) code associated with the P2P payment platform;
         present, via the touchscreen, the QR code to the customer before presenting a payment type selection user interface to the customer; and
         after receiving selection of the payment type via the touchscreen or an indication, from the payment processing platform, that the customer captured the QR code using a computing device of the customer, complete the transaction via one or more server computing devices associated with the payment processing platform; and
   the one or more server computing devices associated with the payment processing platform configured to:
      receive an indication, from one or more server computing devices associated with the P2P payment platform, that the customer captured the QR code using the computing device of the customer;
      transmit the indication that that the customer captured the QR code using the computing device of the customer to the POS application;
      in response to receiving the indication that the customer captured the QR code using the computing device of the customer, send an authorization request to the one or more server computing devices associated with the P2P payment platform to authorize payment for the transaction; and
      in response to receiving an authorization response to the authorization request, settle funds between the merchant and the customer by depositing funds received from the P2P payment platform into a merchant account of the merchant, wherein the funds were associated with a customer account of the customer of the P2P payment platform before being deposited into the merchant account.

2. The payment processing platform as claim 1 recites, wherein the QR code is received via an Application Programming Interface (API) of the P2P payment platform.

3. The payment processing platform as claim 1 recites, wherein the QR code is received via the one or more server computing devices associated with the payment processing platform, and wherein the one or more server computing devices associated with the payment processing platform are configured to (i) obtain the QR code via an Application Programming Interface (API) of the P2P payment platform and (ii) send the QR code to the POS application.

4. The payment processing platform as claim 1 recites, wherein the QR code is specific to at least one of the transaction or the merchant.

5. The payment processing platform as claim 1 recites, wherein the one or more server computing devices associated with the payment processing platform are further configured to:
   receive the transaction data from the POS application;
   compare the transaction data with context data associated with the indication that the customer captured the QR code using the computing device of the customer to determine that the customer is associated with the transaction; and
   transmit the indication that the customer captured the QR code using the computing device of the customer to the POS application based at least in part on a determination that the customer is associated with the transaction.

6. A method, implemented at least in part by a payment processing platform, the method comprising:
   generating, by a point-of-sale (POS) application associated with the payment processing platform, transaction data associated with a transaction between a merchant and a customer;
   receiving, at the POS application, a transaction code associated with a payment making platform;
   presenting, by the POS application, the transaction code associated with a payment making platform;
   causing, by the POS application, the transaction code to be presented via a user interface of a computing device of the merchant;
   receiving, by one or more server computing devices associated with the payment processing platform, an indication, from one or more server computing devices associated with the payment making platform, of an interaction between the transaction code and a computing device of the customer;

based at least in part on receiving the indication of the interaction:

transmitting, from the one or more server computing devices associated with the payment processing platform, the indication of the interaction to the POS application;

sending, by the one or more server computing devices associated with the payment processing platform, an authorization request to the one or more server computing devices associated with the payment making platform to authorize payment for the transaction;

based at least in part on receiving the indication of the interaction, causing, by the POS application, at least a portion of the transaction data to be presented via a mobile payment application associated with the payment making platform on the computing device of the customer; and in response to receiving an authorization response to the authorization request, settling, by the payment processing platform, funds between the merchant and the customer by depositing funds received from the payment making platform into a merchant account of the merchant, wherein the funds were associated with a customer account of the customer of the payment making platform before being deposited into the merchant account.

7. The method as claim 6 recites, wherein the transaction code is associated with a resource locator to a location of the payment making platform.

8. The method as claim 6 recites, wherein the transaction code is associated with a deep link to the mobile payment application.

9. The method as claim 6 recites, wherein if the mobile payment application is not installed on the computing device of the customer, causing the mobile payment application to be installed on the computing device of the customer or enabling use of the mobile payment application on the computing device of the customer via an instant application.

10. The method as claim 6 recites, wherein the user interface is a cart building user interface for adding one or more items to a virtual cart.

11. The method as claim 10 recites, wherein the portion of the transaction data comprises an indication of the one or more items, wherein the indication of the one or more items is presented via another cart building user interface presented by the mobile payment application in near-real time.

12. The method as claim 6 recites, wherein the transaction code is presented before a payment type selection user interface.

13. The method as claim 6 recites, wherein the user interface is a payment type selection user interface.

14. The method as claim 6 recites, wherein the portion of the transaction data comprises a total cost of the transaction and wherein the total cost of the transaction is presented via a tipping user interface, a reward user interface, or a feedback user interface presented by the mobile payment application.

15. One or more non-transitory computer-readable media storing instructions that, when executed by one or more processors, cause the one or more processors to perform operations comprising:

generating, by a point-of-sale (POS) application associated with a payment processing platform, transaction data associated with a transaction between a merchant and a customer;

receiving, at the POS application, a transaction code associated with a payment making platform;

presenting, by the POS application, the transaction code associated with a payment making platform;

causing, by the POS application, the transaction code to be presented via a user interface of a computing device of the merchant;

receiving, by one or more server computing devices associated with the payment processing platform, an indication, from one or more server computing devices associated with the payment making platform, of an interaction between the transaction code and a computing device of the customer;

based at least in part on receiving the indication of the interaction:

transmitting, from the one or more server computing devices associated with the payment processing platform, the indication of the interaction to the POS application;

sending, by the one or more server computing devices associated with the payment processing platform, an authorization request to the one or more server computing devices associated with the payment making platform to authorize payment for the transaction;

based at least in part on receiving the indication of the interaction, causing, by the POS application, at least a portion of the transaction data to be presented via a mobile payment application associated with the payment making platform on the computing device of the customer; and in response to receiving an authorization response to the authorization request, settling, by the payment processing platform, funds between the merchant and the customer by depositing funds received from the payment making platform into a merchant account of the merchant, wherein the funds were associated with a customer account of the customer of the payment making platform before being deposited into the merchant account.

16. The one or more non-transitory computer-readable media as claim 15 recites, wherein the merchant account is associated with a stored balance maintained by the payment processing platform and the customer account is associated with a stored balance maintained by the payment making platform.

17. The one or more non-transitory computer-readable media as claim 15 recites, the operations further comprising:

accessing, by the one or more server computing devices associated with the payment processing platform, customer data associated with the customer;

determining, by the one or more server computing devices associated with the payment processing platform, a level of risk associated with the customer based at least in part on the customer data; and settling, by the one or more server computing devices associated with the payment processing platform, the funds between the merchant and the customer based at least in part on a determination that the level of risk is below a threshold.

18. The one or more non-transitory computer-readable media as claim 15 recites, wherein the indication of the interaction between the computing device of the customer and the transaction code is received via an Application Programming Interface (API) associated with the payment making platform.

19. The one or more non-transitory computer-readable media as claim 15 recites, wherein the transaction code is a multi-function transaction code associated with multiple payment making platforms and the indication of the interaction is received, by the one or more server computing devices associated with the payment processing platform from the computing device of the customer, the operations further comprising:

sending, by the one or more server computing devices associated with the payment processing platform, to the computing device of the customer, a request to select one of the multiple payment making platforms;

receiving, by the one or more server computing devices associated with the payment processing platform and from the computing device of the customer, an indication of a selection of the payment making platform; and sending, by the one or more server computing devices associated with the payment processing platform, the authorization request to the one or more server computing devices associated with the payment making platform based at least in part on the selection of the payment making platform.

20. The one or more non-transitory computer-readable media as claim 15 recites, wherein based at least in part on receiving the indication of the interaction between the computing device of the customer and the transaction code, causing, by the one or more server computing devices associated with the payment processing platform, at least a portion of the transaction data to be presented via a mobile payment application associated with the payment making platform on the computing device of the customer.

* * * * *

UNITED STATES PATENT AND TRADEMARK OFFICE
CERTIFICATE OF CORRECTION

PATENT NO. : 11,100,490 B1
APPLICATION NO. : 17/079946
DATED : August 24, 2021
INVENTOR(S) : Evan Doyle et al.

Page 1 of 1

It is certified that error appears in the above-identified patent and that said Letters Patent is hereby corrected as shown below:

In the Claims

Column 87, Line 39, change "9. The method as claim 6 recites, wherein if the mobile" to -- 9. The method as claim 8 recites, wherein if the mobile --.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*